(12) United States Patent
Mladin et al.

(10) Patent No.: US 11,722,581 B2
(45) Date of Patent: *Aug. 8, 2023

(54) MECHANISMS FOR AN INTELLIGENT SERVICE LAYER REQUEST ABSTRACTION SERVICE

(71) Applicant: Convida Wireless, LLC, Wilmington, DE (US)

(72) Inventors: Catalina Mihaela Mladin, Hatboro, PA (US); Dale N. Seed, Allentown, PA (US); Quang Ly, North Wales, PA (US); William Robert Flynn, IV, Schwenksville, PA (US); Zhuo Chen, Claymont, DE (US); Hongkun Li, Malvern, PA (US); Lu Liu, Conshohocken, PA (US); Chonggang Wang, Princeton, NJ (US); Jiwan L. Ninglekhu, Royersford, PA (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/810,504

(22) Filed: Jul. 1, 2022

(65) Prior Publication Data
US 2022/0345547 A1 Oct. 27, 2022

Related U.S. Application Data

(63) Continuation of application No. 17/052,590, filed as application No. PCT/US2019/031104 on May 7, 2019.

(Continued)

(51) Int. Cl.
*H04L 67/62* (2022.01)
*H04W 4/70* (2018.01)
(Continued)

(52) U.S. Cl.
CPC .............. *H04L 67/62* (2022.05); *H04L 67/12* (2013.01); *H04L 67/34* (2013.01); *H04L 67/565* (2022.05); *H04W 4/70* (2018.02)

(58) Field of Classification Search
None
See application file for complete search history.

(56) References Cited

U.S. PATENT DOCUMENTS 7,286,987 B2 10/2007 Roy
7,797,342 B2 9/2010 Banks et al.
(Continued)

OTHER PUBLICATIONS

Minami et al., "Secure Context-Sensitive Authorization", Jan. 1, 2005, IEEE, Third IEEE International Conference on Pervasive Computing and Communications (pp. 257-268) (Year: 2005).*

(Continued)

*Primary Examiner* — Davoud A Zand
(74) *Attorney, Agent, or Firm* — BakerHostetler

(57) ABSTRACT

Systems and methods are described herein to automate managing of service layer operations comprised of multiple elementary operations and offloading the burden of performing such multi-step operations from a requesting entity to the service layer. A Request Abstraction Service (RAS) is described herein for the autonomous execution of such multi-step operations. Methods and apparatuses are also described herein for a service layer framework for integrating generic and functional user interfaces as services managed by the SL on behalf of requesting entities.

20 Claims, 27 Drawing Sheets

Related U.S. Application Data

(60) Provisional application No. 62/667,858, filed on May 7, 2018, provisional application No. 62/751,075, filed on Oct. 26, 2018.

(51) Int. Cl.
*H04L 67/12* (2022.01)
*H04L 67/00* (2022.01)
*H04L 67/565* (2022.01)

(56) References Cited

U.S. PATENT DOCUMENTS

| | | |
|---|---|---|
| 7,890,928 B2 | 2/2011 | Patrudu |
| 7,979,844 B2 | 7/2011 | Srinivasan |
| 9,729,524 B1 | 8/2017 | Brandwine et al. |
| 2006/0288056 A1 | 12/2006 | Yamakawa et al. |
| 2008/0120129 A1* | 5/2008 | Seubert ............ G06Q 40/125 705/305 |
| 2009/0254971 A1* | 10/2009 | Herz ............ G06Q 30/0603 726/1 |
| 2010/0146085 A1 | 6/2010 | Van et al. |
| 2010/0199257 A1* | 8/2010 | Biggerstaff ........... G06F 8/456 717/110 |
| 2012/0011141 A1 | 1/2012 | Park et al. |
| 2012/0191698 A1 | 7/2012 | Albrecht et al. |
| 2013/0132932 A1 | 5/2013 | Van Rozen |
| 2015/0373127 A1 | 12/2015 | Ly et al. |
| 2017/0017532 A1 | 1/2017 | Falco et al. |
| 2017/0178626 A1 | 6/2017 | Gruber et al. |

OTHER PUBLICATIONS

Park et al., "Security Architecture for a Secure Database on Android", Jan. 1, 2018, IEEE, IEEE Access (vol. 6, pp. 11482-11501).*
Non-Final Office Action dated Sep. 16, 2021 for U.S. Appl. No. 17/052,590.
OneM2M TS-0001, Functional Architecture, V3.9.0, 2017.

* cited by examiner

MECHANISMS FOR AN INTELLIGENT SERVICE LAYER REQUEST ABSTRACTION SERVICE

CROSS-REFERENCE TO RELATED APPLICATIONS

This application is a continuation of U.S. application Ser. No. 17/052,590, filed Nov. 3, 2020, which is a National Stage Application filed under 35 U.S.C. § 371 of International Application No. PCT/US2019/031104 filed May 7, 2019, which claims the benefit of U.S. Provisional Patent Application Ser. No. 62/667,858, filed May 7, 2018, and U.S. Provisional Patent Application No. 62/751,075, filed Oct. 26, 2018, which are hereby incorporated by reference in their entirety.

BACKGROUND

The Internet of Things (IoT) is an emerging technology in which everyday objects such as household appliances, motor vehicles, consumer electronic devices, personal mobile devices, environmental sensors, etc. may connect to a network, such as the Internet, and may be managed and controlled remotely. The diversity of such IoT connected devices may allow for more creative and smarter uses that enhance user's lives by providing more convenience and automation. To manage a large number of IoT devices, service layer architectures were defined and standardized. Further, user interfaces (UIs) have evolved significantly in the past few decades, from plain displays and keyboards, to the mouse, touchscreens, haptic devices, etc. Progressively more sensors have been added to consumer devices to determine user actions, such as analyzing gestures, detecting eye movement, interpreting direction, speed, etc. Progressively more ways of providing feedback have also been developed in countless audio, haptic or visual forms, etc. While complex machines such as general-purpose computers have the processing power and the need for sophisticated interactions, in the Internet of Things (IoT) world the needs and capabilities may both be reduced. Accordingly, there is a need to enhanced integration of generic user interfaces in the !OT-Machine-to-Machine (M2) service layer (SL).

FIG. 1 is a diagram of an example protocol stack 100 supporting an M2M/IoT service layer. From a protocol stack perspective, middleware service layers are typically layered on top of existing network protocol stacks and provide value added services to client applications as well as other services. Hence, service layers are often categorized as "middleware" service layers. For example, FIG. 1 shows a service layer 102 located in between an IP networking stack and applications. As shown in the example of FIG. 1, this protocol stack 100 may include an applications layer 101, application protocols layer 103 (e.g. HTTP, OCAP, or MQTT), transport protocols layer 104 (e.g. TCP or UDP), network protocols layer 105 (e.g. IPv4 or IPv6) and access network protocols layer 106 (e.g. Ethernet, Cellular, Wi-Fi) in addition to the service layer 102. Service layer 102 instances may be deployed on various network nodes (gateways and servers) and may provide value-added services to network applications, device applications, and to the network nodes themselves.

An M2M/IoT service layer is an example of one type of middleware service layer 102 specifically targeted towards providing value-added services for M2M/IoT type devices, applications, and data. Several industry standards bodies (e.g. oneM2M, OCF, ETSI M2M, and OMA LWM2M) have been developing M2M/IoT service layers to address the challenges associated with the integration of M2M/IoT types of devices and applications into deployments such as the Internet/Web and cellular, enterprise, and home networks.

An M2M service layer may provide applications and devices access to a collection of M2M centric capabilities supported by the service layer, which may include but are not limited to the following examples: security, charging, data management, device management, discovery, provisioning, and connectivity management. These capabilities may be made available to applications via application programming interfaces (APIs) that make use of message formats, resource structures, and resource representations that are supported by the M2M service layer.

FIG. 2 is a diagram of an example M2M/IoT deployment 200. From a deployment perspective, an M2M/IoT SL may be deployed on various types of network nodes including, for example, servers, gateways and devices, as shown in FIG. 2. The system of FIG. 2 shows an M2M/IoT Application 201, an M2M/IoT Server 202 executing an M2M/IoT SL 203, an M2M/IoT Gateway 204 executing an M2M/IoT SL 205 connected to M2M/IoT Device 209, and an M2M/IoT Device 207 executing an M2M/IoT SL 207.

The oneM2M standard defines an M2M/IoT SL. The purpose of the SL is to provide "horizontal" services that may be utilized by different "vertical" IoT systems and applications, such as e-Health, fleet management, and smart homes. FIG. 3 is a diagram of an example oneM2M architecture 300. The architecture 300 of the oneM2M SL may comprise a Common Service Entity (CSE) that may support four reference points. The Mca reference point may interface with the Application Entity (AE). The Mcc reference point may interface with another CSE within the same service provider domain, and the Mcc' reference point may interface with another CSE in a different service provider domain. The Men reference point may interface with the underlying network service entity (NSE). An NSE may provide underlying network services to the CSEs, such as device management, location services and device triggering. As shown in the example of FIG. 3, in the field domain 301, AE 310 interfaces with the Mca reference point 330 and Mca reference point 332. CSE 311 interfaces with Mcc reference point 333, which interfaces with CSE 321 in the infrastructure domain 302. NSE 312 interfaces with Men reference point 331. In the infrastructure domain 302, AE 320 interfaces with the Mca reference point 334. CSE 321 interfaces with Mcc' reference point 336 to the infrastructure domain of another service provider 323. NSE 322 interfaces with Men reference point 335.

A CSE may comprise multiple logical functions referred to as Common Service Functions (CSFs). CSFs include but are not limited to discovery and data management & repository.

FIG. 4 is a diagram of an example set of CSFs 400 supported in oneM2M. The service layer is enabled functionally by CSFs. A group of CSFs may be instantiated as a group on Common Services Entities (CSEs) 401 as shown in FIG. 4. Examples of CSFs and their functionality may include the following:

Application and service layer Management CSF 402: may provide management of AEs and CSEs.

Discovery CSF 403: may search for information about applications and services based on some filter criteria.

Registration CSF 404: may provide the functionality for AEs (or other remote CSEs) to register with a CSE. This may allow the AEs (or the remote CSE) to use the services of the CSE.

Communication Management/Delivery Handling CSF 405: may provide communications with other CSEs, AEs and NSEs. This CSF may decide at what time and which communication connection for delivering communications and if necessary and allowed, to buffer communications request so that they may be forwarded at a later time.

Group Management CSF 406: may provide for the handling of group related requests and enables an M2M system to support bulk operations for example, on multiple devices, applications, etc.

Security CSF 407: may provide security functions for the service layer, such as access control including identification, authentication, and authorization.

Data Management and Repository CSF 408: may provide data storage and mediation functions (for example, collecting data for aggregation, re-formatting data, and storing data for analytics and semantic processing).

Location CSF 409: may provide the functionality to enable AEs to obtain geographical location information.

Service Charging & Accounting CSF 410: may provide charging functions for the service layer Device Management CSF 411: may provide management of device capabilities on M2M gateways and M2M devices.

Network Service Exposure, Service Execution and Triggering CSF 412: may manage communications with the Underlying Networks for accessing network service functions.

Subscription and Notification CSF 413: may provide functionality to allow for subscribing to an event and to be notified when this event occurs.

FIG. 4 also shows the group management CSF 419 and Semantics CSF 420.

The oneM2M architecture may provide for a CSE 401 to interface through the Mca reference point 414, Mcc (and Mcc') reference point 415, and Men reference point 416 to other entities including but not limited to: a AEs 417; other CSEs; and a Network Service Entity (NSE) 418 (i.e. the underlying network).

The interactions between requestors and service layers may be based on RESTful principles in which atomic operations may be performed against resources maintained at the service layer. A resource, or Service Layer Resource, may be a uniquely addressable object (i.e., data structure) that contains information (e.g., data) and may be hosted by an M2M/IoT Service Layer. Resources may be accessed via uniform resource identifiers or URIs. The atomic operations themselves may be stateless, meaning that the communications between requestors and the service layer are self-contained within a particular request. Requests may comprise self-descriptive messages that include a method of an operation, a URI, and possibly some data or meta-data for use by the resource.

The following definitions are useful when describing SLs. While the following definitions are described with respect to an M2M/IoT system, they may be applicable to any such similar systems.

An M2M/IoT Service Layer (SL) may be a software middleware layer that supports value-added services for M2M/IoT applications and devices through a set of Application Programming Interfaces (APIs) and underlying networking interfaces. An SL may comprise a collection of M2M/IoT services that may be used by devices, applications, and users. An SL may also host resources.

An M2M/IoT Application may be a software entity that registers to an M2M/IoT Service Layer and performs application specific functionality pertaining to a particular M2M/IoT use case, such as eHealth, smart energy, or home automation, for example.

An M2M/IoT Entity may be an M2M/IoT application or M2M/IoT device or a user of an M2M/IoT application or M2M/IoT device.

An M2M/IoT Service may be a software entity that provides capabilities to M2M/IoT entities (e.g., data management, security, device management).

A Service Layer Entity may be an M2M/IoT entity that enrolls and/or registers to an M2M/IoT Service Layer. Examples may include an M2M/IoT Application or an instance of an M2M/IoT Service Layer.

A Service Layer Device may be an entity that registers to an M2M/IoT service layer and may host one or more applications.

A Service Layer Primitive may be a message using a Service Layer API to access data or services offered by the Service Layer. A Service Layer Request and a Service Layer Response are examples of Service Layer Primitives.

A Service Layer Request may be an operation issued by a Service Layer Entity that targets a Service Layer Resource.

An M2M/IoT Service Layer Registration may be an act of an M2M/IoT service layer entity registering to an M2M/IoT service layer.

An M2M/IoT Registrant may be an M2M/IoT Entity registered to or using an M2M/IoT Service Layer, such as applications, sensors, devices, and/or other M2M/IoT Service Layers, for example.

An M2M/IoT Service Platform may be a platform deployed by an M2M/IoT service provider that may optionally host an M2M/IoT service layer.

An M2M/IoT Service Provider may be a stakeholder (e.g., a company) responsible for the deployment and management of an M2M/IoT service platform.

An M2M/IoT Service Subscriber may be a stakeholder (e.g., a human being) that establishes a subscription (i.e., enrolls) with an M2M/IoT service provider to access and use its M2M/IoT services.

An M2M/IoT Service Enrollment may be an act of an M2M/IoT service subscriber establishing a service subscription with an M2M/IoT service provider and enrolling its devices, applications, data, and authorized users with the service provider's platform.

An M2M/IoT User may be an authorized entity associated with an M2M/IoT service subscriber. An M2M/IoT service subscriber may grant specified privileges to specified M2M/IoT users to access specified devices, applications, data, and services via the M2M/IoT service provider's platform.

Persistence, as described herein, may refer to the storage of data in a computer system that extends beyond the operation of creating the data. Such data may remain in the computer system until it is deleted or gets corrupted. Pre-persistence may refer to procedures performed before storing the data. Post-persistence may refer to procedures performed after storing the data.

Metadata may be data that provides information about other data.

The oneM2M architecture is a distributed architecture and supports deploying M2M/IoT services in a distributed manner across the following types of Nodes: Application Service Nodes (ASNs); Application Dedicated Nodes (ADNs); Middle Nodes (MNs); Infrastructure Nodes (INs); and Non-oneM2M Nodes (NoDNs).

An ASN is a Node that comprises one CSE and comprises at least one Application Entity (AE). In an example embodiment, an ASN may reside in an IoT Device.

An ADN is a Node that comprises at least one AE and may not include a CSE. In an example embodiment, an Application Dedicated Node may reside in a constrained IoT Device.

An MN is a Node that comprises a CSE and comprises zero or more AEs. In an example embodiment, an MN may reside in an IoT Gateway.

An IN is a Node that comprises a CSE and comprises zero or more AEs. A CSE m an IN may comprise CSE functions not applicable to other node types. In an example embodiment, an IN may reside in an IoT Service Infrastructure.

A non-oneM2M Node is a Node that may not include oneM2M Entities (neither AEs nor CSEs). Such Nodes may represent devices attached to the oneM2M system for inter-working purposes, including management.

FIG. 5 is a diagram of the configurations of inter-connecting the various entities supported within a oneM2M system 500. The system 500 may comprise a plurality of IoT servers (also referred to herein as CSEs) that may be interconnected and may manage a plurality of IoT devices. The term IoT servers used herein may refer to cloud servers, edge gateways, or home gateways (i.e. any entity that offers IoT services within an IoT system). The architecture may be divided into two main domains: the infrastructure domain 501 and field domain 502. The infrastructure domain 501 may comprise cloud servers that serve as the main master controller of the system 500, which is represented in FIG. 5 as IN-CSE 503a in the Infrastructure Node 503b in FIG. 5. The field domain may comprise field deployed IoT servers located in various locations including but not limited to a factory, an office building, or a home. These servers are represented in FIG. 5 as MN-CSE 504a in Middle Node 504b and MN-CSE 505a in Middle Node 505b. The field domain 502 may also comprise mobile IoT servers running on mobile devices such as, for example, service trucks or mobile phones. These mobile devices are represented in FIG. 5 as ASN-CSE 506a in ASN 506b and ASN-CSE 507a in ASN 507b. IoT devices are represented in FIG. 5 as ADNs 508a and 508b and NoDNs 509a, 509c, 509d, 509f, and 509g with each node communicating to one of the CSEs in the system.

SUMMARY

Certain service layer operations are elementary in nature and may be related to one another. However, such operations are typically performed in piecemeal fashion, requiring active participation by a requesting entity (i.e., an app or user). Even when requesting bulk operations to be performed, the requesting entity may be required to gather large amounts of information before initiating the bulk processing, and additional required information may not be gatherable until later in the process. This, again, necessitates active participation by the requesting entity. Burdening a requestor with manually executing related service layer operations and extracting relevant data during each step of processing is not an effective and scalable approach. Likewise, User Interfaces of all kinds have evolved significantly in the past few decades, from the plain displays and keyboards, to the mouse, touchscreens, haptic devices, etc. More and more sensors have been added to consumer devices to determine what a user is trying to do, such as analyzing gestures, detecting eye movement, interpreting direction, speed, etc. More and more ways of providing feedback have also been developed in countless audio, haptic or visual forms, etc. While complex machines such as general-purpose computers have the processing power and the need for sophisticated interactions, in the Internet of Things (IoT) world the needs and capabilities may both be reduced. Many devices may perform well using a number of basic interactions; therefore a human may use only a few very simple interactions with the same device for a variety of purposes, as long as it is known which function needs to be performed. Similarly, the same simple interaction may be used for a variety of devices, e.g. a sliding scale is the basic input needed by either the volume function of a stereo, the temperature setting on a washing machine, the zoom in a camera, etc.

Systems and methods are described herein to automate managing of service layer operations comprised of multiple elementary operations and offloading the burden of performing these multi-step operations from the requesting entity to the service layer. A Request Abstraction Service (RAS Service) is described herein for the autonomous execution of such multi-step operations. Methods and apparatuses are also described herein for a service layer framework for integrating generic and functional user interfaces as services managed by the SL on behalf of requesting entities. These user interfaces, referred to herein as interactors, process user interactions and produce generic and functional events that are translated into inputs/outputs. Methods and apparatuses also described herein define an interaction context management (ICM) service that evaluates context and maintains corresponding context states. The ICM service uses the context states to assess user interaction-based events and to provide a mapping between them and application-specific events. The ICM may be configured with interactor-related templates and policies, e.g. an interactor library. Requesting entities may query and discover the interactor-related capabilities that are provided by the SL by discovering the interactor library or the individual templates. In accordance with the methods and apparatuses described herein, applications may provide information about their own interactor-related capabilities. Further, the ICM may be configured with rules and parameters that enable the ICM to monitor the SL and to maintain and switch Context states accordingly. The ICM may instantiate interactors on the behalf of applications, such that there is a common understanding of the user interactions, and their functionality and correspondence to application operations in the system. The process of associating applications and interactors may allow for contextual use of multiple Interactors in a system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

DETAILED DESCRIPTION OF ILLUSTRATIVE EMBODIMENTS

Systems and methods are described herein to automate managing of service layer operations comprised of multiple elementary operations and offloading the burden of performing these multi-step operations from the requesting entity to the service layer.

The following is a list of acronyms relating to service level technologies that may appear in the above description. Unless otherwise specified, the acronyms used herein refer to the corresponding term listed below.

AND Application Dedicated Node
AE Application Entity
API Application Programming Interfaces
ASE Automated Service Enrollment
App Application
ASE-C Automated Service Enrollment Client
ASE-S Automated Service Enrollment Server
ASN Application Service Node
CRUD Create, Retrieve, Update, Delete
CSE Common Service Entity
CSF Common Service Function
IN Infrastructure Network
IoT Internet of Things
IP Internet Protocol
M2M Machine to Machine
MN Middle Node
NoDN Non-oneM2M Node
PoA Point of Access
RAS Request Abstraction Service
REST Representational State Transfer
ROA Resource Oriented Architecture
SL Service Layer
URI Uniform Resource Identifier In M2M/IoT (hereinafter "IoT") deployments, certain service layer operations may involve, or be followed by, the processing of multiple elementary operations. Such elementary operations may be related to one another. For example, a resource discovery request may be followed by requests to create an access control policy for each of the discovered resources or to update the expiration times of those resources.

Traditionally, the processing of such elementary operations may require the continued participation of a requesting entity, though the same, or related, elementary operations may be performed each time the service layer operation is requested by the requesting entity. The continued participation of the requesting entity may be burdensome to the requesting entity in many ways.

Figure 6:
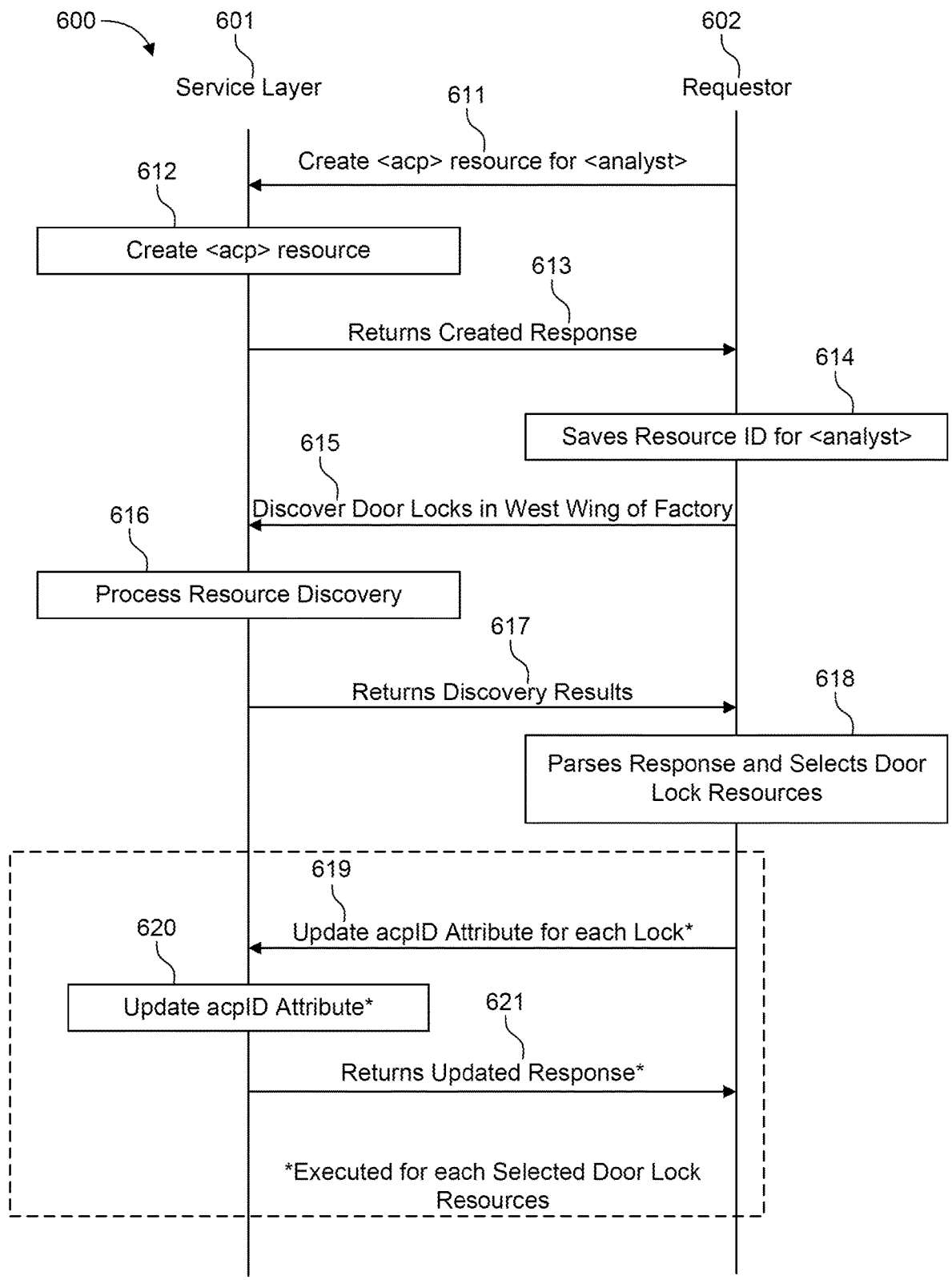
FIG. 6 illustrates an example of elementary service layer operations.

Consider a use case regarding processing at a smart factory. FIG. 6 illustrates an example method 600 for elementary service layer operations. A requesting entity, or "requestor" 602 (e.g., a user or an application), may perform one or more elementary operations with a service layer 601 to grant access permissions to a new visitor. Assume for this use case that a financial analyst is visiting the smart factory at a manufacturing company to access the adoption of IoT technologies within the company. The requestor 602 may first create an Access Control Policy (ACP) for the analyst so that permissions may be granted to the analyst to enter the smart factory. This process is shown by steps 611, 612, and 613 of FIG. 6. The requestor 602 may save the resource identifier of the created resource in step 4 for future use. The requestor 602 may also discover door locks in the west wing of the factory that the analyst is touring, shown by steps 615, 616, and 617 of FIG. 6. At step 618, the requestor 602 may parse a received discovery response message and may select URIs of door locks found from the discovery request. For a selected door lock, the requestor 602 may update an appropriate access control policy attribute (e.g., an acpID attribute) with the resource identifier saved in step 614. Steps 619, 620, and 621 may be executed for each door lock selected in step 618.

The smart factory use case describes the inter-dependency of elementary operations. For example, the resource identifier saved in step 4 and the list of door locks discovered in step 618 may be required for the acpID update performed in steps 619, 620, and 621. Further, the number of results discovered in step 618 may change the number of times steps 619, 620, and 621 are repeated. Because of such dependencies, batch requests may not be able to be generated for the call flow of FIG. 6 and other similar call flows. Batch or bulk request generation may require a requestor to provide information for requests prior to execution of the bulk request. In the smart factory use case, required information may be available only after executing steps 611 and 615. Not all information required for step 619 may be available before the step 611 request is issued. Hence, the call flow described in the use case is not available as a bulk request.

FIG. 6 illustrates another burden placed upon requestors of elementary, but related, requests. The requestor may be burdened with the task of extracting data returned in responses, as shown by the processing at steps 613, 614, 617, an 618. In FIG. 6, the resource ID extracted in step 614 must be saved by the requestor for future use in later steps. In addition, the resource discovery results parsed in step 618 may be large and may require the requestor to save the URIs for the update operation that follows. The requestor also may have to make numerous requests or one large bulk request incorporating the saved information from steps 614 and 618. The requestor in this use case must manually execute the service layer requests highlighted at steps 619, 620, and 621 of FIG. 6.

A service layer may be in position to perform such operations to relieve requestors from performing the operations manually. The service layer has the capabilities to process information provided in a response and to use them as inputs to another request. Elementary operations may be necessary operations that may be routinely executed within a service layer and simple for service layers to process. Service layer architectures, such as oneM2M, lack the ability for requestors to specify an abstract request that will result in the execution of a sequence of multiple, elementary operations.

The capabilities and example embodiments described herein may provide solutions to the above-described problems, among others. Systems and methods are described to automate managing of service layer operations comprised of multiple elementary operations and offloading the burden of performing these multi-step operations from the requesting entity to the service layer. A Request Abstraction Service (RAS) is described herein for the autonomous execution of such multi-step operations.

An RAS may be able to accept and interpret higher abstraction requests and perform elementary operations inferred by, or associated with, the request at the service layer. The RAS may be able to offload requestors from performing multiple, elementary operations manually. Such elementary operations may be supported by service layers for common operations that may be cumbersome for requestors to perform manually. For example, as described above, requestors may need to parse and extract data from requests and use such data in future requests. The elementary operations of parsing and extracting data may be supported by one or more service layers. The RAS may be made available to perform the parsing and extracting of data and also execute resultant operations within the service layer.

An RAS may manage services offered by a service layer. The RAS may provide one or more processing functions, such as the following.

The RAS may define one or more methods by which requestors may communicate higher level, abstract requests to a service layer. A structure may be defined for an abstract request that may utilize semantics, or certain word structures, more applicable to issuing commands. Such word structures may simplify operations of the request abstraction service.

The RAS may define one or more mechanisms to dynamically process an abstract request. Such mechanisms may provide decomposition of the abstract request, classifications of elements of the request, association of request elements to SL operations, and/or the determining of contextual information from the request.

The RAS may generate one or more application programming interfaces (APIs) that make calls to service layer operations. As part of such generation, a smart API generator may decompose an abstract request and use outputs of the aforementioned mechanisms to generate APIs that, when called, execute service layer operations to achieve desired results of the abstract request.

The RAS may define one or more mechanisms for service layer operational sequencing to execute the generated APIs. The operational sequencer may interact with the service layer to execute multiple operations to complete the abstract request. The request abstraction service may return a status to the requestor and may include a list of service layer actions and/or resources that were operated upon to complete the abstract request.

The RAS may define one or more methods to enable requestors to dynamically provide contextual information to the RAS. Such methods may use an abstract request to provide context information to the request abstraction service. The contextual information may be saved within one or more components of the RAS to improve inference capabilities of the RAS. Alternatively or additionally, the RAS may prompt the requestor (1) to define certain contexts that the RAS is not able to resolve or (2) upon determining context is missing from the abstract request.

The RAS may define one or more methods by which an abstract request may be reused. Such methods may comprise saving an existing abstract request as a resource and identifying the resource in a new abstract request while specifying new context information used to override existing context information.

The RAS may define a structured format in which abstract requests may be made to the service layer. The structured format may use language constructs and may comprise at least three main components: a command predicate, one or more command objects, and one or more command contexts. It should be appreciated that the term "predicate" is used in reference to a predicate verb of the abstract request, which may specify a service layer operation being requested. The structure of an abstract request may be defined as follows: <Command_Predicate>{modifier(s) Command_Object(s)} {modifier(s) Command_Context(s)}

The Command_Predicate may refer to a service layer operation.

The Command_Object(s) may represent one or more subjects/objects implicated by the request.

The Command_Context(s) may represent one or more contexts of the request. Contexts may refer to a number of resources to be operated on, identifiers/names, and types of the resources to be operated on, a time duration applicable to the request, and a desired location applicable to the request.

In addition, one or more modifiers may be included in an abstract request to further describe the Command_Object(s) and/or Command_Context(s). Such modifiers may describe quantities, add filter criteria, or relate service layer operations to the request.

While an abstract request may be structured as defined above, the abstract request may take any other form capable of conveying the same or similar information. For example, an abstract request may comprise a request message, or other data structure, that includes the information associated with the above-defined parameters.

Example abstract requests that may be created using the defined abstract request structure include at least the following: "Turn off all lights on the second floor and lock all outside doors"; "Turn on the water valve in the lab and close it in 15 minutes"; "Update firmware for all sensors with version 1.3d but not for sensors with version 1.3a"; "Give <guest> access to room 123 and to swimming pool and to fitness center"; and "Group all street lights between 1st and 10th streets".

An SL requestor may issue an abstract request via various interfaces that the request abstraction service may provide. The abstract request may be programmatically sent as a request message targeting a defined URI to a service layer's exposed interface. Another method for sending an abstract request may be implemented via one or more graphical user interfaces provided by the service layer, such as a web interface available via a network such as the Internet, a tablet, or a phone.

The RAS may decompose a received abstract request into individual parts. The RAS may also determine SL operations to be performed. The RAS may also interact with the service layer to perform the SL operations and complete the abstract request. Various components of the RAS may be defined.

Figure 7:
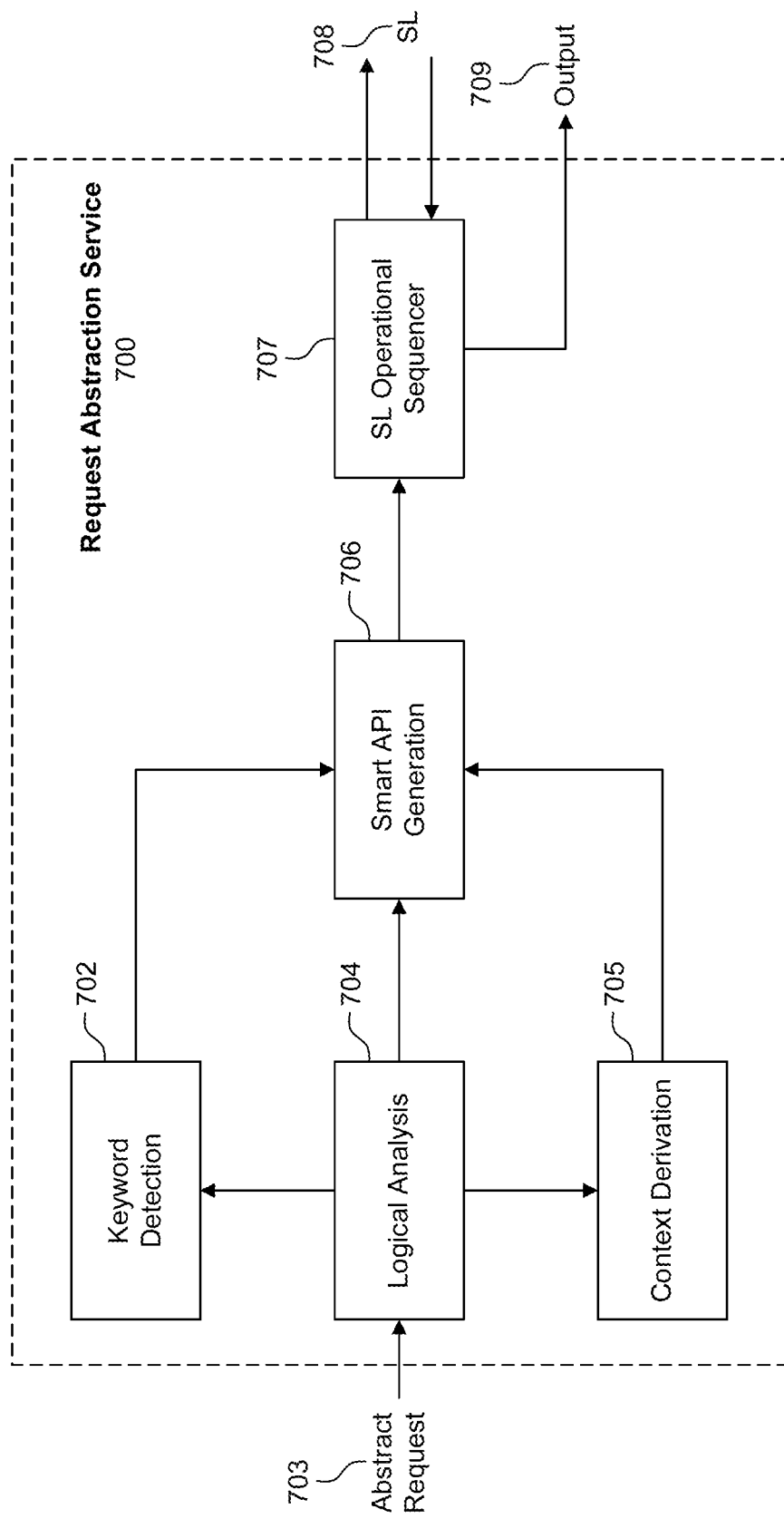
FIG. 7 illustrates example components of an intelligent request abstraction service (RAS)

FIG. 7 shows components of an example RAS 700. The RAS 700 may perform logical analysis 704 of an abstract request 703 to classify individual words of the request. A keyword detection component 702 and a context derivation component 705 may gather information about the abstract request 703. Such information may be used by an API generator 706 to generate requests to be executed by a service layer. An operational sequencer 707 may interface with the service layer 708 to execute operations that implement the abstract request and return a status or output 709 to the requestor.

Figure 8:
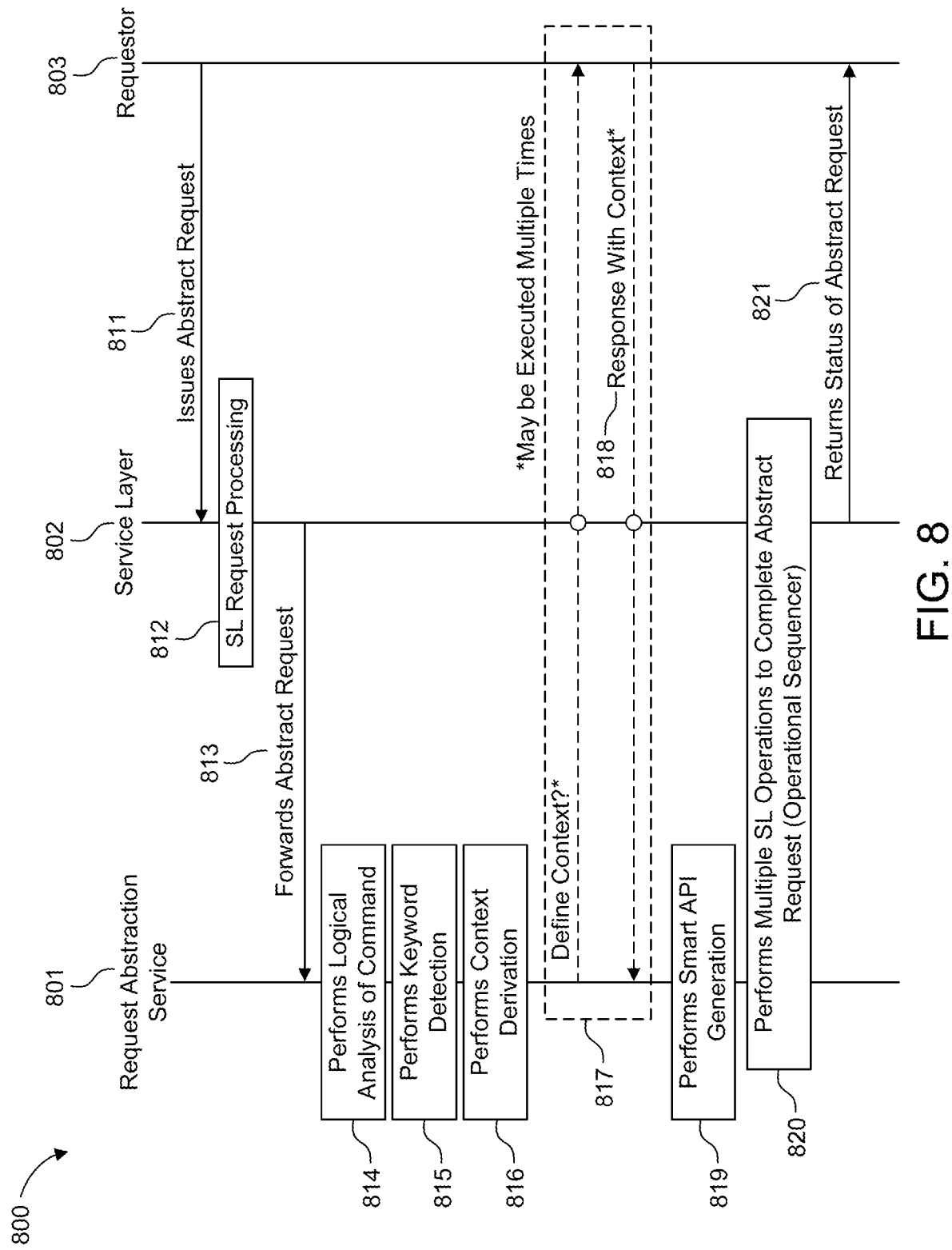
FIG. 8 illustrates an example sequence diagram for processing an abstract request.

FIG. 8 illustrates an example sequence diagram for processing an abstract request 800. Note in FIG. 8 that the RAS 801 is shown separate from the service layer 802; however, the RAS 801 may also be integrated as part of a service layer 802 or be co-located with the service layer 802.

At step 811, a requestor 803 may issue, or send, an abstract request to the service layer 802. An example of an abstract request for the smart factory use case described above may comprise issuing the following command: "Give <analyst> access to all doors in the west wing for only today".

At step 812, the service layer 802 may receive and process the request. The SL 802 may perform message validation and may also authenticate and/or authorize the requestor. Other SL-centric processing may also be performed. The service layer 802 may also structure the abstract request in the manner described above or in any other suitable fashion.

At step 813, the service layer 802 may send the abstract request to the RAS 801 for further processing.

At step 814, the RAS 801 may perform a logical analysis of the abstract request to determine the underlying terms of the abstract request. The RAS 801 may extract and separate such terms. These terms may be converted to service layer operations in later steps of the call flow. As part of the logical analysis, one or more words and/or word groups may be classified into their respective classifications, as described herein.

At step 815, the RAS 801 may send the classified words and word groups to a keyword detection unit, which may associate SL operations with the words. In addition, a request linkage relationship may be created, if such relationships are available, to sequence requests together and to generate desired output. For example, output of a resource discovery request may be linked to input of a request to create an access control policy for discovered resources. For the smart factory use case, an access control policy may be created for the doors located on the west wing of the smart factory.

At step 816, the logical analysis output may further be used to determine context about the abstract request. Such context may be used by the smart API generator to determine a favorable manner in which to sequence the SL operations that are to be performed. Contexts such as the number of resources, identifiers and names, time duration, and desired locations may be determined and used in the smart API generation.

Steps 817 and 818 may be performed when an element of the abstract request is not recognized and/or when context information (e.g., location or time information) is missing from the abstract request.

At step 817, the RAS 801 may prompt the requestor, via the SL, to provide the context or context information in question.

At step 818, the requestor 803 may respond with a recognizable context definition. Note there may be multiple iterations of steps 817 and 818 if more than one context is not able to be determined from multiple elements of the abstract request and/or if additional context information is missing (e.g., location, time). For example, the abstract request, "Give <analyst> access to all doors in the west wing" may be determined to be missing a time component required for the access control policies to be created. The RAS may prompt the requestor for a time duration to apply to the access control policies when the access control policies are created. The requestor may provide a value in a response message or may decline the request and let the service layer assign a default value for cases in which the requested context is optional. If context is not provided for mandatory elements, the RAS may generate an error, abort operations, and jump to step 11.

At step 819, the smart API generator may determine how to sequence the SL operations. The smart API generator may also determine input arguments needed for each request, if any. The smart API generator may perform such determining by using results from the logical analysis, keyword detection, and context derivation components determined from steps 4-6, as well as information provided by the requestor in step 8. The smart API generator may link SL operations together to generate the desired output. Note, however, that the operations of the smart API generator may be limited by capabilities of the service layer regarding API construction. For service layers without support for flexible APIs, the smart API generator may be limited to executing functions of the available APIs and performing post processing to generate the desired results. For service layers that may support flexible APIs or the advanced operations of an RAS, additional operations may be possible, e.g., the output of an SL operation may be forwarded to the input of another SL operation.

At step 820, the smart API generator may interface with the service layer 802 to execute the operations that were generated in the previous steps. An operational sequencer may be used to manage the interactions with the service layer. There may be multiple interactions between the operational sequencer and the service layer. In the case the RAS is integrated with the SL 802, the interactions may occur internally within the service layer 802.

At step 821, the results of step 820 may be returned to the requestor 803 with an appropriate status. Such results may be sent from the RAS via the service layer to the requestor in a response message. The response message may also include indications of what actions were performed and one or more results associated with those actions. If the operations of step 10 were successful, appropriate service layer resources may have been created. In those cases, a list of SL resource URIs that were created, updated, or deleted may be sent to the requestor. If the operations from step 10 were unsuccessful, the RAS may provide detailed information of the sequence of operations and at what point the failure occurred.

An interface to the RAS may be utilized by a requestor to provide contextual inputs used in processing abstract requests. Such an example utilization is shown in steps 817 and 818 of FIG. 8. Individual requests to provide contextual data may also be made separately as standalone abstract requests and such contextual data may be stored by the RAS for use in processing future requests. For example, the RAS may store the contextual data as rules of a policy or within lookup tables of the context derivation component. Contextual inputs may also include new terms that may be added to the keyword detector for identifying associated SL operations. The new context information may then be used and referenced in future abstract requests. For example, context information about the location of the west wing of the smart factory may be provided to the RAS during initial deployment. The boundary of the smart factory may be established using geofence data, and the western part of the smart factory may be defined as one or more locations within the geofence area. A requestor may also provide, to the RAS, the coordinates of a GPS device to define the area covered by the west wing of the smart factory. Such interactions with the RAS may be performed using abstract requests as described herein, where such requests may add contextual information to the RAS rather than request the RAS execute one or more operations on the SL. For example, the abstract request, "Define the area for the west wing to be <geofence data> in the context derivation component" may be used to configure the geofence area for the west wing of the smart factory.

Context information may also be provided by a requestor for terms that may allow the RAS to recognize those terms when those terms are used in future abstract requests. Such context information may be stored in the context derivation component to identify words that may infer associations or references to SL resources or parameters. For example, in addition to the geofence data provided for the "west wing", the term "west wing" may also be categorized as a location. Categorizing the term as a location may indicate a need to utilize location services within the SL. Similarly, various time formats, such as hh:mm:ss, may be defined in the context derivation component that may be associated with time functions. Other contextual information may be provided to the RAS to improve the detection of contextual information.

A requestor may issue an abstract request to an RAS at a higher level of abstraction than that described in existing SL architectures. Such requests may use language constructs that may be used to infer the execution of SL operations on behalf of the requestor. Because these abstract requests may be used to direct actions to be performed by the service layer, only a subset of language constructs may be utilized to issue commands.

A text-formatted abstract request may be routed to the logical analysis component to separate words within the request. Resulting words may be classified into an appropriate word class (e.g., parts of speech) such as nouns, verbs, adjectives, adverbs, prepositions, conjunctions, etc. Such classifications may be performed individually for each word.

The logical analyzer may perform an additional type of classification based on sentence structures, such as clauses and phrases. For such classifications, groups of words may be combined to form either clauses or phrases. The logical analyzer may determine how such word groups are formed to detect and label appropriate word groups. For example, a phrase may be a group of related words that may begin with a preposition and may end with a noun, while a clause may be a group of related words that includes both a subject and a verb. Using such definitions, the logical analyzer may group words into classifications. Table 1 shows examples of classifications performed by a logical analyzer for the example abstract request, "Give <analyst> access to all doors in the west wing for only today".

TABLE 1

Examples of Logical Analysis Classification Types

| Word | Word Classification | Word Group Classification |
|---|---|---|
| Give | Verb | Clause |
| <analyst> | Noun | |
| Access | Noun | |
| To | Preposition | Phrase |
| All | Adjective | |
| Doors | Noun | |
| In | Preposition | Phrase |
| The | Determiner | |
| West | Adjective | |
| Wing | Noun | |
| For | Conjunction | Phrase |
| Only | Adjective | |
| Today | Noun | |

The keyword detection and association component may determine appropriate service layer operations that are inferred by the abstract request. Because the requests are made at a higher level of abstraction, there may be implicit references to multiple SL operations that may not be readily obvious on initial observation. For example, the abstract request, "Give <analyst> access to all doors in the west wing for only today" may imply that multiple SL operations are required to carry out the abstract request—there are requirements for discovery of resources and for the creation and/or updating of resources. To accomplish such requirements, the keyword detector may be programmed to recognize keywords that may be associated with service layer operations. Table 2 shows examples of words the keyword detector may recognize and associate with SL operations. Notice the terms "Associate" and "Define" are used for abstract requests that update contexts in the Request Abstraction Service rather than perform SL operations. With the use of such terms, additional words may be added to the RAS to allow the support of a broader set of vocabulary the requestor may utilize in future abstract requests.

TABLE 2

Examples of Keyword Association to SL Operations

| Keyword | SL Operation |
| --- | --- |
| Associate | Update (Request abstraction Service) |
| Define | Update (Request abstraction Service) |
| Find | Discovery |
| Discover | Discovery |
| Add | Create |
| Create | Create |
| Give | Create/Update |
| Get | Retrieve |
| Retrieve | Retrieve |
| Update | Update |
| Modify | Update |
| Delete | Delete |
| Remove | Delete |
| Destroy | Delete |

Using both the keyword association and the classifications provided by logical analysis, the keyword detector may be able to determine potential SL interactions required to execute an abstract request. The classification of verbs may determine SL operations that may be required, such as resource discovery, performing CRUD operations on a resource, enabling or disabling a function, etc. Noun classifications may determine an SL entity, resource, attribute, or meta-data to be operated on. The keyword detector may first identify clauses reported by logical analysis to locate verbs that may be used to determine one or more appropriate SL operations for the abstract request. Then, the keyword detector may locate nouns to identify service layer entities that the verbs may apply to and annotate them as "objects". Objects may be further classified as main or secondary—main objects may be objects found in clauses while secondary objects may be objects found in phrases. Main objects may not already exist in the service layer in some cases as they may be the objects in question for the abstract request, while secondary objects may be assumed to already exist in the service layer. Table 3 shows examples of keyword classifications for the example abstract request described above.

TABLE 3

Examples of Keyword Classification

| Word | Keyword Classification |
| --- | --- |
| Give | Operation |
| <analyst> | Subject |
| Access | Object (main) |
| To | — |
| All | Descriptive Data |
| Doors | Object (secondary) |
| In | — |
| The | — |

TABLE 3-continued

Examples of Keyword Classification

| Word | Keyword Classification |
| --- | --- |
| West | Descriptive Data |
| Wing | Object (secondary) |
| For | — |
| Only | Descriptive Data |
| Today | Object (secondary) |

After performing keyword classification, the keyword detector may perform an evaluation to determine a subject and predicate of the abstract request. The subject and predicate may typically be found in a clause. Identification of the subject and predicate may allow the smart API generator to generate SL operations associated with the desired operations and for the desired subject. For example, data identified as the subject may be used to perform access control checks, be part of a filter criteria in a resource discovery request, or be a value to a resource attribute. Identification of the predicate may be used to identify the underlying SL operation forming the basis of the abstract request.

A context derivation component may be responsible for examining descriptive terms that may infer associations between operations and resources. Such a component may focus on word classifications of prepositions and conjunctions. These word classes may infer relationships between nouns and offer clues for how service layer operations may be combined together. The context derivation component may also examine word classifications of adjectives and adverbs to determine attributes such as quantity, time, location, etc.

To achieve some level of inference, context derivation terms may be configured in the request abstraction service to indicate relationship and/or operational sequences when used in an abstract request. Table 4 shows some example terms that may be used in obtaining context of words in an abstract request. For example, the presence of the term "before" may refer to the order SL operations are executed in or to a comparison to some date or time. The derived context may also depend on the proximity of other terms in the abstract request. The abstract request "delete all subscription resources before Sep. 7, 2018 and owned by <user name>" shows that "before" is followed by a term that resembles a date; therefore, the RAS may determine that a comparison to that date is required. Additional terms may be added to the Request Abstraction Service as previously mentioned to allow the RAS to better recognize contextual relationship and/or operational sequencing. Such terms may be evaluated for potential links between nouns and the accompanying phrases that follow. In some cases, order of operations may be inferred; in other cases, operations may be combined or checked against each other.

TABLE 4

Examples of Context Derivation Terms

| Word | Context |
| --- | --- |
| And | May infer combinations |
| Or | May infer alternatives |
| For | May refer to a time duration |
| After | May infer to a sequence or time |
| Before | May infer to a sequence or time |
| If | May infer a check is required |

TABLE 4-continued

Examples of Context Derivation Terms

| Word | Context |
|---|---|
| In | May infer to a location or time |
| Once | May infer a preceding condition or event; May infer a quantity (one time) |
| Than | May infer a comparison |
| When | May infer a time or sequence |
| Where | May infer a location or condition |
| Off | May infer a state |
| On | May infer a state |
| Past | May infer a time |
| Since | May infer a time |
| To | May infer a destination |
| Under | May infer comparison or location |
| Until | May infer to a time or event |
| With | May refer to inclusion |

The context derivation component may perform an initial pass of the abstract request to determine potential relationships or sequencing order implied by the abstract request. Using the logical analysis outputs, the context derivation component may create a matrix between entries contained within a clause and between entries in phrases in the abstract request. Table 5 shows an example matrix relating the words in the example abstract request described above. Within the clause, the matrix shows potential links between both "Give" and "<analyst>" and "Give" and "Access". Potential links are indicated in Table 5 with an "X" placed in the cells of a column under the Contextual Relationship Matrix. Each column of the matrix may indicate a separate relationship. In the first column, the cells associated with "Give" and "<analyst>" have an "X" and therefore, they are potentially related. The cells associated with "Give" and "Access" each have an "X" in the second column, indicating that they too may be related. Similarly, the matrix shows that "Access" may be related to each of the phrases found in the abstract request. To accomplish this, the context derivation component may be programmed with guidelines on language construction to recognize subject-predicate pairings, predicate-object pairings, and prepositional phrase relationships with adjacent nouns.

TABLE 5

Examples of Contextual Relationship Matrix

| Word | Word Group Classification | Contextual Relationship Matrix | | | | |
|---|---|---|---|---|---|---|
| Give <analyst> | Clause | X | X | | | |
|  |  | X |  |  |  |  |
| Access |  |  | X | X | X | X |
| To All Doors | Phrase |  |  | X |  |  |
| In The West Wing | Phrase |  |  |  | X |  |
| For Only Today | Phrase |  |  |  |  | X |

The context derivation component may also perform another evaluation to determine one or more inferences of phrases to nouns in the clause. The classification may include object, location, and time relating to a particular noun. A profile of terms for each of these classifications may be provided to the RAS to make this determination. The RAS may also use knowledge of prepositional terms to aid in determining the inference of phrases. For example, a prepositional phrase that starts with "at" may infer a location, while a phrase that starts with "during" may infer a time. Table 6 shows examples of phrase inferences of the aforementioned abstract request.

TABLE 6

Examples of Phrase Inferences

| Word | Word Group Classification | Phrase Inference |
|---|---|---|
| Give <analyst> Access | Clause | — |
| To All Doors | Phrase | Object |
| In The West Wing | Phrase | Location |
| For Only Today | Phrase | Time |

The context derivation component may also examine the logical analysis outputs for descriptive terms that may be used as qualifiers in service layer operations. Such an examination may include identification of adjectives and adverbs that may be used as search criteria in SL operations. Table 7 shows some examples of qualifiers that may be assigned during this examination.

TABLE 7

Examples of Qualifier Detection

| Word | Word Group Classification | Qualifier |
|---|---|---|
| Give <analyst> Access | Clause | — |
| To All Doors | Phrase | Quantity |
| In The West Wing | Phrase | Direction |
| For Only Today | Phrase | Quantity |

As described above, context may be added dynamically by sending the RAS a standalone, abstract request using keywords such as "Define" or "Associate". Other keywords may also be specified to indicate contextual updates in the RAS. Such keywords may be stored in a profile or in a look up table that the context derivation component uses to add context to the abstract request. The keywords may be added using the same abstract request structure as described above. For example, the abstract request "Associate locks to doors in the context derivation component" may link locks to doors and add this association in the context derivation component. Other examples may include, "Define west as a location in the context derivation component" or "Define 20180425T160632 as a unit of time".

Figure 9:
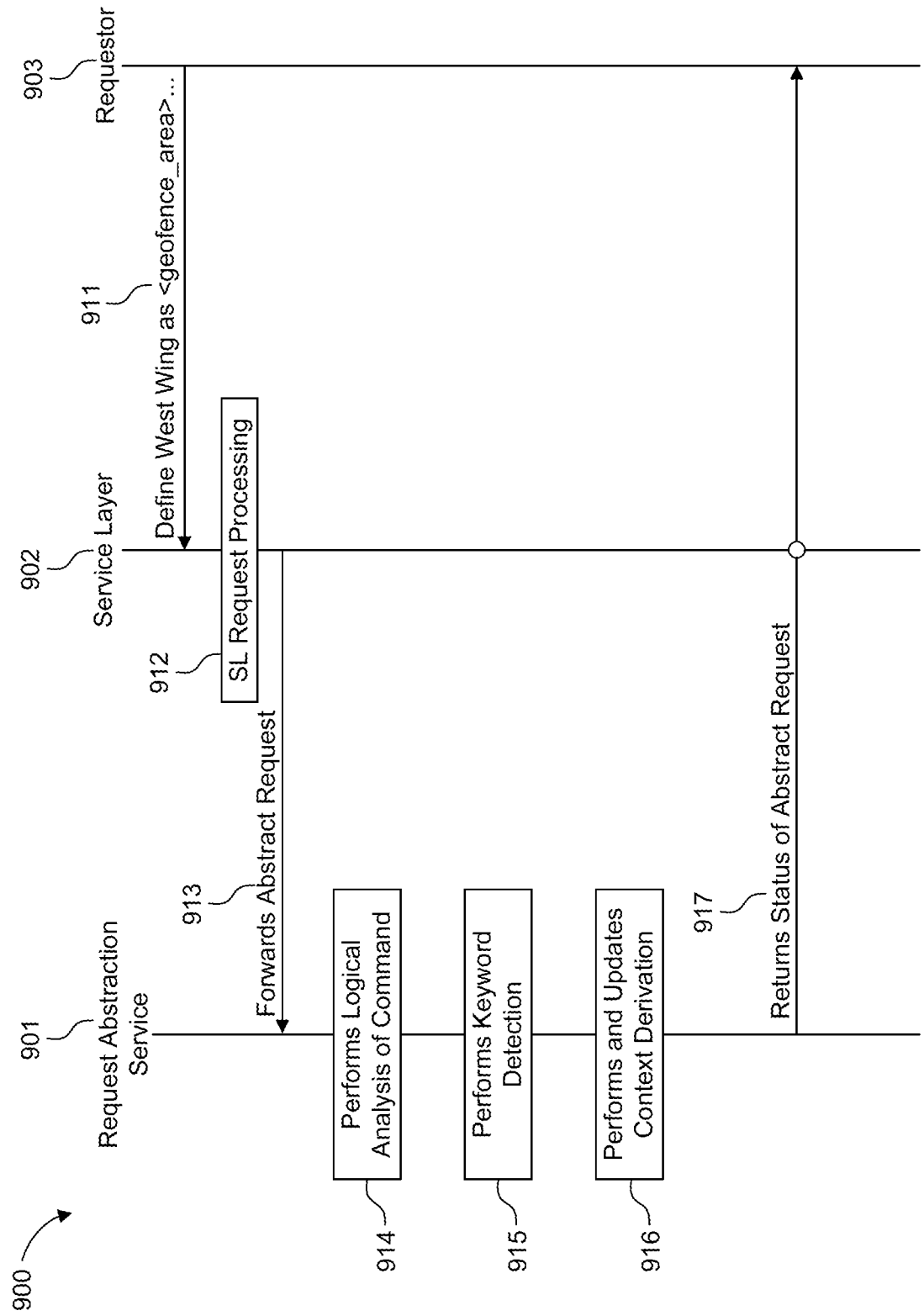
FIG. 9 illustrates an example sequence diagram for adding contextual information to an RAS.

FIG. 9 shows an example call flow 900 in which a requestor makes an abstract request to add contextual information to the RAS. Notice that the abstract request uses the term "Define" to indicate the request is targeting an addition or update of contextual information in the RAS 901 rather than a request to initiate SL 902 operations.

At step 911, a requestor 903 may issue an abstract request, "Define west wing as <geofence_area> in context derivation component." This request follows the generic abstract request structure definition, described herein, but uses a command predicate "define" to indicate this is a contextual update rather than a request for one or more SL 902 operations. Thus, the abstract request may update information managed within the Request Abstraction Service only, and no SL 902 operations may be performed.

Steps 912 to 915 may be performed similarly to steps 812-815 of FIG. 8.

At step 916, due to the command predicate being set to "define", the context derivation component may determine this is a request to add or update contextual information in the RAS 901. The abstract request from step 911 specifies the target as the context derivation component. However, other RAS components may also be specified, and an update would also be made in the appropriate component.

At step 917, with the assistance of the service layer, the RAS 901 may return an appropriate response to the requestor indicating the status of the update.

In another example, the Request Abstraction Service may prompt requestors for contextual information if a certain term is not recognized by the RAS.

Figure 10:
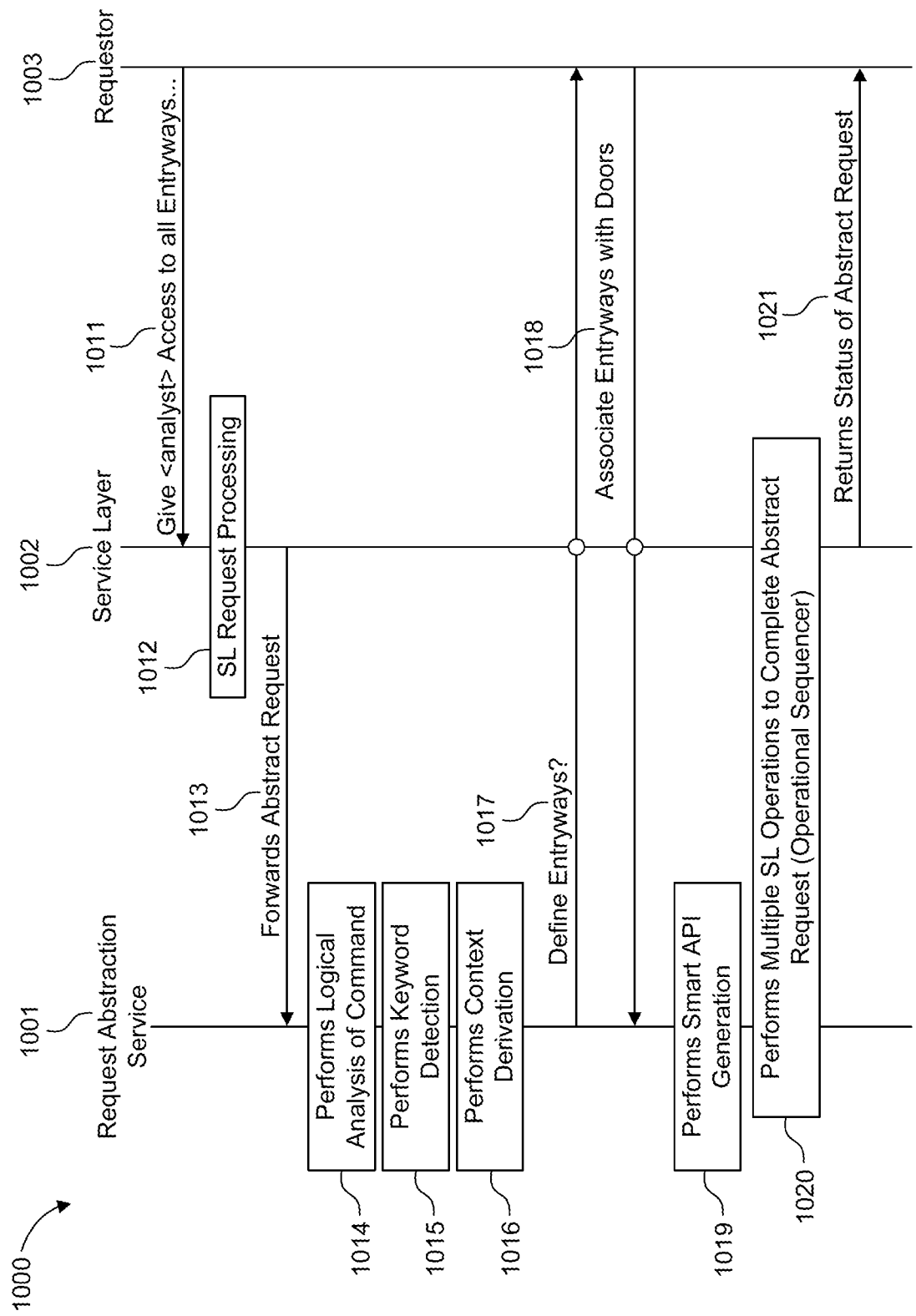
FIG. 10 illustrates an example sequence diagram for requesting contextual information by an RAS.

FIG. 10 shows an example call flow 1000 in which the RAS does not recognize the term "entryways" and prompts the requestor to define such a term. The abstract request in this example is, "Give <analyst> access to all entryways in the west wing for only today." Here, the term "entryways" has replaced the previous term "doors" used in the abstract request of FIG. 9.

At step 1011, a requestor 1001 may issue an abstract request, "Give <analyst> access to all entryways in the west wing for only today."

Steps 1012 to 1016 may be performed similarly to steps 812-816 of FIG. 8.

At step 1017, in this case, the RAS 1001 may not recognize the term "entryways" and may be unable to determine an appropriate context. As a result, the RAS 1001 may prompt the requestor 1003 with the assistance of the service layer 1002 to define the term "entryways".

At step 1018, in response, the requestor 1003 may return an abstract request, "Associate entryways with doors." This request uses the keyword "Associate" and hence, the RAS 1001 may determine that this abstract request may apply to an update of contextual information. The RAS 1001 may then add the context that "entryways" may be associated with "doors", which may have already been associated with "locks". As a result, the RAS 1001 may be able to continue processing the request.

Steps 1019 to 1021 may be performed similarly to steps 819-821 of FIG. 8.

Classifications performed by logical analysis, keyword detection, and context derivation components may be routed as inputs to a smart API generation component. The determinations made by the aforementioned components may be combined together to generate appropriate service layer operations that may achieve the desired results for the abstract request. Before arriving at the result, the smart API generation may perform a decomposition of the abstract request, as shown in Table 8. Such a decomposition may include separating a predicate, subject, objects, location, and/or time information found in the abstract request.

TABLE 8

Example of Abstract Request Decomposition

| Clause Decomposition | Command Word(s) |
|---|---|
| Predicate | Give |
| Subject | <analyst> |
| Objects | Access, to all doors |
| Location | in the west wing |
| Time | for only today |

Using the decomposition of the abstract request and the input classifications, the smart API generator may be able to generate corresponding SL operations, as shown in Table 9. For identified subjects and/or objects, resource discovery requests may be made to check for one or more resources associated with those subjects and/or objects at the SL or otherwise available to the SL. If the one or more resources do not exist, the smart API generator may generate SL operations to create such resources. If there is a time modifier in the abstract request, the time modifier may be used to set an expiration time for such resources. Note that resources may be created for the subject and the main object that the abstract request applies to. Other secondary objects in the abstract request may be assumed to already exist and may have resources associated with them.

TABLE 9

Example of Smart API Generation

| Objective | Required operation |
|---|---|
| Find Subject | Find <analyst>, Create <analyst> user |
| Find Object1 (main) | Find <access control policy> for {$Subject} |
| Find Object2 (secondary) | Find <locks> in {$Location Modifier} |
| Location Modifier | <Location Service> |
| Time Modifier | <Time Service> |
| Predicate Operation | Create/Update |
| Main Object | {<access control policy>} |
| Secondary Object | {$Object2} |
| Time Duration | {$TimeModifier} |

Location and time modifiers may be applied to objects, as specified by the contextual relationship matrix. The modifiers' respective values may be provided by Location and Time services, respectively. Such services may be services offered by the service layer that may be called to provide values indicative of the corresponding terms. For example, "west" may provide a direction for the general location of the factory, and "only today" may define a time duration that expires at the end of the day. Corresponding service(s) provide the appropriate values that may be used when executing the predicate operation.

The predicate operation may be executed upon completion of the preceding operations, such as those listed in Table 9 for the example abstract request described above. Functionality of the predicate operation may depend on the outcome of the preceding operations. For example, if the Main Object exists at the SL, then the operation may be an Update operation (i.e., to update the main object); if the Main Object does not exist at the SL, then the predicate operation may be a Create operation (i.e., to create the main object). Information about the sequence of operations may be sent to the operational sequencer to interact with the service layer. If there is a service that supports such functionality at the SL, the information may be provided to that service with the list of SL operations.

After the APIs are generated for the appropriate service layer operations, the smart API generator may send information to the operational sequencer to sequence or structure the operations. The operations may be sequenced via use of a sequencing table. An example sequencing table using the above-described abstract request is shown in Table I 0, which shows the operational sequence of the SL operations the RAS may create to fulfill the abstract request. The requests may be structured such that retrieve operations and resource discovery operations may be performed before create or update requests are performed. The requests at the end of the sequence may be requests specified by the predicate operation, such as those from Table 9 with respect to the example abstract request. Requests that may require multiple interactions with the service layer may have an "N" indication in the Multiplicity column of the operational sequencing table, as shown in Table 10. The Success and Failure columns of the sequencing table may be states that the RAS uses to proceed from one request to another request.

TABLE 10

Example of SL Operational Sequencing Table

| Operations List | SL Operation | Multiplicity | Success | Failure |
|---|---|---|---|---|
| 1 | Get <Location> | 1 | 2 | End |
| 2 | Get <Time> | 1 | 3 | End |
| 3 | Find <analyst> | 1 | 5 | 4 |
| 4 | Create <analyst> | 1 | 5 | End |
| 5 | Find <locks> {<Location>} | 1 | 6 | End |
| 6 | Find <access control policy> {<analyst>, $5} | N | 8 | 7 |
| 7 | Create <access control policy> {$5, $2} | N | 8 | End |
| 8 | Update ACPIDs {$5, $2} | N | End | End |

When the operational sequencer encounters an "End" in the operational sequencing table, interactions with the service layer may terminate, and a status code may be returned to the requestor. For example, the operational sequencer receiving a success response for operation 8 may signify that the abstract request was executed successfully. However, if the response was a failure, then the abstract request may not have executed successfully. Further, if a failure response was received for operations 1, 2, 4, 5, and/or 7, the operational sequencer may promptly exit and may report the associated error to the requestor indicating where the failure occurred. For example, when creating a resource for the <analyst> in operation #4, if the service layer returns a failure response, the operational sequencer may stop operations and return the error status to the requestor. The Request Abstraction Service may also include status of previous requests in the operational sequence. Note that if resources were created or updated and the operational sequencer has to abort operations due to a failed response, the RAS may undo changes made to those resources and/or delete the resources. The undoing of changes may be achieved with support of this feature within the service layer or via a service that handles such operations.

Figure 11:
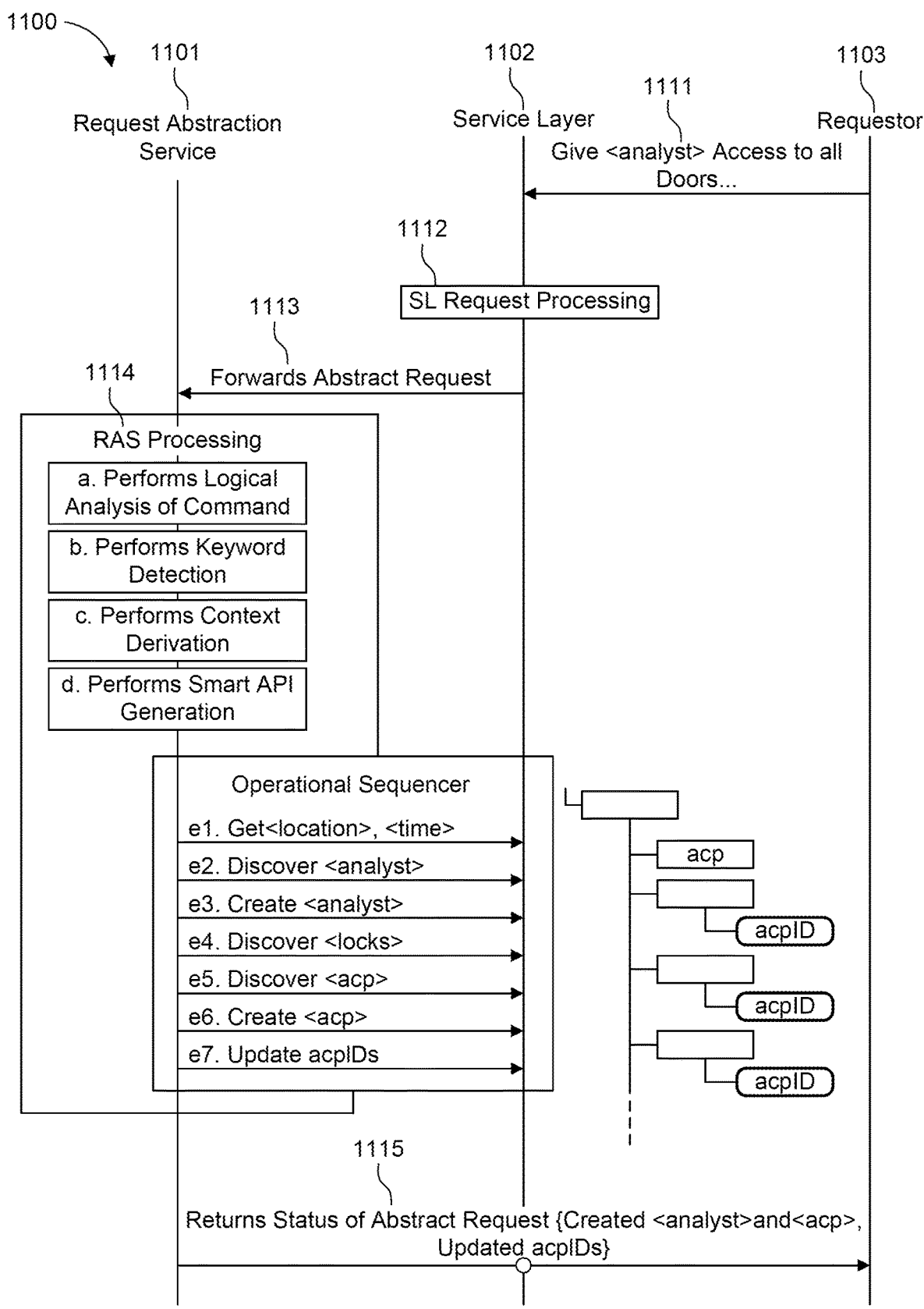
FIG. 11 illustrates an example call flow of interaction between a component of an RAS and a service layer.

FIG. 11 shows an example sequence of operations 1100 that may be performed by the operational sequencer for the request sequence shown in Table 10. Note that the operational sequence shown in FIG. 11 assumes all requests executed successfully.

At step 1111, a requestor 1103 may issue an abstract request, "Give <analyst> access to all doors in the west wing for only today."

Steps 1112 to 1113 may be performed similarly to steps 812-813 of FIG. 8.

At step 1114, processing within the RAS 1101 may be performed similarly to steps 814-819 of FIG. 8, disregarding steps 817-818 of FIG. 8 when the RAS 1101 prompts the user for additional context. The operations of the operational sequencer are shown explicitly in FIG. 11 as steps e1-e7. The sequence follows that of Table 10, where an <analyst> resource may be created along with an <acp> resource. Then the acpIDs attribute associated with each lock discovered from step e4 may be updated with the ID of the newly created <acp> resource.

At step 1115, the RAS 1101 may return an appropriate response to the requestor 1103 with the assistance of the service layer 1102 indicating that the abstract request executed successfully. In addition, the RAS may provide status of what SL 1102 operations were performed, i.e., <analyst> and <acp> resources were created, and acpIDs of lock resources were updated.

After the abstract request has been successfully executed, a resource representation may be created so that the abstract request may be reused or executed again at a later time. The created resource may comprise a virtual "ras" resource added as a child resource that a requestor may target in order to reuse the abstract request. Note that another name may be used instead of "ras" to represent the virtual resource. To reuse the saved abstract request, a requestor may target the "ras" virtual resource and may provide a new abstract request that dictates changes that may need to be made from the original abstract request. For example, the RAS may receive a request to modify a command context or object of the abstract request, and the RAS may modify the generated set of APIs to include the modified command context or object instead of the original command context or object. The Request Abstraction Service may then process the new abstract request using the contents of the original abstract request and substitute context obtained from the new abstract request.

Figure 12:
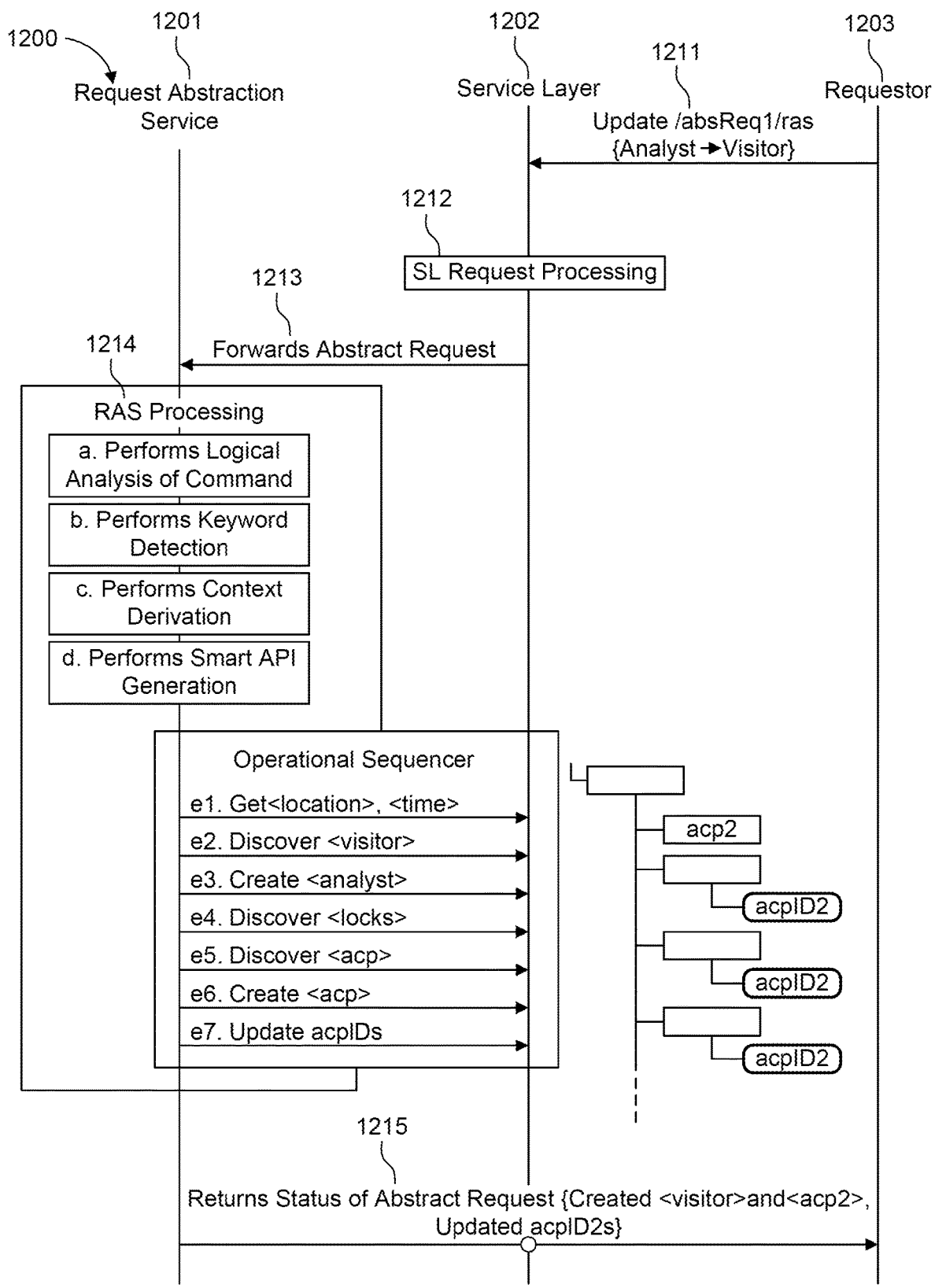
FIG. 12 illustrates an example sequence diagram for reusing an abstract request.

FIG. 12 illustrates an example sequence diagram for reusing an abstract request 1200. In FIG. 12, the abstract request, "Give <analyst> access to all doors in the west wing for only today" is reused. This abstract request has been saved as an absReq1 resource, and a virtual resource "ras" has been created automatically by the service layer as a child resource of absReq1. Additionally or alternatively, a virtual resource may not be necessary to reuse an abstract request, and the abstract request resource may be targeted directly by a requestor. A requestor 1203 would like to reuse absReq1 but with a different user ID than that used previously. Additionally, the requestor 1203 would like to substitute "analyst" with "visitor" and grant the new user access to the same area of the smart factory. The requestor 1203 may even select another area of the factory and provide that information in the new abstract request. The details of the call flow of FIG. 12 are as follows.

At step 1211, the requestor 1203 may attempt to reuse absReq1 and target URI/absReq1/ras. As described above, in example embodiments the requestor may target the resource absReq1 directly instead of the virtual resource "ras". In the request, the requestor may include a new abstract request "Replace <analyst> with <visitor>."

Steps 1212 to 1213 may be performed similarly to steps 812-813 of FIG. 8. However, instead of a new abstract request being sent to the RAS 1201, the original abstract request saved in absReq1 may be sent to the RAS with the new context information provided in step 1.

At step 1214, the RAS 1201 may process the request using the abstract request saved in absReq1 and may substitute the context obtained from the new abstract request, "Replace <analyst> with <visitor>" for the original context. References to "<analyst>" may be replaced with the new context "<visitor>". The operational sequencer may then execute steps e1-e7 with the context "<visitor>". The service layer operations may result in creation of new resources <visitor> and <acp2>, and may update the lock resources with "acpID2".

At step 1215, the RAS 1201 may return an appropriate response to the requestor 1203 with the assistance of the service layer 1202 indicating that the abstract request executed successfully. In addition, the RAS may provide status of what SL operations were performed, i.e., <visitor> and <acp2> resources were created, and acpID2s of lock resources were updated.

Example oneM2M embodiments of the introduced Request Abstraction Service functionality are described herein. Example embodiments describe one or more possible implementations of an RAS.

Example oneM2M embodiments may include the definition of an <absReq> resource that SL originators may target to initiate sending an abstract request to the intelligent request abstraction service. Example oneM2M embodiments may also include procedures to process such an abstract request.

Figure 13:
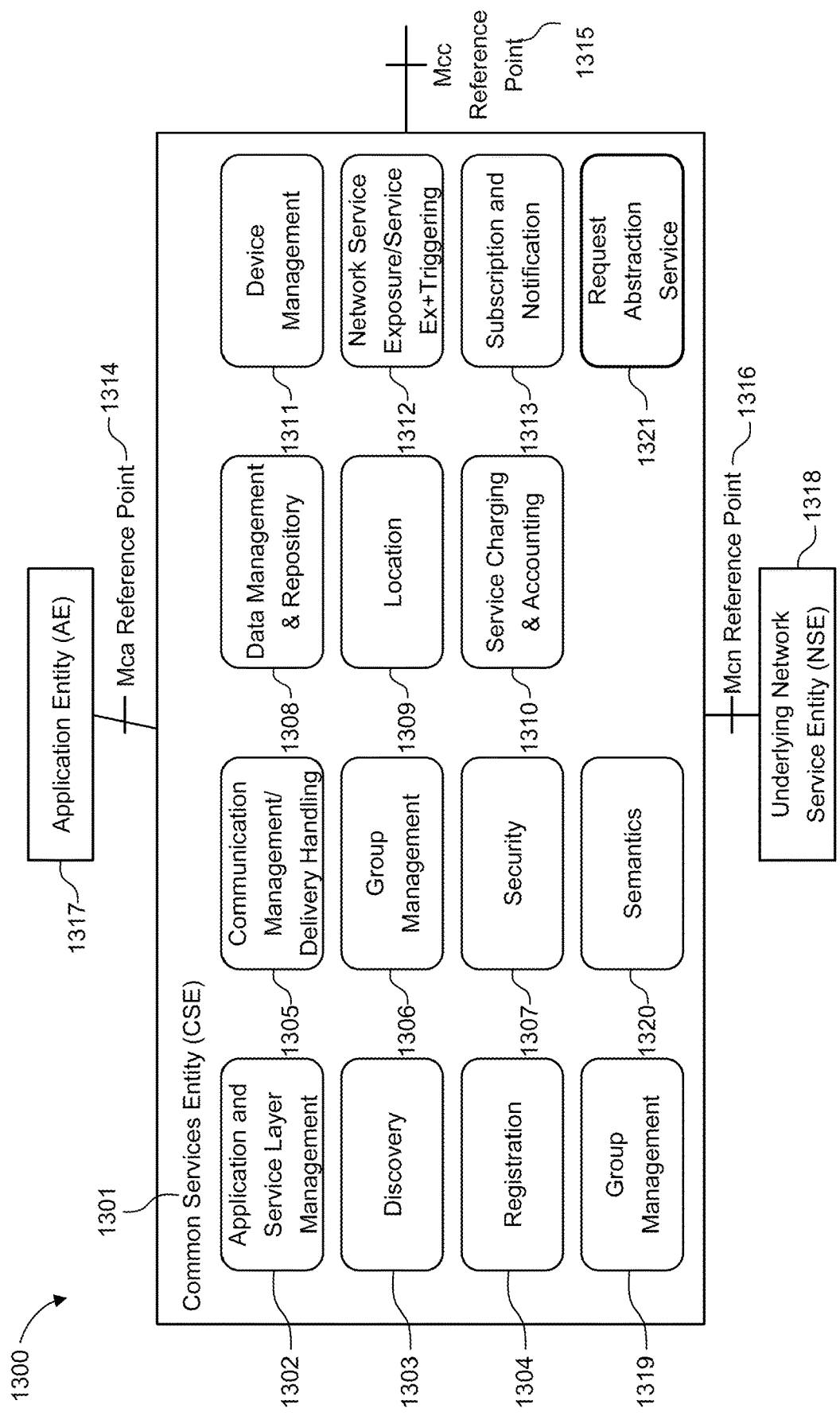
FIG. 13 illustrates an example common service entity (CSE) implementing RAS functionality.

FIG. 13 is a diagram of an example oneM2M service layer that supports a RAS CSF 1300. In the example of FIG. 13, the CSFs may include the following: Application and Service Layer Management CSF 1302; Discovery CSF 1303; Registration CSF 1304; Communication Management/Delivery Handling CSF 1305; Group Management CSF 1306; Security CSF 1307; Data Management and Repository CSF 1308; Location CSF 1309; Service Charging & Accounting CSF 1310; Device Management CSF 1311; Network Service Exposure, Service Execution and Triggering CSF 1312; Subscription and Notification CSF 1313; Group Management CSF 1319; and Semantics CSF 1320. The example of FIG. 13 also shows a CSE 1301 to interface through the Mca reference point 1314, Mcc (and Mcc') reference point 1315, and Mcn reference point 1316 to other entities including but not limited to: an AE 1317; other CSEs; and an NSE 1318 (i.e. the underlying network).

As shown in FIG. 13, the RAS CSF 1321 may be implemented as a new CSF that implements the RAS functionality as described herein. RAS functionality may also be realized as a capability of existing oneM2M CSFs. The RAS may be used within the CSE to interface to other CSFs and execute operations to complete an abstract request.

In a oneM2M embodiment, the <absReq> resource may provide a mechanism for an originator to specify an abstract request to the CSE. The abstract request may comprise at least three parts: cmdPredicate, cmdObjects, and cmdContexts. The cmdPredicate may comprise a description of a high-level operation the originator would like to execute. The cmdObjects may comprise one or more identifiers of CSE resources that the cmdPredicate may affect. The cmdContexts may comprise contextual information that applies to the abstract request. Contextual information may comprise one or more of location, time, or quantity that are applicable to the desired operation. Table 11 shows an example of resource specific attributes for an <absReq> resource.

TABLE 11

Example oneM2M <absReq> Resource Attributes

| Attributes of <absReq> | Multiplicity | RW/ RO/ WO | Description | <absReqAnnc> Attributes |
|---|---|---|---|---|
| Universal and common attributes | * | * | See clause 9.6.1.3 of oneM2M TS-0001, Functional Architecture, V3.9.0 | OA |
| cmdPredicate | 1 | RW | A verb used to describe what operations are requested by the abstract request. | OA |
| cmdObjects | 0 . . . 1 (L) | RW | One or more objects applicable to the abstract request. | OA |
| cmdContexts | 1 (L) | RW | Contextual information (e.g., one or more of location, time, quantity, etc.) that applies to the abstract request. | OA |

An example create procedure of an <absReq> resource is shown in Table 12. Such a procedure may comprise the create procedure defined by oneM2M, with the added processing of resource specific attributes for the <absReq> resource. Processing at the receiver CSE may encompass the mechanisms described herein to process an abstract request. Procedures for update, retrieve, and delete may comprise the corresponding procedures for those methods as defined by oneM2M, respectively.

TABLE 12

<absReq> procedure via Create Operation
<absReq> CREATE

| | |
|---|---|
| Associated Reference Point | Mca, Mcc and Mcc'. |
| Information in Request message | All parameters defined in table 8.1.2-3 in oneM2M TS-0001, Functional Architecture, V3.9.0 apply with the specific details for:<br>Content: The resource content shall provide the information listed in Table 11. |
| Processing at Originator before sending Request | According to clause 10.1.3 in oneM2M TS-0001, Functional Architecture, V3.9.0. |
| Processing at Receiver | According to clause 10.1.3 in oneM2M TS-0001, Functional Architecture, V3.9.0, with the following specific processing:<br>Perform logical analysis of abstract request for word classification.<br>Detect keywords and associate them to service layer operations.<br>Derive contexts from abstract request.<br>Generate appropriate service layer requests to execute abstract request.<br>Return appropriate status of service layer requests to originator.<br>The Hosting CSE may parse resource specific attributes provided in the request and may perform logical analysis of the attributes. Logical analysis may comprise word classification into appropriate word class (or parts of speech) and may also comprise classification of groups of words into clauses and phrases. Next, the Hosting CSE may determine keywords of the abstract request and may associate the keywords to appropriate CSE request(s). The Hosting CSE may determine context from the classification(s) to extract information about time, location, and/or multiplicity regarding the request(s). Finally, the Hosting CSE may combine word classifications, keyword associations, and context derivations to form a set of CSE requests. Such requests may then be executed within the CSE and may be controlled by an operational sequencer to ensure the requests are successfully executed. Upon the completion of the requests, the Hosting CSE may respond to the Originator with the appropriate status codes of each of the executed requests. |
| Information in Response message | All parameters defined in table 8.1.3-1 in oneM2M TS-0001, Functional Architecture, V3.9.0 apply with the specific details for:<br>Contains the status codes of each request executed by the Hosting CSE.<br>Contains list of resource and attribute URIs that were created, updated, or deleted by the Request Abstraction Service |
| Processing at Originator after receiving Response | According to clause 10.1.2 in oneM2M TS-0001, Functional Architecture, V3.9.0. |
| Exceptions | According to clause 10.1.2 in oneM2M TS-0001, Functional Architecture, V3.9.0, with the following:<br>The Abstraction Criteria is not generated in the appropriate format. |

To enable the reuse of the <absReq> resource, a virtual resource <ras> may be created as a child resource of the <absReq> resource. An Originator may target such a virtual resource to initiate a new abstract request using the contents of the original abstract request that is saved in <absReq>. The new abstract request may include new context information that may replace the existing context information in <absReq>. For example, an Originator may target the following URI, /cse01/absReq2/ras, to reuse the abstract request saved in absReq2. In the new abstract request, the Originator may specify "Replace user1 with user2". If the original abstract request was "Give user1 access to all mgmtObj resources", then the RAS may process the new abstract request as "Give user2 access to all mgmtObj resources" after performing the replacement. Additionally or alternatively, the new abstract request may be provided in a request parameter while the request targets the <absReq> resource that is to be reused, e.g. /cse01/absReq2.

Figure 14:
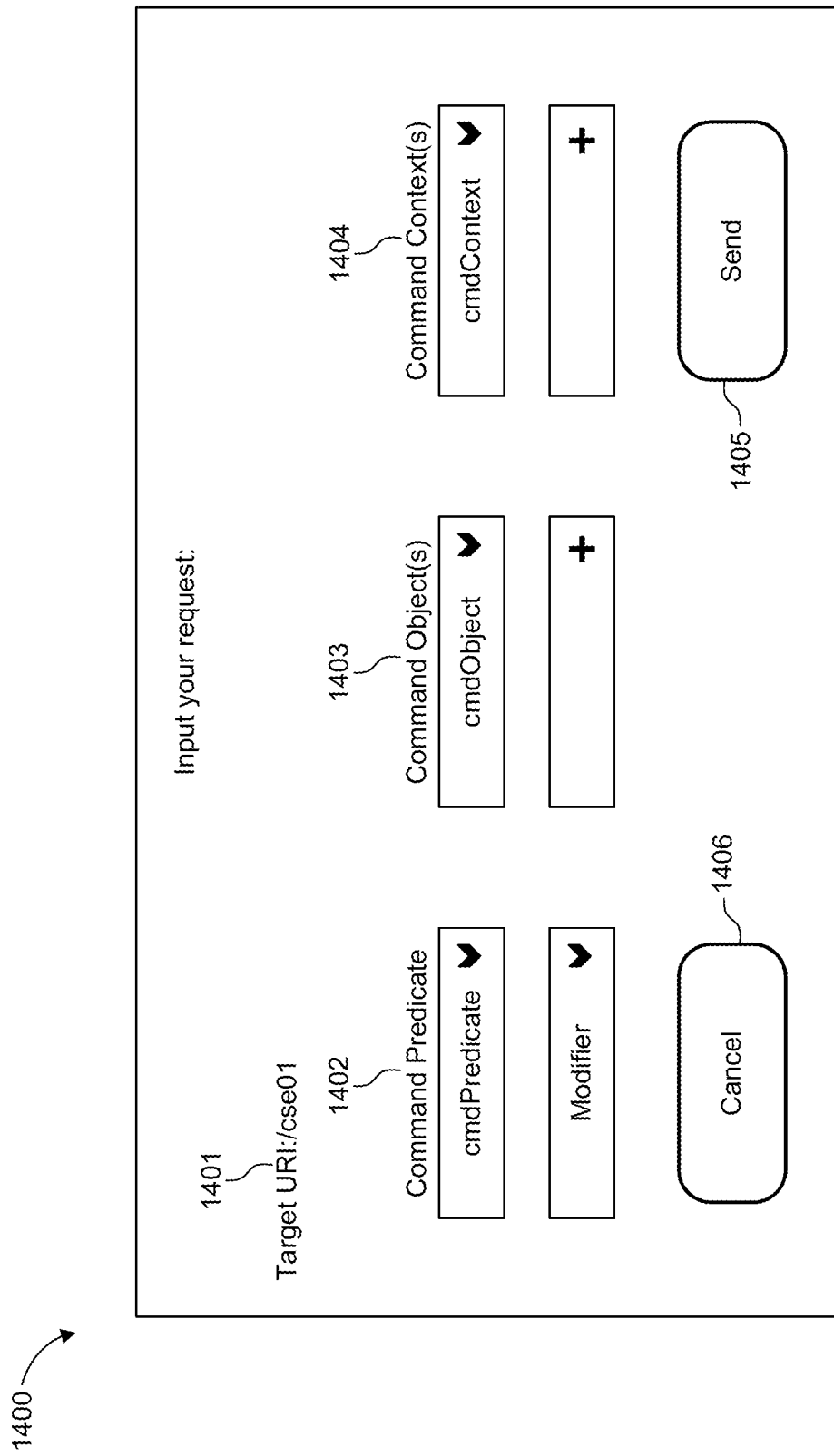
FIG. 14 illustrates an example graphical user interface (GUI)

FIG. 14 shows an example user interface 1400 a service layer may provide to users for inputting an abstract request. A user interface may be implemented to assist a user with configuration and input of an abstract request. The user interface poses the title "Input your request:" and may display the target URI where the abstract request will be created. In FIG. 14, the hosting CSE has a name of "cse01" 1401. The format of the abstract request may be displayed across the main part of the user interface with the headings, "Command Predicate" 1402, "Command Object(s)" 1403, and/or "Command Context(s)" 1404. Under each of the headings may be a respective dialog box with a down arrow to allow a user to select recognizable entries for each heading. Upon pressing on the down arrow, another window may open to display a menu of selectable entries. The user may then scroll through the entries and may select an entry of interest. The user may also input a new entry. Under both the "Command Object(s)" and "Command Context(s)" headings may be additional dialog boxes that may allow a user to add more entries to the selection menus. A user may select the + symbol to enter another entry for the associated heading. To the left of these dialog boxes may be an option to specify one or more modifiers to combine the abstract expression attributes together into an abstract request. At the bottom are two buttons that may allow the user to either send the abstract request or cancel submitting the abstract request. After a user presses the Send button 1405, the Request Abstraction Service may begin processing and perform the RAS procedure shown in FIG. 8. The user may also cancel the process via the cancel button 1406.

Methods and apparatuses are also described herein for a service layer framework for integrating generic and functional user interfaces as services managed by the SL on behalf of requesting entities. The following is a list of definitions of terms as used herein for this aspect of the disclosure:

Host: An entity that hosts various resources.

M2M Service: M2M oriented capabilities that are provided to applications, typically through application program interfaces (APIs).

M2M Service Node: A network node hosting a service layer supporting one or more M2M Services for M2M communication.

Originator: An entity creating a request and transmitting it to another entity (i.e. to a receiver).

Receiver: An entity receiving a request from another entity (i.e. from an originator).

Registrar: A service node where an application or another service node has registered.

Registree: An entity that registers to a service node (i.e. a registrar) for its services.

RESTful: Systems, operations, etc. designed based on REST (REpresentational State Transfer) principles. Create, read, update and delete (CRUD) operations are an example of RESTful operations.

User Interface: Any general interface by which a human being or machine interacts with a computer system, electronic device or machine. This interface may be mechanical/graphical/sensory etc. in nature. If the UI is graphical/visual in nature, its referred to herein as a graphical user interface (GUI). If the interface is specified between a human being and a machine, it is termed human-machine interface (HMI).

Figure 15:
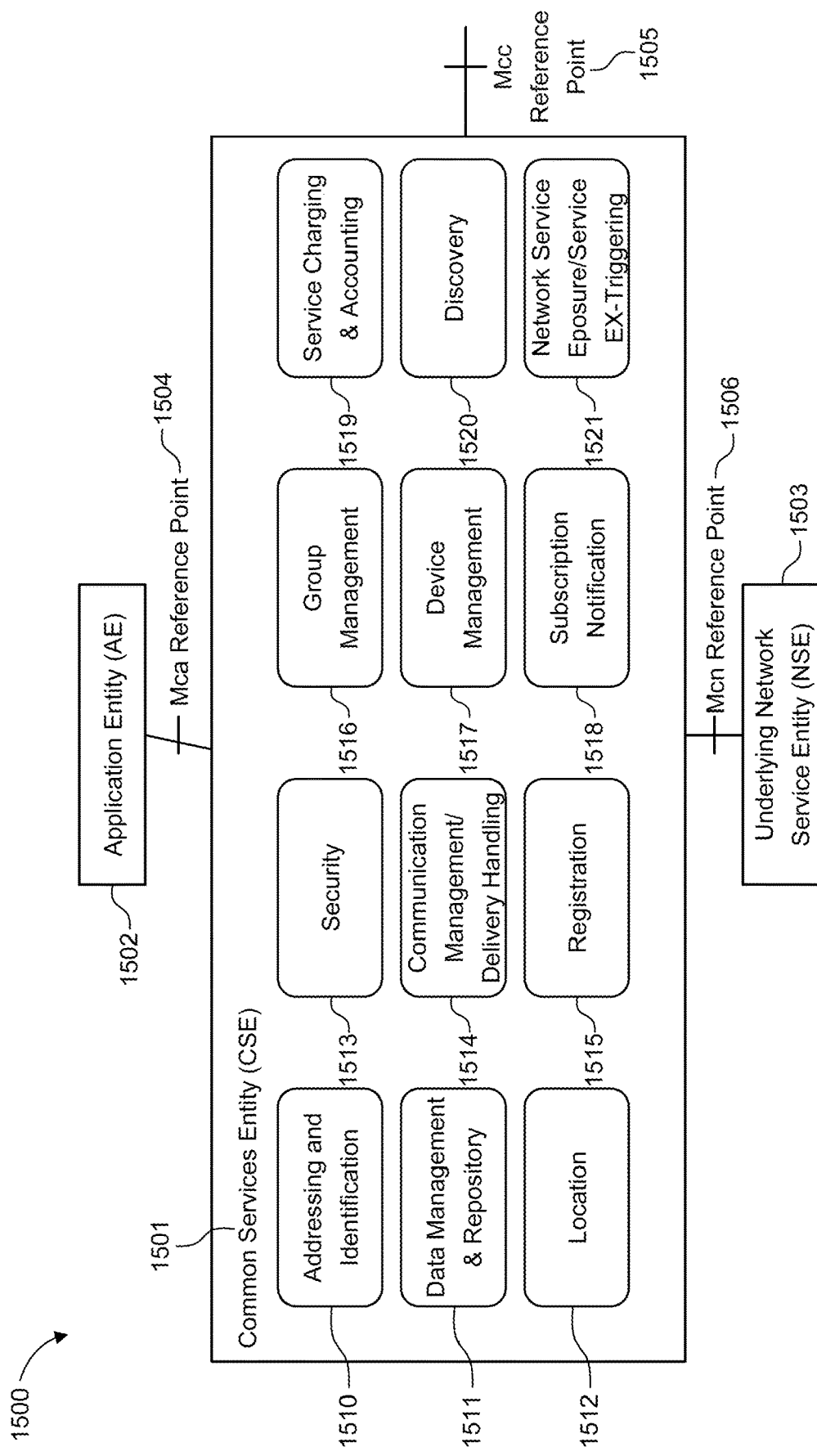
FIG. 15 is a diagram of an example oneM2M Service Layer that supports an initial set of common service functions (CSF)

FIG. 15 is a diagram of another example oneM2M Service Layer that supports an initial set of common service functions (CSF) 1500. The purpose and goal of oneM2M is to develop technical specifications that address the need for a common M2M service layer that may be readily embedded within various hardware and software platforms and that may be relied upon to connect a wide variety of devices in the field with M2M application servers worldwide.

As shown in the example of FIG. 15, the oneM2M service layer may support a set of CSFs (i.e., service capabilities). An instantiation of a set of one or more particular types of CSFs may be referred to as a Common Services Entity (CSE) 1501 (i.e., service layer) that may be hosted on different types of network nodes (e.g. infrastructure node, middle node, application-specific node). Common functions exposed by CSE 1501 may include but are not limited to addressing and identification 1510, data management & repository 1511, location 1512, security 1513, communication management/delivery handling 1514, registration 1515, group management 1516, device management 1517, subscription notification 1518, service charging & accounting 1519, discovery 1520, and network service exposure/service ex & triggering 1521.

These common functions may be exposed via the Mca reference point 1504, Mcc reference point 1505, and Mcn reference point 1506. The Mca reference point 1504 may designate communication flows between an Application Entity (AE) 1502 and the CSE 1501, while the Mcc reference point 1505 may designate communication flows between two CSEs 1501 in the same M2M Service Provider domain. Communications across the Mca reference point 1504 and Mcc reference point 1505 may take place via paired Request/Response messages, wherein each request may perform a specific RESTful operation (e.g., CRUD) upon a resource hosted on the targeted CSE 1501. The Mcc reference point 1505 may be used between CSEs 1501 located in the Infrastructure Domain of different M2M SPs. The Mcn reference point 1506 may be used between the CSE 1501 and an underlying Network Services Entity (NSE) 1503 for services other than transport and connectivity. A particular CSE 1501 implementation may not support every function shown in the example of FIG. 15, but a complete implementation would include all the functions shown in FIG. 15.

Per the oneM2M RESTful architecture, CSFs may be represented as a set of resources. A resource may be a uniquely addressable entity in the architecture having a representation that can be manipulated via RESTful methods such as CRUD. These resources may be made addressable using Universal Resource Identifiers (URIs). A resource may contain child resources and attributes. A child resource may be a resource that has a containment relationship with a parent resource. The parent resource representation may contain references to its child resources. The lifetime of a child resource may be limited by the parent's resource lifetime. Each resource may support a set of "attributes" that store information about the resource.

User Interfaces of all kinds have evolved significantly in the past few decades, from the plain displays and keyboards, to the mouse, touchscreens, haptic devices, etc. More and more sensors have been added to consumer devices to determine what a user is trying to do, such as analyzing gestures, detecting eye movement, interpreting direction, speed, etc. More and more ways of providing feedback have also been developed in countless audio, haptic or visual forms, etc. While complex machines such as general-purpose computers have the processing power and the need for sophisticated interactions, in the Internet of Things (IoT) world the needs and capabilities may both be reduced. Many devices may perform well using a number of basic interactions; therefore a human may use only a few very simple interactions with the same device for a variety of purposes, as long as it is known which function needs to be performed. Similarly, the same simple interaction may be used for a variety of devices, e.g. a sliding scale is the basic input needed by either the volume function of a stereo, the temperature setting on a washing machine, the zoom in a camera, etc.

Outputs provided by machines or devices also have basic functions associated with them. For example, displaying a number is the basic function of a temperature monitor in a nuclear plant, which is the same basic function as a pressure in a tank or monitor indicating humidity in a home. For example, a refrigerator that indicates it is open may provide an auditory alert, which provides the same functionality (i.e. alert) as a flashing LED that indicates a battery is running low. In some contexts expression of these alerts may be better suited as both visual or both auditory.

Among the reasons that complex user interfaces, especially graphical ones, have evolved is to clarify to the human user which input or which output is provided as well as to make interactions easy, accessible, and pleasing.

Figure 16:
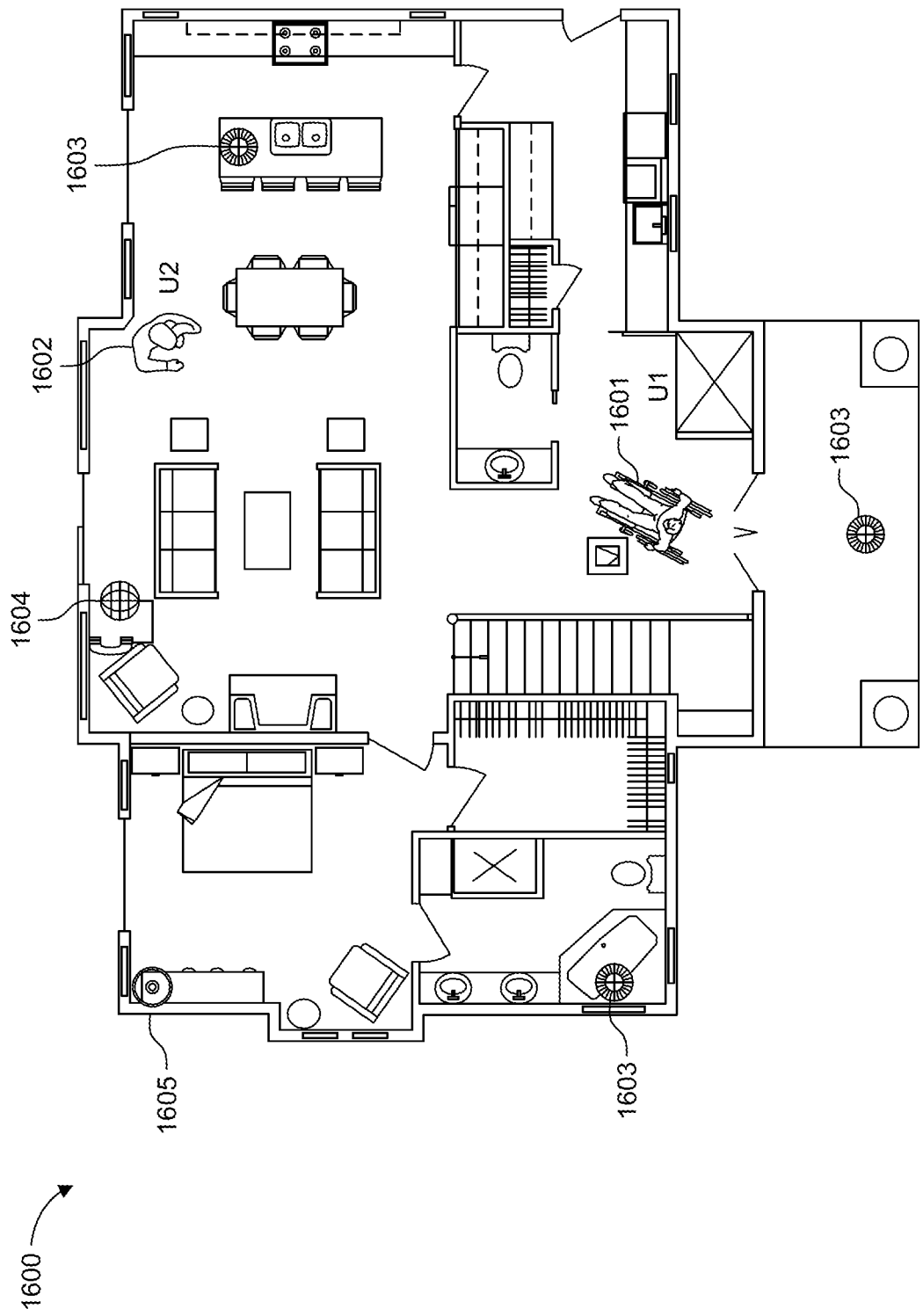
FIG. 16 is a diagram of an example home control platform integrating diverse devices and appliances.

FIG. 16 is a diagram of an example home control platform 1600 integrating diverse devices and appliances. Many consumer devices host multiple independent applications where more than one application obtains and interprets input from the same sensor. The platform 1600 may have presence sensors used for lighting, temperature, and humidity control in the home and for security immediately surrounding the house. The platform 1600 also may allow for an elderly or disabled person (person U1) 1601 in a wheelchair to have the capability to use a single wearable push-button device to turn on/off a variety of devices around the home. In the example of FIG. 16, the wearable push button may be worn by person U1 1601, and in some rooms (e.g. kitchen, bathroom, porch) it may be used to turn on specific lights 1603. When the push button is worn by person U1 1601 inside the home-office it may be used to answer the business phone 1604 via a platform speaker/microphone, and when the push button is worn by another person U2 1602 in the kitchen or living room it is used to start the platform stereo 1605.

In another example, a pointing device with a button may be used to point at a platform-integrated device and control it. Different applications may be tasked with independently interpreting a same input from a same wearable device. The platform may already have information (e.g., presence sensor inputs for security, lighting, and environmental control) for determining (based on predetermined rules) what the context is for the input it receives from the push-button (i.e. who is wearing it and in which room or area they are).

Service layer (SL) platforms capable of processing information from several sources are usually in a very good position to use information availability from new sensors and technologies (e.g., for analyzing gestures, direction, etc.) and to use as context this available information for the user interactions (e.g., received inputs from a user's device). Assuming a platform with such capabilities, the methods and apparatuses described herein may use the information available at the Service Layer to interpret human interactions in a reliable manner that simplifies the user interfaces of applications and is consistent across applications. The methods and apparatuses described herein may alleviate some of the complexities related to creating user interfaces for each application, so multiple applications may rely upon a common library of interactions and a common set of interpretations. The methods and apparatuses described herein may enable scenarios where a limited number of defined interactions may be used for a diverse set of needs/applications.

The methods and apparatuses described herein may enable user interactions to be provided differently based on the situational context, for example, when the correspondence between a given interaction and a device operation is understood. For example, a workstation with multiple users may have different preferences: a first user may prefer rotary buttons for dimmers, while a second user may prefer a slide. To provide this simple feature, a dimmer may need multiple application instances downloaded, application settings may need to be switched back-and-forth between users, or may need to have a user-aware application for what is otherwise a very unsophisticated tool. Such a simple device may rely instead upon the platform to instantiate its user interface and along the way to provide optimizations such as user-aware customizations.

The methods and apparatuses described herein may enable value-add services based on SL context changes to be provided for enhancing a user interaction experience, with little to no input from the user, while retaining the UI functional aspects. For example, if a hearing-impaired person is visiting, a home control platform may be set up at one time for all applications, so that visual alerts are given instead of auditory ones. A more sophisticated implementation may change alerts from audio to visual when a noise level is detected to be above a certain level. While some applications may provide such customizations, the methods and apparatuses described herein may avoid separately configuring each device.

Methods and apparatuses are described herein for a service layer framework for integrating generic and functional user interfaces as services managed by the SL on behalf of applications. These user interfaces, referred to herein as interactors, process user interactions and produce generic and functional events that are translated into inputs/outputs to applications. The methods and apparatuses described herein define an interaction context management (ICM) service that evaluates context and maintains corresponding context states. The ICM service uses the context states to assess user interaction-based events and to provide a mapping between them and application-specific events. The ICM may be configured with interactor-related templates and policies, e.g. an interactor library. Applications and other service layers may query and discover the interactor-related capabilities that are provided by the SL by discovering the interactor library or the individual templates. In accordance with the methods and apparatuses described herein, applications may provide information about their own interactor-related capabilities. Further, the ICM may be configured with rules and parameters that enable the ICM to monitor the SL and to maintain and switch Context states accordingly. The ICM may instantiate interactors on the behalf of applications, such that there is a common understanding of the user interactions, and their functionality and correspondence to application operations in the system. The process of associating applications and interactors may allow for contextual use of multiple Interactors in a system.

Procedures are described herein in which an interactor may register to a Service Layer ICM in order for ICM to use its services and to be associated with applications. This procedure is especially useful when interactor functionality is deployed on devices different from the device/platform with ICM functionality. Further, user interactions received or produced by an interactor may be translated into events managed by the ICM, which may provide functional inputs or outputs to applications. The process of translation between SL events and ultimately user interactions, via the ICM and interactors, may allow for contextual treatment of user interactions.

As used herein, user interactions are physical interactions comprising real-time communications exchanged between a piece of software and a user via a specialized interface that is referred to herein as a user interface (DI). Examples of user interactions comprise received inputs including but not limited to the following: input via a mouse-click, voice inputs, output beeps, etc. As used herein, references to DIs address mainly human interactions with devices or machines; however, the methods and apparatuses described herein are applicable to other types of interactions. Contextual information at the DI at the time of the user interaction is referred to herein as Dix-Context. The Dix-Context may comprise, for example, coordinates of a mouse pointer for a mouse click, the loudness of a voice input, etc.

An interaction context (Ix-Context), as referred to herein, may comprise any information based on which user interactions and SL events may be assessed. In an SL architecture, the Ix-Context may comprise any set of parameters or data available at the SL, which may be provided to the SL by any applications or SL entities, and may include the Dix-Context or certain aspects/parameters also contained in the Dix-Context. The Ix-Context may also be derived by the SL, e.g. being derived based on previous SL or Interaction Context states, Dix-Context, historical, semantic information, etc. For example, interaction context states may be created based on any one of or any combination of the following SL parameters: time of day, a location of a user, and the noise level provided by a sensor.

An interactor (Ix), as referred to herein, may comprise a generic DI piece of software that processes physical inputs and produces generic and functional interactor events (Ix-Event). The Ix-Events may be assessed within an interaction context for translation to SL actions or events (Ax-Event) produced or consumed by specific applications. The receiving applications in turn are programmed to provide specific functionality that relates to the Ix-Events. While DIs in general communicate with applications, in an SL architecture, interactors may communicate with SL entities (via Ix-Events).

In an SL architecture, interactors may be implemented as SL entities (e.g. integrated together with an ICM or stand-alone) that process physical user interactions and interwork these interactions to one or more devices (or applications). The interworking is provided via device/application level interfaces represented as resources (in this case hosted by the SL).

Interactors may be used for any interactions including but not limited to on/off, text input/output, gestures (2D or 3D), audio alarms, etc. Complex interactors may be defined to map multiple Ax-Events to a single Ix-Event. For example, a single hand gesture may be used to provide commands to two otherwise uncoordinated devices such as muting the stereo and turning off a light. Similarly, composite interactors may be used to receive multiple types of inputs such as verbal commands combined with touch buttons to determine the final application-specific Ax-Events. While the examples and embodiments described herein refer to example functionality provided via simple/atomic interactors, the same concepts described herein may apply to both simple and complex interactors. Similarly, the same concepts may apply to interactors designed for providing output rather than input interactions.

As referred to herein, an interactor event (Ix-Event) may comprises an atomic, generic, and functionally defined event that may be produced or consumed by a piece of software with UI functionality (e.g., an interactor) based on physical user interactions. Ix-Events may be generic in the sense that they are not dedicated to a single application. Ix-Events may be functionally defined in the sense that unlike the user interactions, which are defined by physical characteristics (e.g. finger swipe on touchpad), Ix-Events may be defined by basic functional aspects (e.g., an on/off).

As referred to herein, an app-specific interactor event (Ax-Event) may comprise an SL event produced or consumed by an application (i.e., an app), which may be translated to a user interaction by the SL and software with UI functionality (e.g., an interactor).

Below are examples of the functional characterization of an Ix-Event and of differences between the user interactions and corresponding Ix-Events and Ax-Events:

Mouse click over On/Off button (physical user interaction) vs. On/Off (Ix-Event resulting from the physical user interaction) vs. light On/Off (Ax-Event targeting the light-switching app); and Sound (physical user interaction) vs. Alert (Ix-Event based on which a sound is produced) vs. refrigerator alert (Ax-Event produced by the fridge-control App).

An Interaction Context Management (ICM) service, as referred to herein, may be the entity assessing Ix-Context in the SL, and using it to enable the translation of user interactions to app functionality and state changes, using Ix-Events and Ax-Events.

Figure 17:
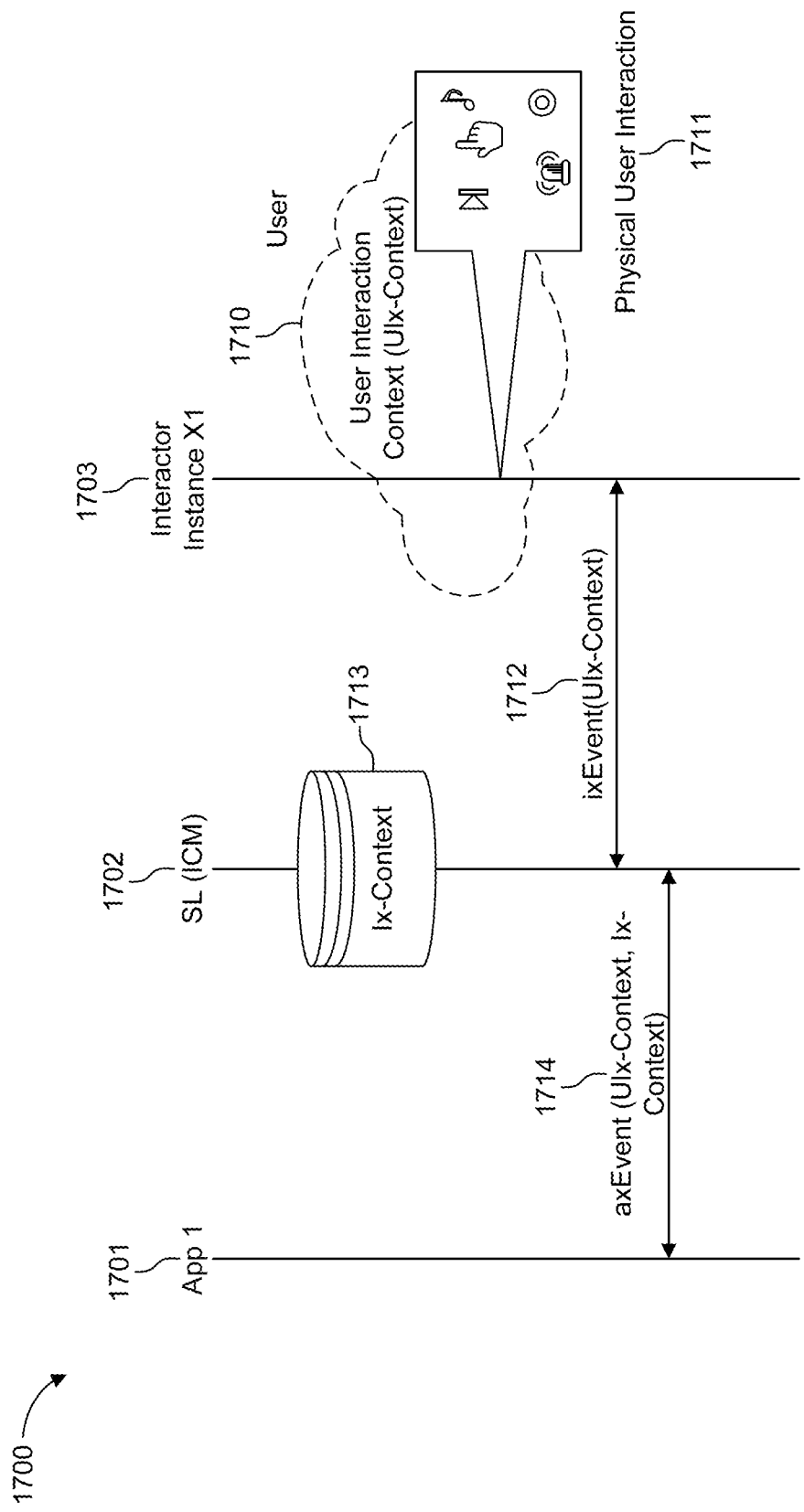
FIG. 17 is a diagram of an example system depicting the signaling among interactors, user interactions, Ix-Events, Ax-Events, and the SL ICM in accordance with one embodiment.

FIG. 17 is a diagram of an example system 1700 depicting the signaling among interactors, user interactions, Ix-Events, Ax-Events, and the SL ICM in accordance with one embodiment. In the example of FIG. 17, interactor instance 1703 may receive information such as a received input that indicates user interaction context information (Dix-context) 1710. The received input may be based on a physical user interaction 1711. Interactor instance 1703 may process the Dix-context 1710 information and may produce generic and functional interactor events (Ix-Events). Interactor instance 1703 may communicate via the Ix-Events 1712 with SL ICM 1702, which may store the interaction context (Ix-Context) 1713 in a database. As described above, the Ix-Context may comprise a plurality of parameters or data available at the SL, which may be provided to the SL by any applications or SL entities, and may include the Dix-Context 1710 or certain aspects/parameters that may be contained in the Dix-Context 1710. As described above, the Ix-Events 1712 communicated with SL ICM 1702 may be assessed within the Ix-Context for translation to SL actions or events (Ax-Events) for production/consumption by applications. SL ICM 1702 may communicate via the Ax-Events 1714 with App 1701.

Figure 18A:
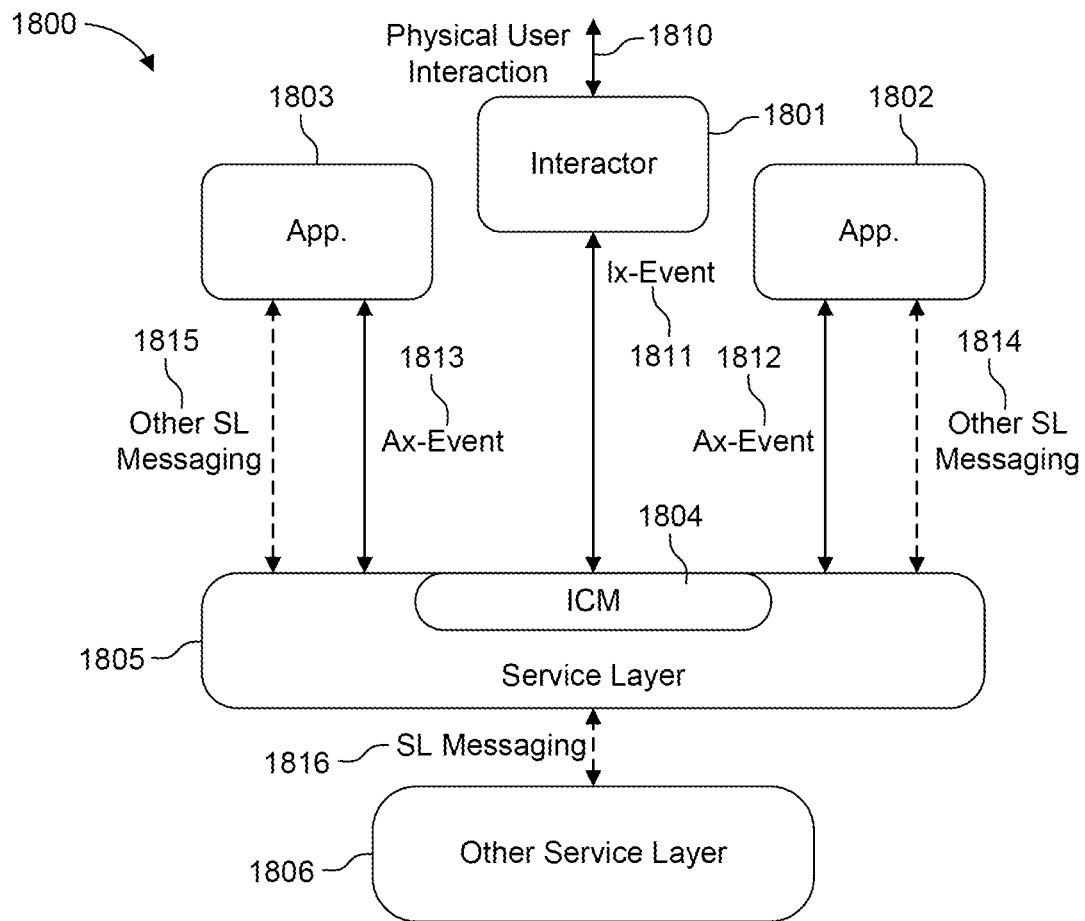
FIG. 18A is a diagram of another example system depicting the signaling among interactors, user interactions, Ix-Events, Ax-Events, and the SL ICM.

FIG. 18A is a diagram of another example system 1800 depicting the signaling among interactors, user interactions, Ix-Events, Ax-Events, and the SL ICM. In the example of FIG. 18, interactor 1801 may receive information such as a received physical user interaction 1810. Interactor 1801 may communicate via Ix-Events 1811 with ICM 1804 at the SL 1805. ICM 1804 may communicate via Ax-Events 1812 with App 1802 and via Ax-Events 1813 with App 1803. SL 1805 may also communication via other SL messaging 1814 with App 1802 and via other SL messaging 1815 with App 1803. SL 1805 may also communicate via SL messaging with other service layers 1806.

Figure 1:
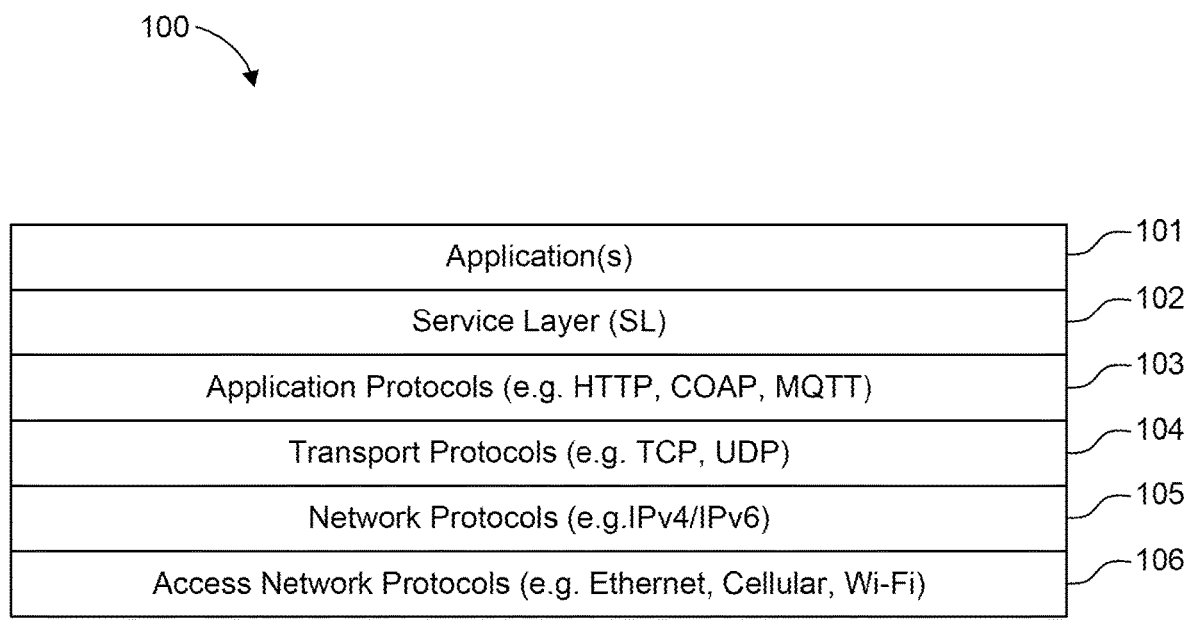
FIG. 1 illustrates an example protocol stack with a service layer between application protocols and applications.
Figure 2:
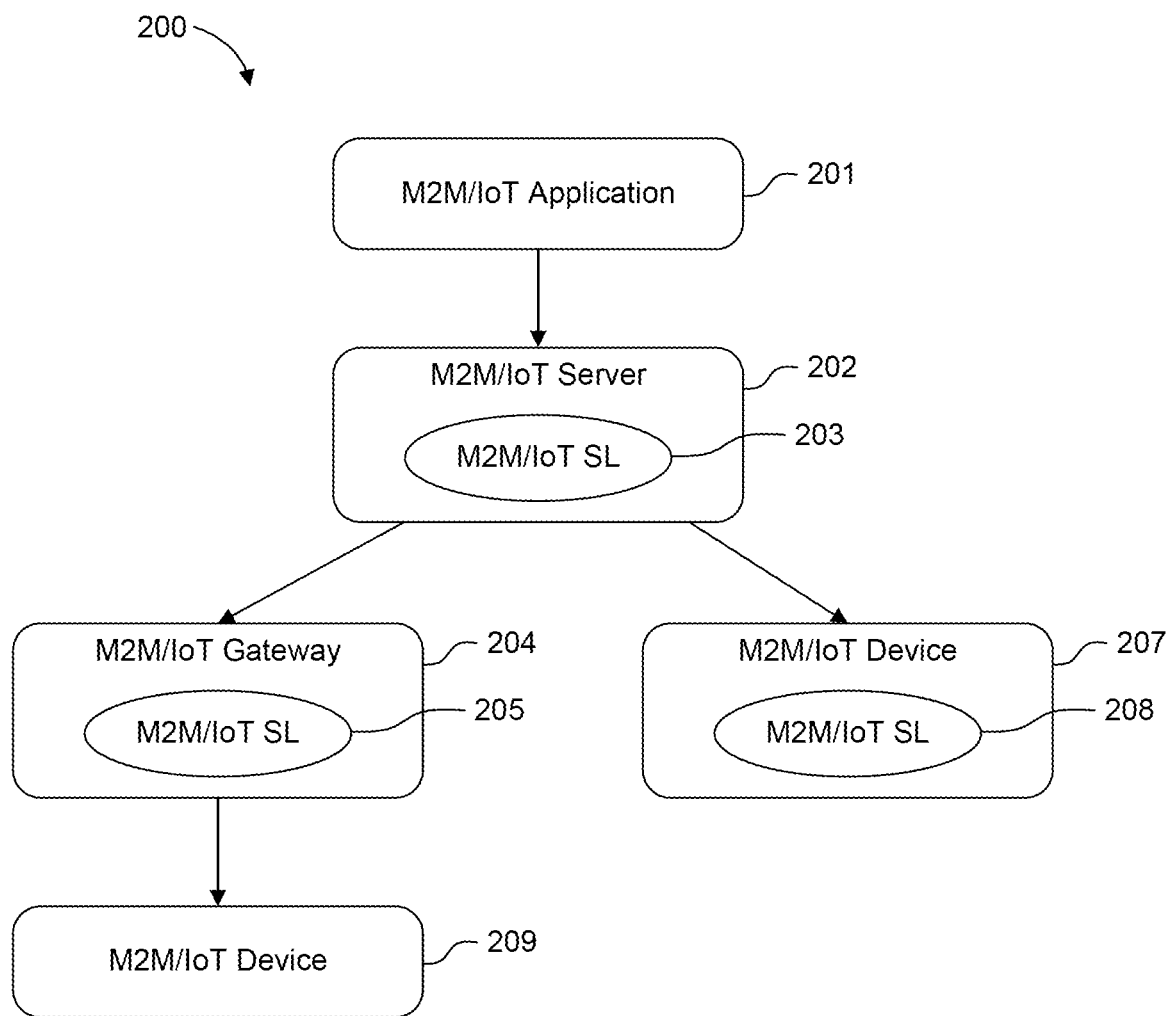
FIG. 2 illustrates an example M2M/IoT deployment.
Figure 3:
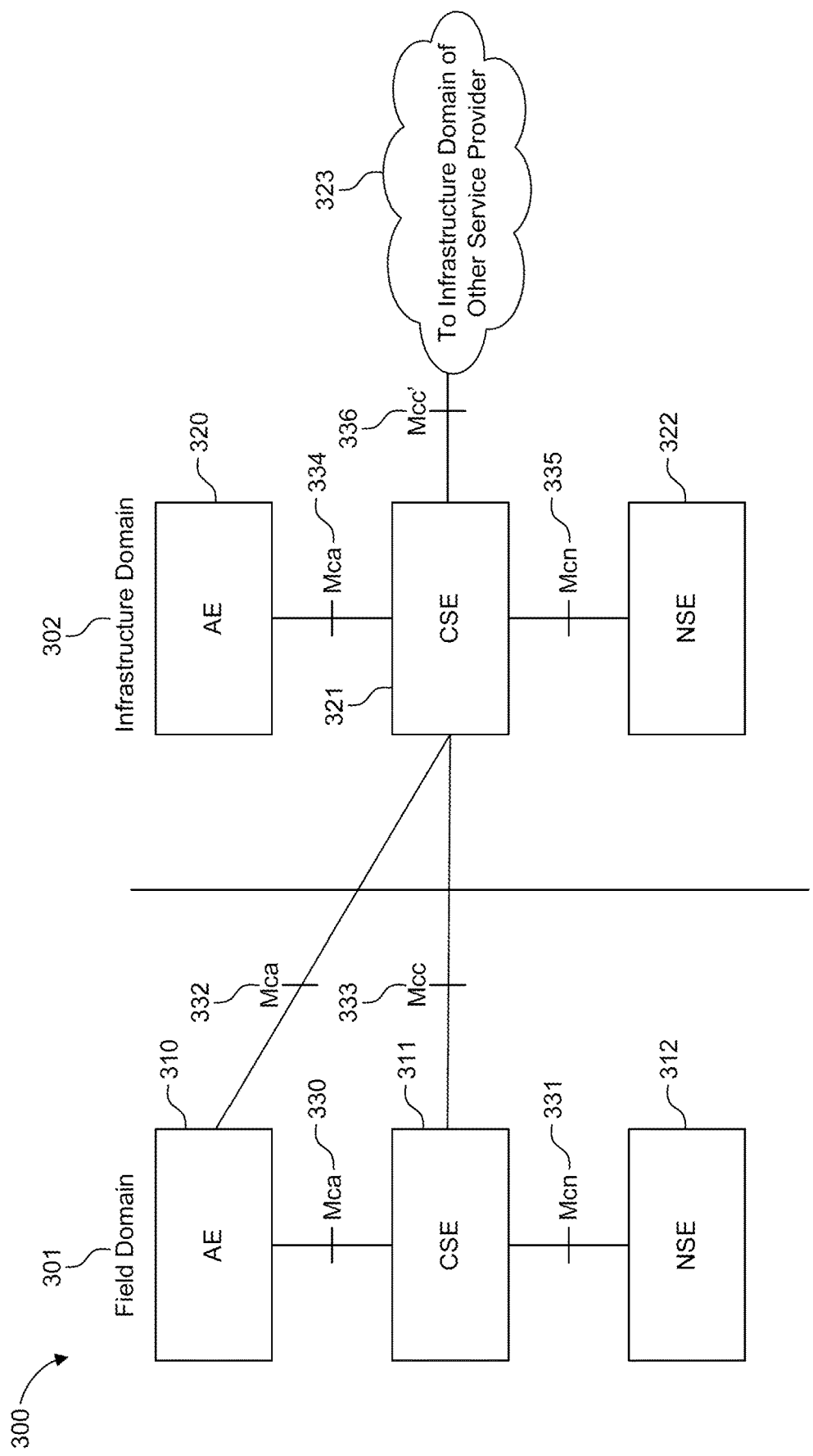
FIG. 3 illustrates an example oneM2M service layer architecture.
Figure 4:
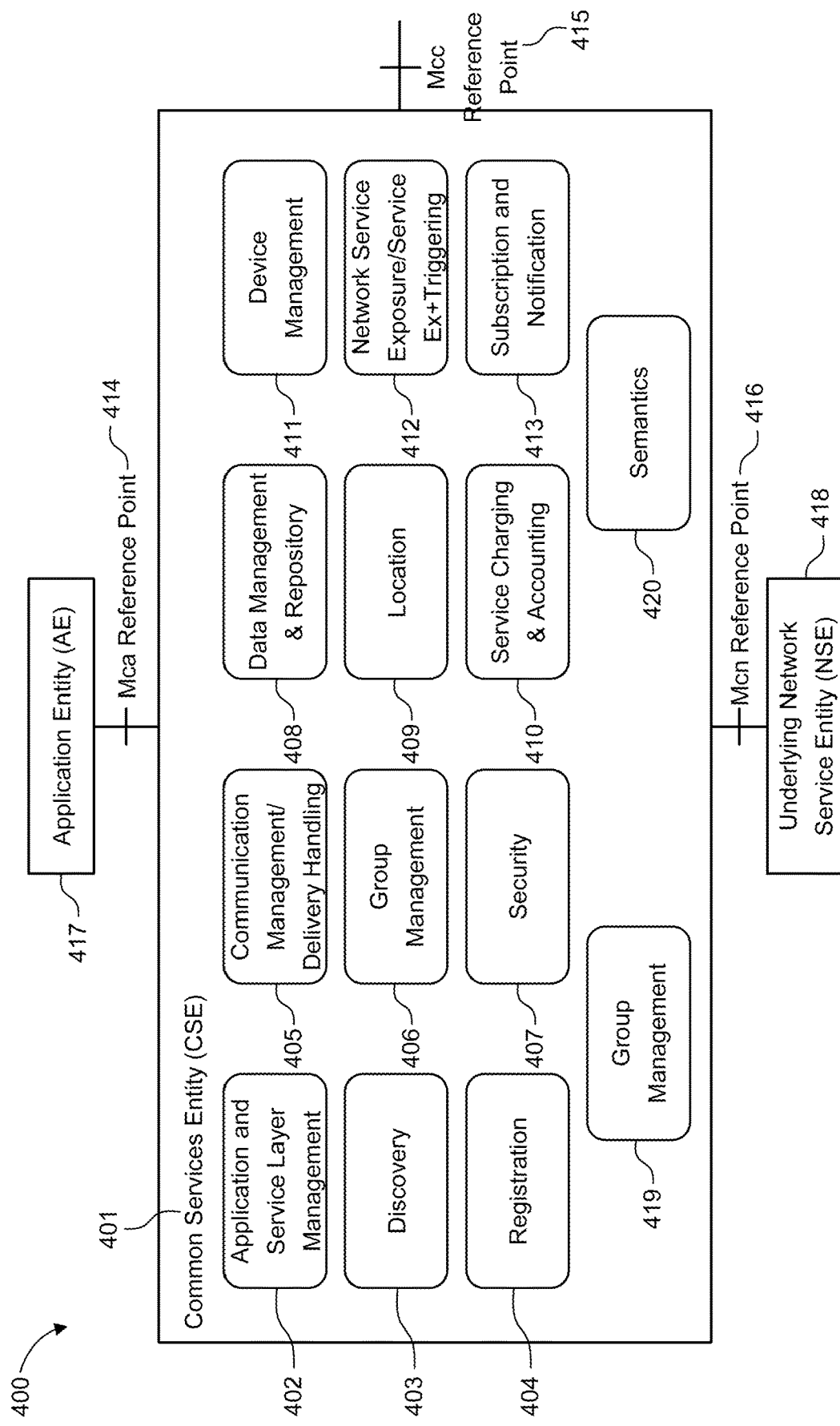
FIG. 4 illustrates example CSFs currently defined by oneM2M.
Figure 5:
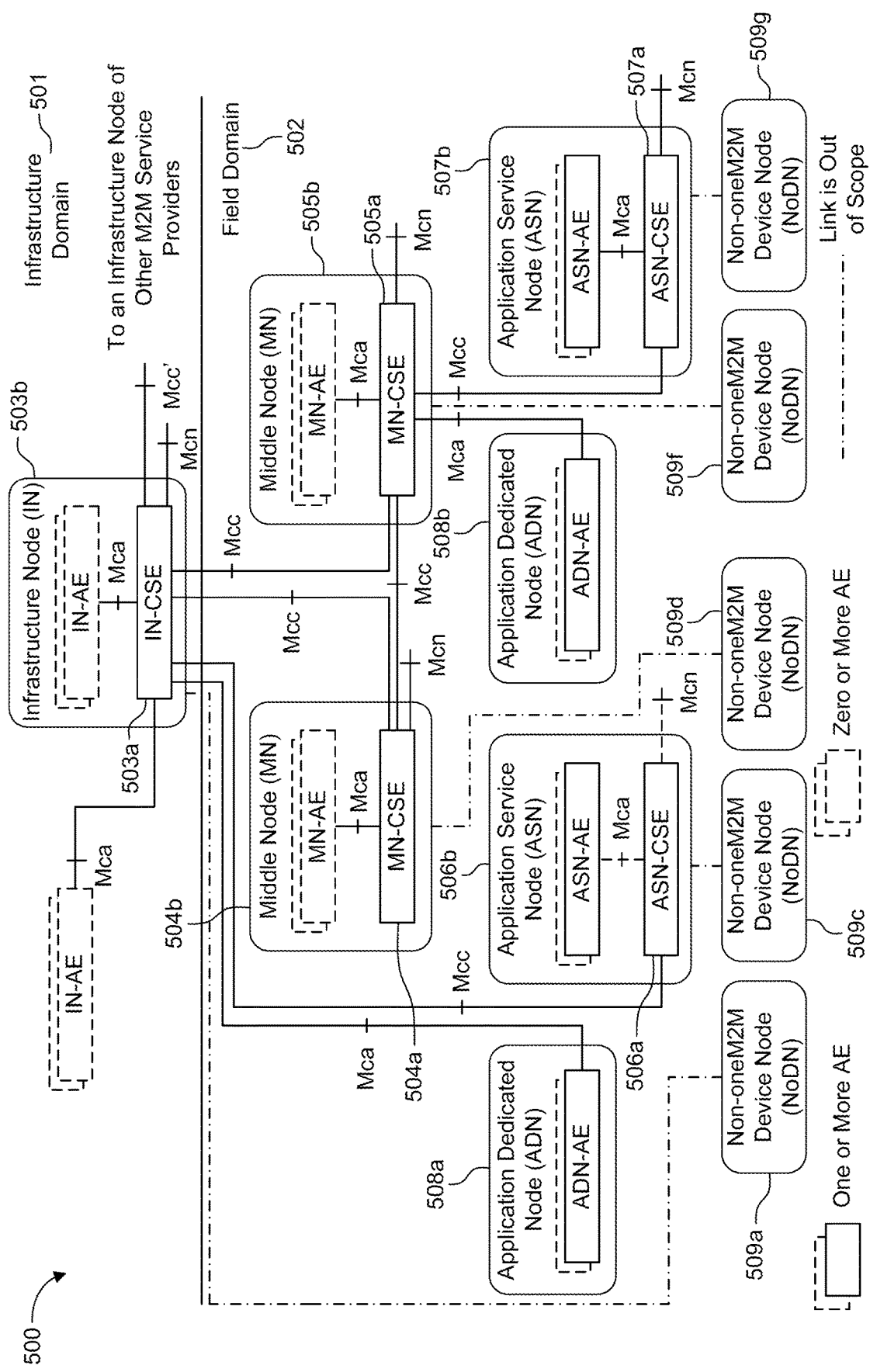
FIG. 5 illustrates example configurations supported by oneM2M.
Figure 18B:
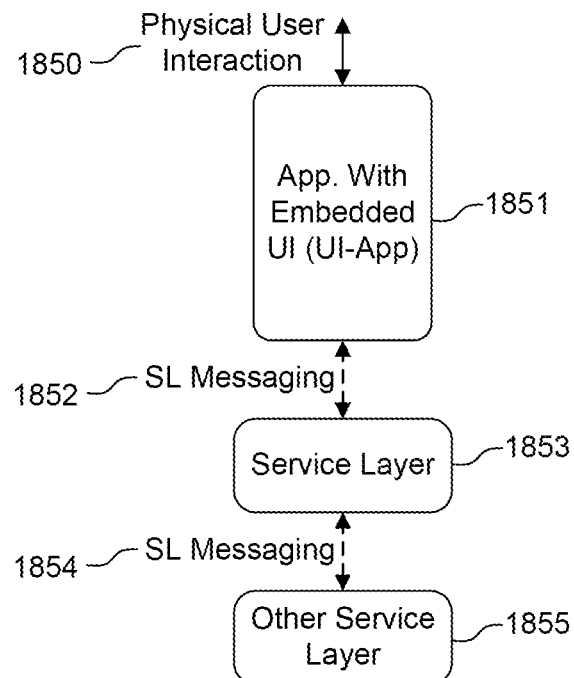
FIG. 18B is a diagram of a system implementing a conventional paradigm using an application-embedded UI.

FIG. 18B is a diagram of a system implementing a conventional paradigm using an application-embedded DI. The interactor paradigm described above (and depicted in FIG. 4 and FIG. 18A) enable use of a single interactor (i.e. DI) for more than one application. As shown in the example of FIG. 18B, however, the conventional paradigm processes physical user interactions 1850 using a DI embedded in an App 1851, which may communicate via SL messaging 1852 with the SL 1853. SL 1853 may also communicate via SL messaging 1854 with other service layers 1855.

The following terms may be used herein to distinguish between the application functionality in the system of FIG. 18A using the interactor based paradigm and the system of FIG. 18B using the conventional paradigm using an application-embedded DI.

UI-app: application logic with embedded user interaction functionality and with functionality and state changes linked directly to user interactions; and App: application logic with functionality and state changes linked to app-specific interactor Events (Ax-Events), which may be translated to user interactions by the SL and interactors.

Figure 19A:
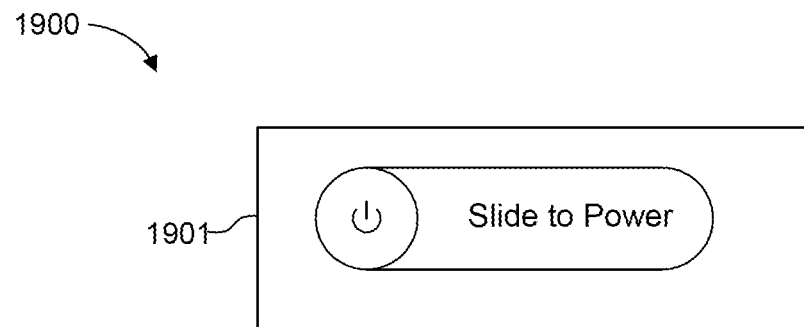
FIG. 19A is an example one user interface style for one interactor.
Figure 19B:
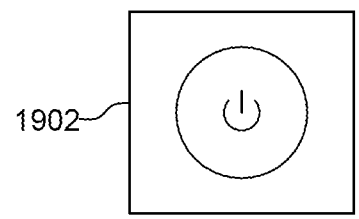
FIG. 19B is an example another user interface style for another interactor.
Figure 19C:
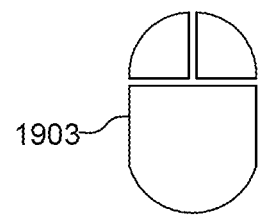
FIG. 19C is an example another user interface style for another interactor.

FIGS. 19A-19C are examples 1900 of different UI styles for different interactors. In this example, an app may be provided for a simple light switch, and the app may be provided with UI services from the SL via different interactors. Referring to FIG. 19A, the user interaction may be initially provided by sliding a virtual on/off button 1901 that changes the state of the light. The user interaction may also be provided differently, such as in the example of FIG. 19B, in which the user interaction is provided via an on-screen tap button 1902. The user interaction may also be provided as in the example of FIG. 19C, in which the user interaction is provided via a right mouse click 1903. In the examples 1900 of FIGS. 19A-19C, either multiple UI-apps need to be used or UI-app settings need to be switched back-and-forth. Otherwise, the UI-app needs to be implemented as context-aware application (e.g. switching context by users using login or fingerprint analysis) for what is otherwise a very basic device (in this example, a simple light switch). Moreover, even context-aware UI-apps are limited to a predefined set of context definitions, compared to the information-rich Service Layer.

Figure 20:
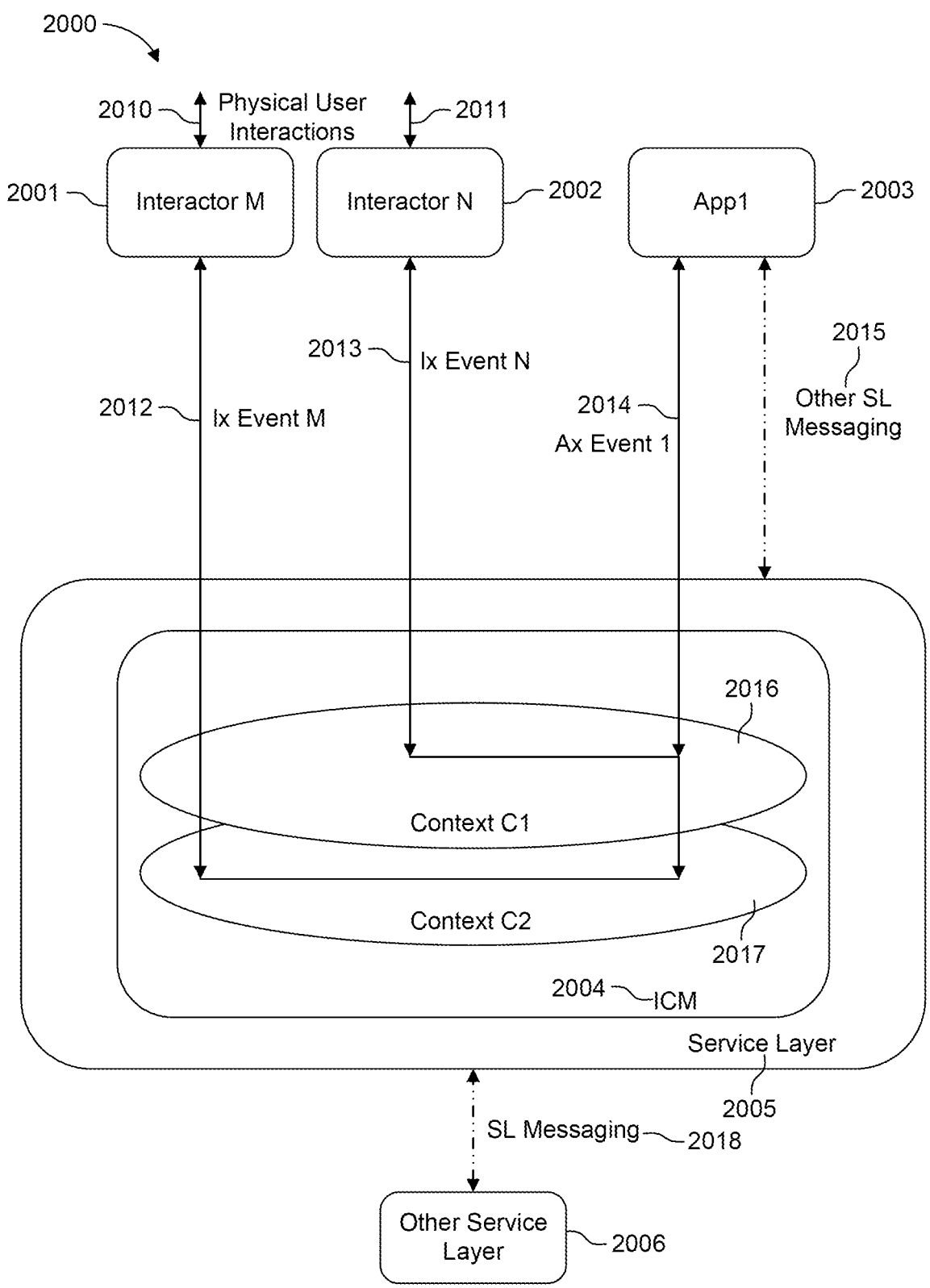
FIG. 20 is a diagram of an example system in which the SL provides an application with the capability to use two different interactors depending on context in accordance with one embodiment, which may be used in combination with any of the embodiments described herein.

FIG. 20 is a diagram of an example system 2000 in which the SL provides an application with the capability to use two different interactors depending on context in accordance with one embodiment, which may be used in combination with any of the embodiments described herein. The example system of FIG. 20 uses the interactor paradigm described above (and depicted in FIG. 4 and FIG. 18A) such that a plurality of interactors may used to perform the same operation at the application level (Ax-Event) using different physical user interactions. Referring to FIG. 20, interactor 2001 may receive information such as a received physical user interaction 2010. Interactor 2001 may communicate via Ix-Event 2012 based on context 2017 with ICM 2004 at the SL 2005, which may trigger ICM 2004 to communicate via Ax-Event 2014 with App 2003. Interactor 2002 may receive information such as a received physical user interaction 2011. Interactor 2002 may communicate via Ix-Event 2013 based on context 2016 with ICM 2004 at the SL 2005, which also may trigger ICM 2004 to communicate via Ax-Event 2014 with App 2003. SL 2005 may also communication via other SL messaging 2015 with App 2003, and SL 2005 may also communicate via SL messaging 2018 with other service layers 2006.

The methods and apparatuses described herein for the interactor paradigm described above (and depicted in FIG. 17, FIGS. 18A, and 20) may implement use of interactor template (Ix-Template). Interactor templates (also referred to herein as templates or Ix-Templates) may comprise a basic and generic description of the functionality of an interactor, which may be used to instantiate one or more interactors.

The group of interactors generated based on the same template are said to have the same functional type which may be indicated by the element ixTemplateFunctionalType. The functional type is correlated with the types of Ix-Events supported, which may be specified in the ixTemplateEvents element.

Templates may also specify (via the initializationDefaults element) defaults to be applied when the resources associated with an interactor are first created. The templates may also specify (via the ixInstantiationSettingsDefaults element) parameters to be used the first time that the interactor UI is running (i.e. at instantiation time). Instantiation settings (e.g. color, position of graphics) may be used for example to create a variety of user experiences and may be also provided at the time of the instantiation request.

Table 13 below includes description of example elements of a template.

TABLE 13

| Interactor Template | |
| --- | --- |
| Element | Description |
| ixTemplateID | An ID for tracking the template |
| ixTemplateEvents | List indicating all the Ix-Event types supported by the Interactors based on this template. The Ix-Event types may include for example: binary input, multiple choice input, text input, alarm output, picture output, etc. |
| ixTemplateFunctionalType | Indicates the functionality provided by the Interactor that may be instantiated based on this template. The template functional type is strongly correlated with the Ix-Events supported, however a functional type may be used to define templates for Interactors supporting more than one Ix-Event type or provide other template constraints that define the functionality. For example, the Template for Interactors that combine a visual output (e.g. display a picture) with a haptic output (e.g. nudge in a direction) will specify the two Ix-Event Types in the ixTemplateEvents and may provide a description for the aggregate in ixTemplateFunctionalType as "VR-2output". The functional type is useful for easy discovery of Templates based on their functionality. |
| ixEventResourceDescription | Provides a description for the resources to be created at the SL to enable the communication (IxEvent) between the SL (ICM) and any Interactors instantiated based on this Template. For example, consider the Template for an Interactor that captures multiple-choice selection (e.g. one of I 0) from a pattern drawn on a touch-screen. Two resources may be specified in the Template to be associated with the Interactor: one container with the raw/actual pattern capture, and another container with the discrete value (e.g. one of IO values) as determined by the Interactor. Although the Interactor provides the discrete interpretation of the pattern, |

TABLE 13-continued

Interactor Template

| Element | Description |
| --- | --- |
| | the raw/actual pattern might still be provided to the Apps (as UIx context). Conversely, the Template might specify that only one container with the discrete value is to be instantiated. |
| initializationDefaults | Provides information, which is used to populate the Interactor-related resources of any Interactor based on this Template at initialization time. For example, it indicates if a default App should be associated at initialization, or which Interaction context (crntAssocIndex) to be used as default at initialization. |
| ixInstantiationResourceDescription | Provides a description for the resource(s) to be created at the SL to enable the instantiation of the Interactor (i.e. triggering the UI to run) and the trigger commend. For example, in a oneM2M implementation this element might indicate a <mgmtCmd> resource and as trigger its execEnable attribute. |
| ixInstantiationSettingsDefaults | Provides default settings to be used for the initial instantiation of any Interactor based on this template. The types of defaults provided depend on the interaction Method and Environment. The defaults included in the template narrow down the Interactor parameters used at instantiation time. When no defaults are provided in the template, the parameters will be provided at instantiation time or will be set based on local policies. For example, for a multiple-choice input Template, this element might indicate that when the Interactor is instantiated the first time (i.e. the UI is running), a specific entry is highlighted. This will apply to all Interactors based on this Template, when instantiated for the first time. The setting can be changed upon subsequent instantiations (see ixInstantiationSettings in Table 3). Alternatively, no defaults may be specified here in the Template, and all instantiation-specific information is provided dynamically. |
| interactionMethod | Indicates the type of User Interactions that can be used with Interactors based on this template, e.g. tap, double tap, gesture, etc. Wildcard may be accepted, in which case the Interactors instantiated based on this template employ an interaction method based either on settings provided at instantiation, local policies, etc. Alternatively, this parameter may be combined with others provided in the Template via the ixInstantiationSettingsDefaults. |
| interactionEnvironment | Indicates the type of environment required for the User Interactions that can be used with Interactors based on this template, e.g. touchscreen, microphone, LED, etc. This information may be used to limit the applicability of the Template, so it may be applied only to a specific environment e.g. touchscreen. Wildcards or lists may be accepted, in which case the Interactors instantiated based on this template employ an interaction method based either on settings provided at instantiation, local policies, etc. For example, the Template might apply to both touchscreens and touchpads, but at instantiation only one method is specified. Alternatively, this parameter may be combined with others and provided in the Template via the ixInstantiationSettingsDefaults. |
| ixInstanceList | Optional element, used for maintaining a list of all Interactors created based on this Template, for management purposes. This information may be maintained elsewhere in the SL as well, but keeping it with the Template definition allows for easy discovery of all Interactors based on the Template. |

The methods and apparatuses described herein may comprise the ICM as described above, and the ICM may be a standalone service or implemented as a sub-service of an IoT Service Layer. The ICM may be hosted on various types of network nodes such as IoT servers, IoT gateways and IoT devices and may be instantiated with different levels of functionality depending on the node.

ICM may assess the interaction context by monitoring the set of parameters based on which the context is defined, and which may consist of any information provided to the SL by applications or derived by the SL. The examples and embodiments described herein assume that context changes occur between discrete, multi-dimensional states (cxState) and are performed using comparisons of the context parameters against thresholds or against previous states of the user interaction. With this assumption, the ICM may maintain a list of cxStates with parameters as described in Table 14 below. However, these concepts may also apply when the interaction context is assessed and changed over time in other ways, e.g., using rules, algorithms, conditions, etc. How the ICM may be pre-provisioned with rules for evaluating interaction context and determining the cxStates used for switching is described below.

TABLE 14

Context State List (cxList)

| Element | Description |
| --- | --- |
| cxStateID | An ID for tracking the Context state |
| cxStateDescr | A complete set of parameters describing the context state. This definition may be provided in a variety of forms. For example, it may be provided as (parameter, value) or (resource, state) pairs, in which case the ICM monitors all the parameters or resources indicated and changes states when all the conditions are met. The definition may also be provided via rules such as "after the receipt of a specified message", "at time T". The conditions may use any information available to the ICM, including information provided by other applications.<br>For example, a set of 7 contexts may be defined based on relevant combinations from the following SL information: time of day, the location of a given user and the noise level provided by a sensor. |
| cxRules | Optional element captures the rules used by ICM to derive the Cx-States, which may be provided in a variety of forms/formats. For example, a rule may be provided as complex thresholds expressed as (parameter, value) or (resource, state) pairs, in which case the ICM monitors all the parameters or resources indicated and changes states when all the conditions are met. The definition may also be provided via rules such as "after the receipt of a specified message", "at time T". The conditions may use any information available to the ICM, including information provided by other applications. Complex algorithms may also be provided. The rules may be provided and stored separately from the Cx-State descriptions, and there may not be a one-to-one mapping between states and rules.<br>In this disclosure context changes are assumed to be performed based on transitions between the states described by cxStateDescr. |

The ICM may manage the correspondence between user interactions and app operations by creating associations between Ix-Events and Ax-Events for each cxState using resources associated with interactors as described below. In order to create and manage these resources, the ICM may be pre-provisioned with Ix-Templates and may receive interactor information from applications.

In a home control platform as described above with respect to FIG. 16, the platform ICM may be provisioned with an "on/off" interactor template that may be used with any device that may provide this input, such as the pushbutton. Devices such as the controllable house lights or the stereo may register with the platform and provide information about the interactors that they may use, among which is the on/off button. The ICM may also provide a GUI that allows the users to create the rules for context switching, for example based on user identity and location. The ICM may create a correspondence between the on/off input and the control actions for each context. How the ICM is pre-provisioned with Ix-Templates, how applications provide information about possible interactor associations, how the ICM maintains the correspondence using these specialized resources, and how the ICM further maintains the association between interactors and apps depending on the changing Interaction Context is described below.

Given its role in maintaining information about Ix-Template, interactors and the associated Apps, the ICM may be used to discover or publish information about the available templates and interactors, as well as information about Ix-Events that in turn provide valuable information about all the user interactions.

Interactor related resources may be used by the ICM to provide its functionality. For example, Table 3 below includes the information related to an interactor instance (ixInstance) that the ICM may use in order to provide its functionality using the concept and information elements described above. For a RESTful environment, Table 15 provides the structure of a ixInstance SL resource.

TABLE 15

| ixInstance | | |
| --- | --- | --- |
| Element | | Description |
| ixID | | Identifier for the Interactor |
| ixTemplateID | | The ID of the Template based on which this Interactor has been created. |
| crntAssocIndex | | An index into the following list (assocList) |
| assocList | | A list of associations between defined contexts and Apps, it contains each of the following parameters in each entry |
| assocList[i] | associationStatus | Indicator of the status of the association. In order to be able to preserve association information longer term and re-use it, associations may be placed in various sates e.g. active/inactive/paused, etc. |

TABLE 15-continued ixInstance

| Element | Description |
|---|---|
| | [Cx set of elements] |
| cxStateIDAssoc | Link to the definition of a Cx-State for which this association applies |
| | [Ix set of elements] |
| ixEventResList | List of resources instantiated for this Interactor based on the ixEventResourceDescription of the Interactor Template. For example two <container> resources may be specified in the ixEventResourceDescription of the Template to be associated with the Interactor. |
| ixInstantiationTrigger | Indicates how the Interactor should be instantiated, i.e. how the UI software should be triggered to run. For example, the parameter may provide a link to a resource attribute (e.g. execEnable) |
| ixInstantiationSettings | Additional settings to be used for the Interactor instantiation e.g. to provide different user experiences. For example, If UI activity is one time vs. repeated, i.e. if the instantiation ends once the first input has been provided, or the UI remains active. UI activity timers, such as: time between instantiation triggering and when the UI becomes active; for repeated UI activity number of repetitions, overall duration or timeouts. Positioning and defaults of graphics, e.g. if the Template specifies only that an On/Off touch button should be activated, the ixInstantiationSettings might indicate an active position (e.g. = top left), default position (e.g. = raised), background (e.g. = gray), etc. Characteristics of outputs, e.g. for an output audio alarm: tone, length, pitch, etc. |
| | [Ax set of elements] |
| axAssocApp | Link to the App associated with this Interactor when the SL Context is in the associated Cx-State (cxStateIDAssoc above) |
| axEventOperation | Provides complex information about the use of the Ax-Event in this Interactor instantiation. For example, on a home control platform an Ax-Event might turn on a washing machine by updating a resource. This description includes a link to the resource to be updated and a description of the operation required. It may also include other description of purpose, device type, etc. which may be used to discover the operations which may be performed via Interactors. |
| axEventActionDescr | Provides information about the use of the Ax-Event in this Interactor instantiation. For example, on a home control platform On/Off Ax-Events might be described as providing lighting control, sound control, turning on/off platform alarms, etc. This description may be used to discover which Interactors are used for a specific purpose, etc. |

As used herein, the terms interactor and interactor instance may be used interchangeably. The addition of instance may be used to emphasize the interactor as a specific copy of the software running at the specific time. Therefore, interactor may refer to the generic software that may result in multiple instantiations, or an interactor instance, depending on circumstances.

Figure 21:
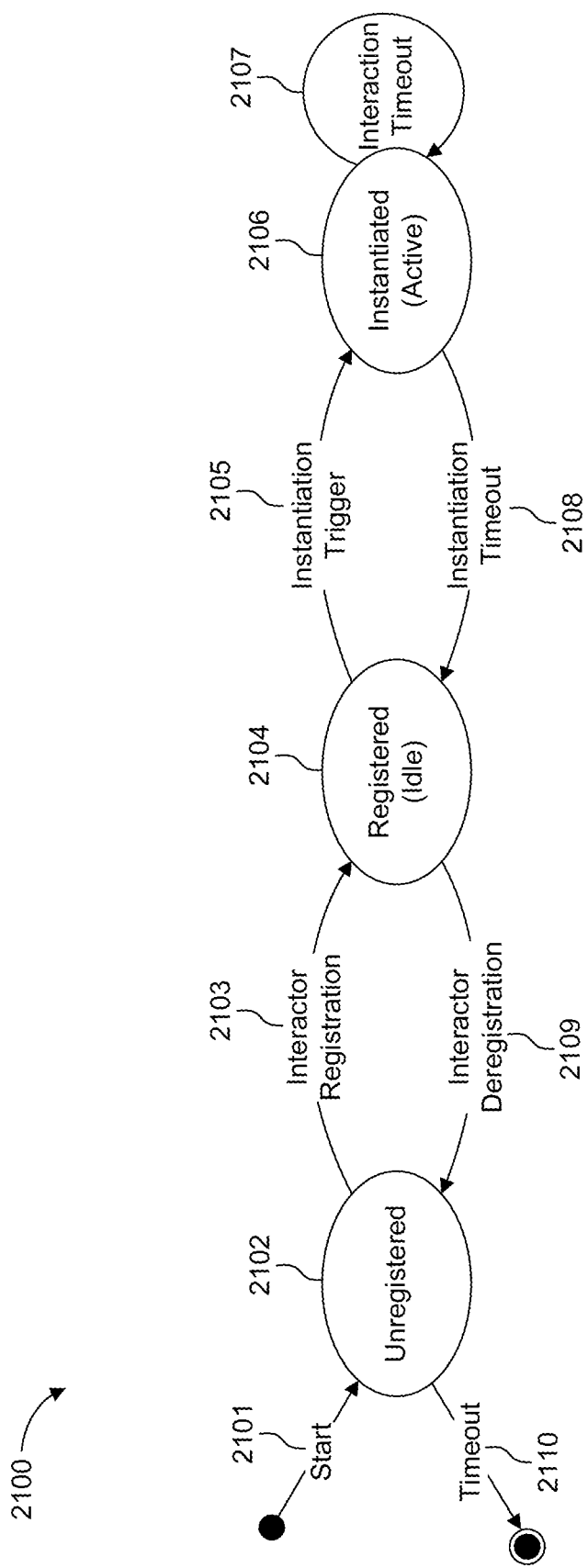
FIG. 21 is a diagram of an example interactor state machine in accordance with another embodiment, which may be used in combination with any of the embodiments described herein.

FIG. 21 is a diagram of an example interactor state machine 2100 in accordance with another embodiment, which may be used in combination with any of the embodiments described herein. The process of creating and initially populating the resources supporting interactor functionality is referred to herein as interactor registration. Referring to FIG. 21, an interactor may be programmed to start 2101 in an unregistered state 2102, and after the interactor registration procedure 2103 it may transition to the registered (idle) state 2104. The interactor registration procedure 2103 may result in the following resources being created and initialized:

An ixInstance resource, which may be used for overall interactor instance management;

One or more resources based on ixEventResourceDescription of the interactor template to enable the communication between the SL (ICM) and the interactor; and A resource based on ixInstantiationResourceDescription of the interactor template, which may be used by the ICM to trigger interactor instantiation.

The process of running the UI software of the interactor is referred to herein as interactor instantiation. An instantiation trigger 2105 may transition the interactor to an instantiated (active) state 2106, where it may process physical user interactions to/from Ix-Events. For example, interactor instantiation for an on/off button on a touchscreen may comprise the process of creating the button graphics and of processing tapping as physical user interactions. For example, an interactor may process only one user interaction, then after an instantiation timeout 2108, the interactor may go back to the registered (idle) state 2104 where they need to be re-triggered in order to process physical user interactions. An interaction timeout 2107 (or maximum number of physical user interactions, etc.) may be specified, so that the interactor returns to the active state repeatedly after each physical user interaction is processed. When the interaction timeout 2107 is reached (or the maximum number of repetitions performed), the interactor may transition into idle mode. Parameters such as the timer values, number of repetitions, etc. may be captured in the SL by the ixInstantiationSettings, along with other settings that affect the interactor state machine and the way the physical user interactions are processed in the instantiated (active) state 2106. An interactor deregistration procedure 2109 may comprise the process of deleting the resources supporting interactor functionality. After deregistration, an idle interactor may return to the unregistered state 2102, and it may reach the end state 2110 after a timeout.

Some interactors may rely upon the ICM to create and initialize interactor support resources and therefore perform interactor registration on its behalf In other examples, interactors may be programmed to actively discover the ICM functionality and then to register themselves. For example, an interactor may discover an ICM using mechanisms similar to those employed by apps to discover and register to the SL.

Figure 22:
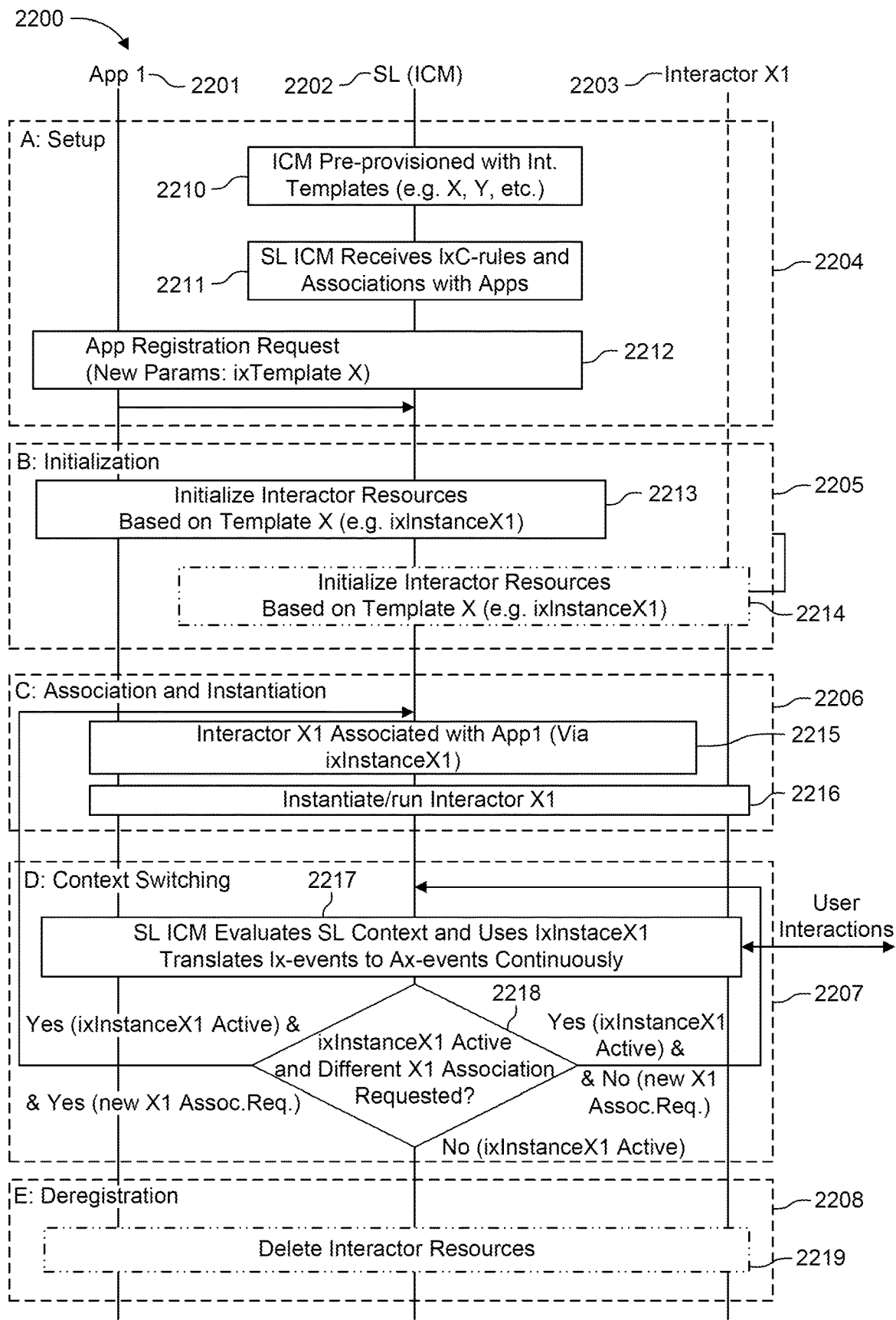
FIG. 22 is a diagram of an example procedure for use in an ICM in accordance with one embodiment, which may be used in combination with any of the embodiments described herein.

FIG. 22 is a diagram of an example procedure 2200 for use in an ICM in accordance with one embodiment, which may be used in combination with any of the embodiments described herein. While each step of the procedure 2200 in FIG. 22 is shown and described separately, multiple steps may be executed in a different order than what is shown, in parallel with each other, or concurrently with each other. The example of FIG. 22 provides an overview of the actions performed by the ICM resulting in an interactor being deployed, the accompanying user interactions (e.g., predetermined inputs based on physical interactions) being associated with a given app, and the ICM continuing to monitor the context and enable changes in the user interaction processing based on these context changes.

Functional phases of the example procedure of FIG. 22 are described herein. Phase A (Setup) 2204 may comprise the phase during which the ICM is configured with a plurality of templates (i.e., a library of interactors) to enable identification of interactors and/or to enable instantiation of interactors. During phase A (Setup) 2204, the ICM may also be configured to be able to switch context based on the information available. Also during phase A (Setup) 2204, apps that register may provide information about the type of interactors that they use, by identifying a corresponding template. At the end of phase A (Setup) 2204, the following may be available at the ICM one: or more template resources (or alLibrary); a list of Cx-States based on which the ICM switches states; app registration information enhanced with information about which app operations (Ax-Events) may be triggered via interactors and the corresponding templates.

Phase B (Initialization/Registration) 2205 may comprise the phase during which the deployment of an interactor is prepared and the resources that support its functionality are created and initialized, i.e. interactor registration as described above may be performed. The SL ICM may register an interactor on behalf of an app. Alternatively, an interactor may register itself at a SL ICM. The initialization of the necessary parameters with default/initial values may be based on an interactor template, local policies, or signaling (e.g., CRUD operations). At the end of phase B (Initialization/Registration) 2205, the ICM may have the newly created resources and the information corresponding to the Ix set of elements in an ixInstance.

Phase C (Association and Instantiation) 2206 may comprise the phase during which the resources representing and supporting interactor functionality provide the means to create a list of associations for each interactor Instance. Each association may map a Cx-State to an Ax-Event and an Ix-Event. The interactor instantiation is performed, so at the end of this phase the interactor may start processing user interactions and translate Ix-Events to/from Ax-events.

Phase D (Context Management) 2207 may comprise the phase during which the ICM constantly evaluates the SL context based on the current rules, and changes the context. Phase D 2207 is repeated by ICM indefinitely and may result in repeating Phase C 2206 and changing the association between an interactor instance and apps. If the rules are updated dynamically, the ICM may update the definitions of its Cx-States and the evaluation follows current rules. The ICM may use the associations to constantly communicate with apps and interactors by translating user interactions to Ix-Events (or vice-versa).

Phase E (Deregistration) 2208 may comprise the phase when an interactor deregistration procedure is performed, which may delete resources that support the interactor functionality at the SL ICM. Phase E (Deregistration) 2208 may end with the interactor in a deregistered state, however, ICM services may continue.

Referring to FIG. 22, during Phase A (Setup) 2204, the SL ICM 2202 may be provisioned with templates (step 2210). The SL ICM may stores interactor templates that may be created or installed in several ways. Each Template provides a generic description of the functionality of an interactor based on which several of interactor instantiations may be created. The templates may provide information about what resources need to be created for an interactor instance and initialization defaults. At the end of step 2210, one or more ixTemplates may be available at the SL ICM 2202. The SL ICM 2202 may also maintain a library of templates which may be discovered (e.g. by apps in order to select or indicate a specific template to be used for interactor instantiation). During Phase A (Setup) 2204 the SL ICM 2202 may receive settings describing interactor templates, which may be accomplished using a variety of methods:

A set of templates may be pre-provisioned before deployment. At that time, the parameters detailed in Table 1 may be configured for each template made available at the SL.

Templates are provided via device management (DM) procedures. For example, an entire template database may be provided via a download. These updates may occur also in phases other than Phase A (Setup) 2204 as well.

Apps may provide templates, for example at registration time. For example, an application (i.e., app) that interfaces with a sensor or actuator may be installed on a different device hosting the ICM. The corresponding template creation or installation may be part of the application installation. This method of template provisioning may require that the registration messages be augmented to be able to carry template parameters as those described in the Table 1. Alternatively or additionally, other specialized messages may be defined which provide or register templates with an ICM.

The SL ICM 2202 may be provided with context changing rules (cxRules) (step 2211), which may be used to determine a set of context states. These cxRules may be provided in several ways. Once the set of context states (Cx-State) has been determined, they may be used by the SL ICM 2202 for changing how the user interactions (via the interactors) are associated with apps. At the end of step 2211, a cxList may be created and populated at the SL ICM 2202, and it may be updated by repeating step 2211 throughout the SL ICM 2202 lifecycle. This information also corresponds to the Cx set of elements in an ixInstance. In order for SL ICM 2202 to assess interaction context and determine when context changes occur, it may be provided with a plurality of context-switching rules. Assuming use of discrete, multi-dimensional states as aforementioned, the ICM may maintain a list of Cx-States derived from these rules with parameters as described in Table 2.

Methods for the SL ICM 2202 to be provided with rules and arrive at a set of Cx-States includes but is not limited to the following:

The SL ICM 2202 may be pre-provisioned before deployment with either cxRules or cxStateDescr/cxStateID to populate the cxList as introduced in Table 2;

DM updates: The cxRules or cxStateDescr/cxStateID to populate the cxList my be provided via DM procedures. For example, an entire cxList may be provided via a download. These updates may occur also in phases other than Phase A (Setup) 2204 as well; and Direct user input. This method of context provisioning may use a specialized user interface that may be exposed so that users are able to provide parameters as those described in the Table 2.

The following examples describe a direct user input method, but once the rules are formulated logically and programmatically, they may be provided via pre-provisioning, DM updates, etc.

For the use case of the elderly or disabled person in a wheelchair using a single wearable push-button device to turn on/off a variety of devices around the home as described in reference to FIG. 16 above, the SL ICM 2202 may reside on the home platform. In this example, the platform may be used to interact with lights and devices around the home, including the generic, wearable push-button. In this example, the platform also has some positioning capabilities used for other functions, for example for temperature control. For example, positioning capabilities of the platform may be based on presence sensors in a room or may be based on use of the user's smart watch to track his/her position within the house. The platform may expose a GUI, for example on a tablet or other device configured for wireless or wired communications, based on the following steps:

The GUI may request which device (e.g., wearable push-button) is to be used as a "Contextual User Interaction Device" (i.e., on which to instantiate the interactor). The GUI may provide a list of available devices that may be used in that manner, as well as information about their capabilities. The user may select the wearable pushbutton. If the device capabilities are more complex, e.g., including a trackpad and a button, the GUI may request which function of the device is to be used in a contextual manner (push-button).

The GUI may request which devices are to be controlled and again may present a list of suitable devices. For example, a selection of the lights from a user may be received.

The SL ICM 2202 may be capable of receiving information indicating the position/location of a user in a room. Described herein are methods for determining a context change. For example, there may be two context-switching rules: "by room" or "by proximity". The first rule is one in which switching contexts depending on the room in which a presence sensor(s) indicates that a user is located. The second rule is one in which the context it switched when the user approaches a device such as a different controllable light, which may be in the same room or not.

At the end of this process the SL ICM 2202 may have the cxRules "by room" provisioned. The SL ICM 2202 may then use its local information to create a number of Cx-States, each with the cxStateDescr in the form (user, userValue) && (user location, locValue), etc., and each with its own cxStateID, which may be for example as follows:

cxList[0]/cxStateID=A
cxList[0]/cxStateDescr=(user, U1) && (user location, kitchen or bathroom or bedroom or living room)
cxList[J J/cxStateID=B
cxList[J]I cxStateDescr=(user, U1) && (user location, home office)
cxList[2J/cxStateID=C
cxList[2]/cxStateDescr=(user, U2) && (user location, kitchen or living room)

In the example of a pointing device with a button, the SL ICM 2202 may implement context changes based on rules rather than on discrete, multi-dimensional states (cxState). However, the SL ICM 2202 may create Cx-States (each with separate cxStateID) based on the directional sensor inputs matching controllable devices. The interaction Ix-Context may be assessed continuously as it changes with the direction of the pointer, and the Cx-State may change to the cxStateID of the device whose position matches the trajectory.

The context rule provisioning of step 2211 may be performed or repeated throughout other phases of this procedure 2200, effectively updating the definition(s) of the context state(s) based on which the SL ICM 2202 provides its services.

Applications, such as app 2201, may register with SL ICM 2202 (step 2212), which may provide information about interactors to be used. When app 2201 registers, it may inform SL ICM 2202 about which operations (Ax-Events) may be triggered via interactors and which templates may be used for each of the corresponding interactors. All the information provided by app 2201 at registration may alternatively be provided or updated after registration via CRUD operations or new messages (e.g., Interactor-Usage-Indication). After step 2212, SL ICM 2202 has, in addition to the App registration information, the information corresponding to the Ax set of elements in ixInstance.

The information provided at app registration may be used by SL ICM 2202 to understand what ICM services app 2201 may request from the SL during its lifecycle. This information (e.g, information listed in Table 4) may enhance the existing app registration information so it may be stored together with the app registration. This information may include, for example, for each app:

The list of operations (Ax-Events) that may be triggered via interactors.

The list of templates that may be used for each of the corresponding interactors. This may be provided by referencing templates existing at the SL ICM 2202, or by providing new templates. If new templates are provided, they may be stored by SL ICM 2202 similarly to those provided in step 2210 (e.g. in a template library) and referenced by the enhanced app registration information.

Descriptions of the Ax-Events to be used for discovery purposes. For example, this information may be used to discover all interactors used for sound control on a home platform, although some may be gesture based, some may use on/off tap buttons, etc.

Settings to be used when a corresponding Interactor is instantiated. This is information that may be used similarly to the ixInstantiationSettingsDefaults of a template, but it may supersede those settings given that it is provided on a more dynamic, per-App basis.

Information provided by the Apps at registration may alternatively be provided or updated by Apps after registration via CRUD operation(s) or other messages (e.g., Interactor-Usage-Indication).

the dedicated message Interactor-Usage-Indication with the ixTemplateIDList information may be sent by the second app to SL ICM 2202.

A third application may provide the full description of templates X and Y itself as well as the ixInstantiationSettings. This method may be especially useful for introducing new templates, which have not been pre-provisioned in step 2210. The dedicated message Interactor-Usage-Indication may be sent by Apps to the SL ICM 2202 containing ixTemplateDefintionList with a list of entire template definitions as shown in Table 13.

For populating the ixInstantiationSettings, apps may use defaults or local policies. The element may also not be present, in which case the template or local policies at the SL ICM 2202 may be used.

The App registration procedure is assumed to result in RESTful environments in at least one app-dedicated resource being created at the SL, e.g. in oneM2M an <AE1> resource corresponding to app 2201 may be created at registration. That resource may therefore be enhanced with the information in Table 16.

In RESTful architectures, the information provided via the Interactor-Usage-Indication message may be provided

TABLE 16

Parameters for enhanced App registration or for new Interactor-Usage-Indication message

| Element | Description |
| --- | --- |
| axEventOperationList | A list of all the operations to be performed using Ax-Events for this App. |
| axEventActionDescr | Provides information about the use of the Ax-Event in this Interactor instantiation. For example, on a home control platform On/Off Ax-Events might be described as providing lighting control, sound control, turning on/off platform alarms, etc. This description may be used to discover which Interactors are used for a specific purpose, etc. |
| ixTemplateIDList | A list of references to the Template definition available at the ICM. This element is optional if the Template definition is included in the message. Each Template in the list corresponds to an axEvent from axEventOperationList, and are provided in the same order. |
| ixTemplateDefintionList | Includes the entire Template definition, as detailed in Table 1. This element is optional if the Template definition is already provided to the ICM. Each Template in the list corresponds to an axEvent from axEventOperationList, and are provided in the same order. |
| ixInstantiationSettingsList | Optional settings for the Interactor initial instantiation (see ixInstantiationSettings in ixInstance), superseding those provided by the Template. |

In preparation for step 2212, apps may use resource discovery procedures or assumptions regarding the capabilities of the SL ICM 2202. For example:

A first app (e.g., app 2201) may assume that the templates uses (e.g., templates X and Y) are known/available at SL ICM 2202 and may provide a minimum amount of information such as template IDs (ixTemplateIDList). If any of the templates are unknown, the first app may receive error an in response. This information may be provided by the first app at registration time, as shown in FIG. 22, in which case the registration information is enhanced to include this information. Alternatively, a dedicated Interactor-Usage-Indication message with the ixTemplateIDList may be used.

A second app, may discover which templates are known/available at the SL ICM 2202 (e.g. by discovering the template library), then may choose templates X and Y based on its capabilities. Assuming a discovery procedure is used, via CRUD operations on resources containing the information detailed in the Table 16. For example, in oneM2M, the <AE> resource type enhancement may then be used not only for the registration option, but may also be used to implement the Interactor-Usage-Indication message via an UPDATE operation targeting the <AE> resource.

Step 2212 may be performed during other phases of this procedure 2200, effectively updating the supported Ax-Event information of an app, e.g. app 2201.

During Phase B (Initialization/Registration) 2205, resources representing an interactor and resources supporting interactor functionality may be created and initialized. The creation of the resources is accompanied by the initialization of the necessary parameters with default/initial values, which may also be based on an interactor template(s), local policies, or explicit signaling (e.g. CRUD operations). At the end of Phase B 2205, in addition to the newly created resources, SL ICM 2202 has the information corresponding to the Ix set of elements in an ixInstance.

SL ICM 2202 may register a new interactor instance on behalf of app 2201 (step 2213). Step 2213 may be performed by SL ICM 2202 and may be triggered by registration of app 2201 or by an explicit request from app 2201 (e.g., via the Interactor-Usage-Indication message, i.e. triggered by the completion of step 2212). The parameter initialization may be based on exiting information, e.g., interactor template or local policies. Step 2213 may result in the creation and initialization of interactor related resources that support the functionality of a new interactor instance. The newly created resources may be populated with defaults as specified in the initializationDefaults of the template or may be based on local policies available at SL ICM 2202.

For example, the following resources may be created and initialized during step 2213:

One ixInstanceXI resource, which may be the resource used by SL ICM 2202 for overall management of Ix-Event to Ax-Event correspondence for the Interactor instance.

One or more resources based on ixEventResourceDescription: the resources that may be used by SL ICM 2202 to enable the communication (IxEvent) between the SL ICM 2202 and interactor 2203, based on physical user interactions. Once SL ICM 2202 creates these resources, it may link them to ixInstanceX1 using the ixInteractResList. For example, if the ixInteractionResourceDescription of the template specifies that two containers are needed, containerX1 and container X2 may be created and linked to interactor 2203 via entries in the ixInteractResList attribute.

One resource based on ixInstantiationResourceDescription: this resource may be used by SL ICM 2202 to trigger the instantiation of interactor 2203. Once the SL ICM 2202 creates this resource, it may link it to ixInstanceXI using the ixInstantiationTrigger. For example, if the ixInstantiationResourceDescription of the template specifies that a <mgmtCmd> is needed, instatiationTriggerX1 of a mgmtCmd resource type may be created and linked to interactor 2203 via the ixInstantiationTrigger attribute.

An alternative for the interactor registration being performed after app 2201 registration is similar to the above, but a triggering message Interactor-Request from app 2201 may be used (see Table 17 below). Other implementations may use other events or notifications as triggers, but the procedure 2200 may still include the interactor support resource creation and populating the resources parameters with defaults.

residing on a device that is different than the SL device in order to register or advertise itself Step 2214 may result in the creation and initialization of the any of the interactor related resources at the SL as described above, but in contrast to step 2213, the resource creation and initialization is triggered by an interactor, e.g., interactor 2203.

This alternative may be used, for example, when interactor functionality is deployed on devices different than the device/platform with ICM functionality. SL discovery and registration procedures may be used for this purpose.

When interactor 2203 has access to information indicating the capabilities of SL ICM 2202, it may be programmed to create and initialize its own support resources. The following resources may be created by interactor 2203 at the SL and hosted by the ICM (e.g., SL ICM 2202) during step 2214:

One ixInstanceX1 resource for overall Interactor management

One or more resources based on ixEventResourceDescription to enable the communication (IxEvent) between the SL ICM 2202 and interactor 2203. Once interactor 2203 creates these resources, it may link them to ixInstanceX1 using the ixinteractResList.

One resource based on ixInstantiationResourceDescription used by SL ICM 2202 to trigger the instantiation of interactor 2203. Once SL ICM 2202 creates this resource, it may link it to ixInstanceX1 using the ixInstantiationTrigger. For example, if the ixInstantiationResourceDescription of a template specifies that a <mgmtCmd> may be used, instatiationTriggerX1 of mgmtCmd resource type may be created and linked to interactor 2203 via the ixInstantiationTrigger attribute.

The method that the newly created resources are populated with defaults may be specified in the initializationDefaults of the template or may be based on local policies available at SL ICM 2202.

During Phase C (Association and Instantiation) 2206, interactor 2203 may be associated with app 2201 (step 2215). The resources representing and supporting functionality of interactor 2203 may provide the means to create a list of associations for each interactor instance. Each association may map a Cx-State to an Ax-Event and an Ix-Event.

This association between interactor 2203, app 2201, and templates may be performed using the related resources (e.g. ixinstanceX1, AE1 and TemplateX respectively). Maintain-

TABLE 17

| Interactor-Request message | |
| --- | --- |
| Element | Description |
| ixID | Identifier for the Interactor |
| appIdentifier | Identifier of the App to be associated with this Interactor (e.g. AE-ID in oneM2M) |
| ixTemplateID | A reference to a Template definition available at the ICM, e.g. one of the templates indicated at registration. |
| ixInstantiationSettings | Additional settings to be used for the Interactor instantiation, which may not be specified by the Template. Same description and use as in |
| axEventOperation | Description of the operation to be performed |
| assocIxCstateID | Link to the definition of a IxC-State for which this association applies. This parameter may not be needed for an initial association |

Alternatively, rather than SL ICM 2202 may register a new interactor instance on behalf of app 2201 as in step 2213, interactor 2203 may register itself with SL ICM 2202 (step 2214). Step 2214 may be performed by interactors ing this association is part of the functionality offered by SL ICM 2202 and enables for example:

(1) Using a single UI (e.g., based on template X) to provide user interactions individually to multiple apps (as exemplified in the deployment of the multi-purpose pushbutton described above with respect to step 2211). In this case a single ixInstance may have an assocList with elements as follows:

[Cx set of elements]:
assocList[i].cxStateIDAssoc=cxList[i].cxStateID from cxList (as described above).

[Ix set of elements] derived from a single Template X and repeated for all elements. This set of elements comprises of:
ixEventResList
ixinstantiationTrigger
ixinstantiationSettings

[Ax set of elements] for each element derived from the registration of a different app, see Step 2212 and Table 16. This list of elements may comprise:
axAssocApp
axEventOperation
axEventActionDescr 2) Using multiple UIs to provide user interactions to a single app, as exemplified in the example described above for changing the interface depending on user. In this case a single ixInstance may have an assocList with elements as follows:

[Cx set of elements]:
assocList[i].cxStateIDAssoc=cxList[i].cxStateID from cxList (as described above).

[Ix set of elements] for each element derived from a different Template. This set of elements may comprise:
ixEventResList
ixInstantiationTrigger
ixInstantiationSettings

[Ax set of elements] derived from the registration of a single app (see Step 2212 and Table 4) and repeated for all elements. This list of elements may comprise:
axAssocApp
axEventOperation
axEventActionDescr Below if an example cxList for cState changes by a user:
cxList[0]/cxStateID=A
cxList[0]/cxStateDescr=(user, Alice)
cxList[1]/cxStateID=B
cxList[1]/cxStateDescr=(user, Bob), etc.

(3) Publishing and discovery of information about the available templates. This may be used for example by apps or interactors to discover ICM capabilities and may use a regular discovery method for individual template resources or the template library.

(4) Enabling bulk changing of UI style (as exemplified in the example above by the auditory alerts being changed to visual ones for a hearing-impaired visitor). In this case a new entry may be added to the cxList, for example for the duration of the person's visit, upon user request. Then a discovery may be performed, targeting the template library and looking for templates with interactionMethod and/or interactionEnvironment indicative of audio and visual alerts. Each discovered audio template may have an ixInstanceList which may enable quick discovery of the targeted ixInstances. For all these ixInstances, a new assocList entry is created, and the cxStateIDAssoc equal to the cxStateID of the newly created context for the visit times. In these entries the [Ax set of elements] may be kept unchanged, while the [Ix set of elements] may be created based on a different, visual alert template.

(5) Enabling value-add ICM services such as dynamic changes of UI instantiation settings (as exemplified in the example above where auditory alerts are being changed to visual when the noise level is detected by the ICM to be above a certain level). This case may be implemented similarly to the one above, except that the ICM may create the new entry for the cxList using advanced functionality such as machine learning, predictive analysis, etc.

In procedure 2200, the initial linking between interactor 2203 and app 2201 resources had been done at Phase B (Initialization/Registration) 2205. If repeating 2215, the linking may be updated by apps using an Interactor-Request message to create new associations or update existing ones.

The following is an example for associating Interactor X1, App1, and Template X by populating the associated resources (e.g. ixInstanceX1, AE1 and TemplateX, respectively):
ixInstanceX1/ixTemplate=ixTemplateX
ixInstanceX1/assocList[n]/axAssocApp=AE1:
and
ixTemplateX/ixInstanceList=ixInstanceX1, . . .
and
AE1/aeIxInstanceList=ixInstanceX1 . . .

The other parameters of the assocList of ixInstanceX1 may be populated as detailed previously, e.g. crntAssocIndex, cxStateID and ixEventActionDescr based on initializationDefaults of the Template or local policies, ixInstantiationSettings from Interactor-Usage-Indicator or registration message, etc. Similarly, ixEventResList may be populated with a link to the resources created based on ixEventResourceDescription of the template. The SL ICM 2202 may maintain crntAssocIndex pointing to the entry in the assocList corresponding to the current context.

The actions taken in step 2215 may differ depending on the iteration. For example, immediately after the initial interactor instantiation, an initial configuration of association may be performed. If it is performed after further context changes, it may result in associations being updated or paused, or one or all associations being deleted (without the Interactor being deleted, etc.)

Interactor 2203 may then be instantiated (step 2216). The interactor instantiation, which is the process of running the UI software of the interactor, is performed. When executing step 2216 for the first time after Phase A (Setup) 2204 and Phase B (Initialization/Registration) 2205, software of interactor 2203 may be triggered to run based on the newly created interactor and the initial association. When executing step 2216 after further context changes, the UI of interactor 2203 may be triggered to run with the updated association.

This results in interactor 2203 processing user interactions and Ix-Events that are exchanged via the SL ICM 2202 with the associated app (e.g., app 2201). The triggering may be performed by the entity that created the associated resources, i.e. either the app (e.g., app 2201) or the SL ICM 2202.

SL ICM 2202 may evaluate SL context and translate user interactions to IxEvents (step 2217). The SL ICM may continuously evaluate the context based on the Ix-C rules provided to SL ICM 2202 during Phase A (Setup) 2204. If the rules are updated dynamically, the SL ICM 2202 may update the definitions of its Cx-States and the evaluation follows current rules. The SL ICM 2202 may use the associations to continuously communicate with apps and interactors by translating user interactions to IxEvents (or vice-versa). During the step 2217 the SL ICM 2202 may also communicate with the interactors, translating user interactions into/from IxEvents at the apps as shown above.

If context changes, SL ICm 2202 may go to step 2215 (change associations), otherwise go to step 2217 (keep evaluating). The ICM may maintain the context-based interaction management state machine. If context changes such that a different association is needed for the interactor (step 2218), go to step During Phase C (Association and Instantiation) 2206, otherwise keep evaluating (go to step 2217). In order to update the association, SL ICM 2202 may align the crntAssocIndex of an ixInstance to the assocList index with the corresponding context state (cxStateIDAssoc).

The interactor deregistration procedure may then occurs, which deletes the resources which support interactor 2203 functionality at SL ICM 2202 (step 2219). This phase may ends with the Interactor in Deregistered state, however ICM services continue.

Figure 23:
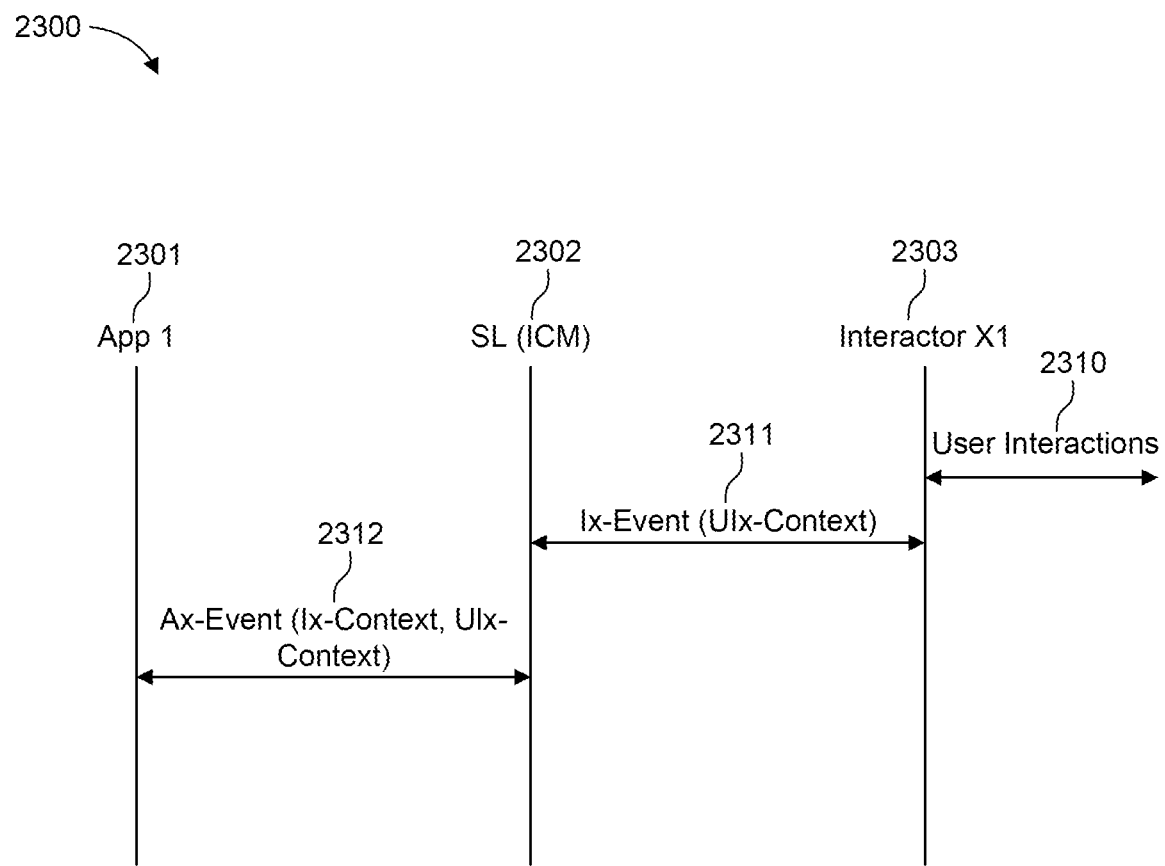
FIG. 23 is a diagram of an example procedure for translating user interactions into interactor events in accordance with one embodiment, which may be used in combination with any of the embodiments described herein.

FIG. 23 is a diagram of an example procedure 2300 for translating user interactions into interactor events in accordance with one embodiment, which may be used in combination with any of the embodiments described herein. The example of FIG. 23 describes processing a received input user interaction using the association between interactor 2303 and app 2301 (outputs and complex interactions may be treated similarly as in this example). Referring to FIG. 23, user interactions may occur and may be processed by the interactor 2303 (step 2310). Interactor 2303 may provide the SL ICM 2302 with an event based on the input user interaction and the event may include some user interaction generated information (step 2311). For example, for a mouse click the event may capture/include position of the mouse on the screen. In RESTful architectures, this step may be implemented by using the interactor-associated resources at the SL (e.g. entries in the ixEventResList). For example in the Initialization/Registration phase described above the corresponding resource ixInstanceX1 has been created with a corresponding entry in the ixEventResList e.g. containerX1. In this step the user interactions may result in interactor 2303 updating containerX1.

SL ICM 2302 may send a corresponding IxEvent to app 2301 and may include, in addition to the UI context, information about the SL context, which is part of the value-add of using the ICM (step 2312). This way app 2301 may be informed not only that the user clicked the mouse, but may obtain other info about SL context when the click occurred.

In some embodiments, the event processed by the interactor 2301 in step 2311 may map directly to the IxEvent, so it is forwarded by SL ICM 2302 to app 2301. This implementation may provide optimizations but may forgo the value-add of providing SL context associated with the User Interactions to the apps. With this optimization, the ICM may provide services by switching the association between interactors and apps based on context switching.

This type of functionality may allow for context-dependent interpretation of user action, not only context-dependent instantiation of interactors. An example is that of the implementation introduced above, there the home control platform detects high noise levels or knows it from the high stereo volume setting. The cxRules may specify: "Store alarms and repeat them periodically with changed settings (ixinstantiationSettings) or type (associations) until acknowledged". When ICM receives an output IxEvent it may know from its functional description that it is an alarm and from the associated Interactor if it is audio, visual, etc. After an unacknowledged audio alarm, it may repeat it with different volume, tone, etc. If the ambient noise is too high, it may create a new Cx-State for the current environment, with a new visual Interactor (flashing LED) associated it to the IxEvent. The alarm may then be repeated in a form more likely to be acknowledged. While this deployment may be better suited for platforms using machine learning and predictive analysis, it may uses the same basic ICM and Interactor functionality as described herein.

The ICM functionality and procedures described herein may be implemented using oneM2M resources such as by being implemented as an ICM CSF that resides in a CSE and exposes its services to AEs. The Interactors introduced above may also be realized as one or more CSFs. The Interactors may be realized in the same CSF as the ICM or separate CSF(s). The Interactors may also be realized as AEs or IPEs. Apps may also be realized as AEs.

For example, the procedure 2200 of FIG. 22 may be mapped in oneM2M as follows:

Step 2210 may be implemented by introducing a new resource type <ixTemplate>. The content may be provided using pre-provisioning DM operations or the existing RESTful procedures in oneM2M.

Step 2211 may be implemented by a new resource type <cxList>. The resource content may be provided using a GUI as described in the Phase A (Setup) 2204 and the existing RESTful procedures in oneM2M. Unless the cxList is exposed to other entities, a resource of this type may not be defined, but the resource functionality may still be provided locally in the Service Layer, however in an implementation-specific manner.

Interactor-Usage-Indication message Step 2213 may be implemented by introducing a new resource type <ixInstance> and the existing RESTful CREATE procedures in oneM2M. This step may also result in the creation of other types of existing oneM2M resources (e.g. <container>, <flexContainer>) of a type as specified in ixEventResourceDescription.

Step 2215 may be implemented via the existing RESTful UPDATE procedures in oneM2M on resources of types <ixInstance>, <AE>, and <ixTemplate> targeting attributes such as ixID, appIdentifier, ixTemplateID, ixInstantiationSettings, ixEventOperation, cxStateIDAssoc. Alternatively, it may be implemented with Interactor-Request message providing these parameters to the ICM, where the corresponding resources are updated.

Step 2216 may be implemented as the process of creating a new instantiation of a given software application or process.

Step 2217 may be implemented as existing RESTful procedures in oneM2M as follows:

Interactors may provide inputs and ICM relays outputs by performing RESTful operations on the Interactor-related resources based on ixEventResourceDescription (of existing oneM2M types);

ICM and Apps use the resources specified in ixEventOperation (of existing oneM2M types);

The <ixTemplate> resource may represent a single interactor template and may be specified as described in Table 18 below. The <ixTemplateLibrary> resource may contain a set of templates which may be discovered (e.g., by apps) in order to select or indicate a specific template to be used for interactor instantiation.

TABLE 18

Attributes of new <ixTemplate> resource type

| Attributes of <ixTemplate> | Multiplicity | RW/ RO/ WO | Description |
|---|---|---|---|
| ixTemplateID | 1 | RW | An ID for tracking the template |
| ixTemplateEvents | 1(L) | RW | A list of ix-Event types supported by the Interactors based on this template. The ix-Event may include for example: binary input, multiple choice input, text input, alarm output, text output, etc. |
| ixTemplateFunctionalType | 0 . . . 1 | RW | Indicates the functionality provided by the Interactor that may be instantiated based on this template. The template functional type is strongly correlated with the ix-Events supported, however a functional type may be used to define templates for Interactors supporting more than one ix-Event type or provide other template constraints that define the functionality. |
| ixEventResourceDescriptions | 0 . . . 1(L) | RW | List of resource types, indicating the resources to be instantiated in relationship with any Interactor based on this Interactor template. |
| initializationDefaults | 0 . . . 1 | RW | Provides information that is used to populate the Interactor-related resources of any about the conditions under which the Interactors based on this Template at initialization time. For example, it indicates if a default App should be associated at initialization, or which Interaction context to be used as default at initialization (crntAssocIndex). |
| ixInstantiationSettingsDefaults | 0 . . . 1 | RW | Provides default settings to be used for the initial instantiation of any Interactor based on this template. When no defaults are provided in the template, the parameters will be provided at instantiation time or will be set based on local policies. |
| ixInstantiationResourceDescription | 1 | RW | Provides a description for the resource(s) to be created at the SL to enable the instantiation of the Interactor (i.e. triggering the UI to run) and the trigger commend.<br>For example, in a oneM2M implementation this element might indicate a <mgmtCmd> resource and as trigger its execEnable attribute. |
| ixInstantiationSettingsDefaults | 0 . . . 1 | RW | Provides default settings to be used for the initial instantiation of any Interactor based on this template. When no defaults are provided in the template, the parameters will be provided at instantiation time or will be set based on local policies. |
| interactionMethod | 0 . . . 1 | RW | Indicates the type of User Interactions that can be used with Interactors based on this template, e.g. tap, double tap, gesture, etc. wildcard may be accepted, in which case the Interactors instantiated based on this template employ an interaction method based either on settings provided at instantiation, local policies, etc. |
| interactionEnvironment | 0 . . . 1 | RW | Indicates the type of environment required for the User Interactions that can be used with Interactors based on this template, e.g. touchscreen, microphone, LED, etc. Wildcards may be accepted, in which case the Interactors instantiated based on this template employ an interaction method based either on settings provided at instantiation, local policies, etc. |
| ixInstanceList | 0 . . . 1(L) | RW | List of resource IDs of all Interactors instantiated based on this Template, for management purposes. |

The <ixTemplateLibrary> resource may contain the following child resources.

TABLE 19

Child resources of <ixTemplateLibrary> resource type

| Child Resources of <ixTemplateLibrary> | Child Resource Type | Multiplicity | Description |
| --- | --- | --- | --- |
| [variable] | <ixTemplate> | 0 . . . n | Each resource describes an Interactor Template |

The <cxState> resource may contain the information needed to define a context state for the ICM. The <cxList> resource may contain a list of all the <cxState> resources to be used by the ICM in monitoring and managing the Cx-State transitions.

The <cxList> resource may contain the following child resources listed in Table 20 below.

TABLE 20

Child resources of <cxList> resource type

| Child Resources of <cxList> | Child Resource Type | Multiplicity | Description |
| --- | --- | --- | --- |
| [variable] | <cxState> | 0 . . . n | Each resource describes an Cx-State, see definition below |

The <cxState> resource may contain the following attributes listed in Table 21 below.

TABLE 21

New <cxState> resource type

| Attributes of <cxState> | Multiplicity | RW/ RO/ WO | Description |
| --- | --- | --- | --- |
| cxStateID | 1 | RW | An ID for tracking the Context state |
| cxStateDescr | 1(L) | RW | A set of cxStateDescr 4-tuples describing the context state. This definition may be provided in a variety of forms. See Table 10 for example. |
| cxRules | 0 . . . 1( )L) | RW | This is an optional attribute, if the rules used by ICM to derive the Cx-States are to be exposed, otherwise the SL may maintain only Cx-States using cxStateDescr The rules may be provided and stored separately from the Cx-State descriptions, and there may not be a one-to-one mapping between states and rules. |

The following is an example implementation of the context states (cxStateDescr) based on attribute matching conditions for resources in the SL. Other implementations may be envisioned. For example, state changes may occur when the ICM receives specific notifications, or at specific times of day, etc.

In this example, the set of parameters represented in the cxStateDescr attribute is comprised of 4-tuples (contextResourceIDs, cxStateCriteria, timeWindowType, timeWindowSize) with parameters shown in Table 22 below. The cxStateDescr attribute may contain at least one tuple.

TABLE 22

Parameters in cxStateDescr 4-tuples

| Name | Description |
| --- | --- |
| contextResourceIDs | This attribute indicates the list of resourceIDs for which the event is to be captured and reported. Whenever an operation is performed on the resource in this list, the Cx-State is evaluated. |
| cxStateCriteria | This attribute indicates the criteria based on which Cx-State is evaluated. See Table 11 for more details. |

TABLE 22-continued

Parameters in cxStateDescr 4-tuples

| Name | Description |
|---|---|
| timeWindowType | If the Cx-State matching criteria requires multiple conditions to be met within a window of time, rather than simultaneously, this attribute indicates the type of time window mechanism (e.g. timeWindowType = 0 stands for no window, matching conditions need to occur simultaneously, timeWindowType = 1 stands for periodic time window without any overlapping; timeWindowType = 2 represents sliding time window) |
| timeWindowInfo | This attribute indicates the size or time duration (e.g. in seconds) of the time window (if any), based on which the Cx-State is to be evaluated. |

TABLE 23 cxStateCriteria conditions

| Condition tag | Multiplicity | Matching condition |
|---|---|---|
| modifiedSince | 0 . . . 1 | The lastModifiedTime attribute of the resource with contextResourceID is chronologically after the specified value. |
| unmodifiedSince | 0 . . . 1 | The lastModifiedTime attribute of the resource with contextResourceID is chronologically before the specified value. |
| stateTagSmaller | 0 . . . 1 | The stateTag attribute of the resource with contextResourceID is smaller than the specified value. |
| stateTagBigger | 0 . . . 1 | The stateTag attribute of the resource with contextResourceID is bigger than the specified value. |
| expireBefore | 0 . . . 1 | The expirationTime attribute of the resource with contextResourceID is chronologically before the specified value. |
| expireAfter | 0 . . . 1 | The expirationTime attribute of the resource with contextResourceID is chronologically after the specified value. |
| sizeAbove | 0 . . . 1 | The contentSize attribute of the <contentInstance> resource with contextResourceID is equal to or greater than the specified value. |
| sizeBelow | 0 . . . 1 | The contentSize attribute of the <contentInstance> resource with contextResourceID is smaller than the specified value. |
| operationMonitor | 0 . . . n | The operations and/or the Originators accessing the resource with contextResourceID matches the specified value. It allows monitoring which operation and/or which Originator is attempting to the access the resource with contextResourceID regardless of whether the operation is performed. |
| attribute | 0 . . . n | A list of attribute names and values of a resource with contextResourceID. The tag name is variable and depends on its usage and the value of the attribute can have wild card *. E.g. creator of container resource type can be used as a tag as "creator = Sam", "creator = Sam*", "creator = *Sam". If all attributes specified on this list match the given values, the condition is met. |
| conditionOperation | 0 . . . 1 | Indicates the logical operation (AND/OR) to be used for the condition tags. The default value is logical AND. |

The rules when multiple conditions may be used together as follows:

Different condition tags may use the "AND/OR" logical operation based on the conditionOperation specified;

Same condition tags may use the "OR" logical operation.

The resource type <ixAssociation> comprise child resources of an <ixInstance> resource corresponding to an Interactor instance. For an interactor (as represented by <ixInstance>) each <ixAssociation> may represent an association between an Cx-State (as represented by the cxStateID) and an AE (as represented by axAssocApp).

TABLE 24

Attributes of <ixAssociation> resource type

| Attributes of <ixAssociation> | Multiplicity | RW/ RO/ WO | Description |
|---|---|---|---|
| associationStatus | 0 . . . 1 | RW | Indicator of the status of the association. In order to be able to preserve association information longer term and re-use it, associations may be placed in various states e.g. active/inactive/paused, etc. |
| cxStateIDAssoc | 1 | RW | ID corresponding to an entry in the <cxList> for which this association applies |
| ixEventResList | 0 . . . 1(L) | WO | List resource ID of the resources instantiated for this Interactor based on the ixEventResourceDescription of the Interactor template. |
| ixInstantiationTrigger | 1 | WO | Indicates how the Interactor should be instantiated, e.g. a link to the execEnable attribute of the <mgmtCmd> created based on ixInstantiationResourceDescription. |
| ixInstantiationSettings | 0 . . . 1(L) | RW | Resource IDs of one or more <flexContainer> containing additional settings to be used for the Interactor instantiation in this context. For example, if an On/Off touch button should be instantiated, the flexContainer might indicate (active position = top left), (default position = raised), (background = gray), etc. |
| axAssocApp | 1 | RW | Resource ID of an <AE> resource associated with this Interactor when the ICM context is in the associated Cx-State (cxStateID above) |
| axEventOperation | | | Provides complex information about the use of the Ax-. For example, on a home control platform an Ax-Event might turn on a washing machine by updating a resource. This description includes a link to the resource to be updated and a description of the operation required. It may also include other description of device type, etc. which may be used to discover the operations which may be performed via Interactors. |
| axEventActionDescr | 0 | | Provides information about the use of the Ax-Event. For example, on a home control platform On/Off Ax-Events might be described as providing lighting control, sound control, turning on/off platform alarms, etc. This description may be used to discover which and Interactors used for a specific purpose, etc. |

The <ixInstance> resource type may represents an interactor instance and may include information about all Cx-States (via child <ixAssociation> resources) based on which the interactor may change association with AEs.

The <ixInstance> resource may contain the child resources listed below in Table 25.

TABLE 25

Child resources of <ixInstance> resource type

| Child Resources of <ixInstance> | Child Resource Type | Multiplicity | Description |
|---|---|---|---|
| [variable] | <ixAssociation> | 0 ... n | See Table 12 |

TABLE 26

Attributes of new <ixInstance> resource type

| Attributes of <ixInstance> | Multiplicity | RW/ RO/ WO | Description |
|---|---|---|---|
| ixID | 1 | RW | Identifier for the Interactor instance |
| ixTemplateID | 1 | RW | The ID of the Template based on which this Interactor has been created. |
| crntAssocIndex | 1 | RW | An index into the list of <ixAssociation> child resources, pointing to the <ixAssociation> with the current association |

Attributes for resource type <AE> and parameters for the Interactor-Usage-Indication message are described herein. An <AE> resource may represent information about an application entity registered to an SL. Table 27 and Table 28 describe new elements (i.e. child resources and attributes) of the <AE> resource type for enhanced functionality.

TABLE 27

New child resources of <AE> resource type

| Child Resources of <AE> | Child Resource Type | Multiplicity | Description |
|---|---|---|---|
| [variable] | <ixTemplate> | 0 ... n | For <AE>s using Interactors, this list provides Templates to be used for this AE. If the ixTemplateID of this resource is not empty, the union of the two lists shall be considered. |

TABLE 28

Additional <AE> resource type attributes

| Additional Attributes of <AE> | Multiplicity | RW/ RO/ WO | Description |
|---|---|---|---|
| axEventOperationList | 0 ... 1(L) | RW | For <AE>s using Interactors, a list of all the operations to be performed using Ax-Events for this AE |
| axEventActionDescrList | 0 ... 1(L) | RW | Optional attribute, each entry provides information about the use of an Ax-Event entry axEventOperationList. This description may be used to discover which Interactors are used for a specific purpose, etc. |

TABLE 28-continued

Additional <AE> resource type attributes

| Additional Attributes of <AE> | Multiplicity | RW/ RO/ WO | Description |
|---|---|---|---|
| ixTemplateIDList | 0 . . . 1(L) | RW | For <AE>s using Interactors, an ordered list of resource IDs of <ixTemplate> resources with the applicable Template definitions available at the ICM. Each Template in the list corresponds to an axEvent from axEventOperationList, and are provided in the same order. |
| ixInstatiationSettingsList | 0 . . . 1(L) | RW | For <AE>s using Interactors, resource IDs of one or more <flexContainer> containing additional settings to be used for the Interactor instantiation in this context. For example, if an On/Off touch button should be instantiated, the flexContainer might indicate (active position = top left), (default position = raised), (background = gray), etc. Each set of settings in the list corresponds to an axEvent from axEventOperationList, and are provided in the same order. |
| aeIxInstanceList | 0 . . . 1(L) | RW | Optional list of the Interactors (ixInstance resource IDs) associated with this AE. |

A difference between the list of new <AE> resource type attributes in the tables above and the content of the Interactor-Usage-Indication message in Table 16 is the ixTemplateDefintionList because a oneM2M implementation where all templates are stored in <ixTemplateLibrary> and only referenced in the <AE> resources is assumed here. Other implementations may choose to store templates as <ixTemplate> resources, new child resources of the <AE> resource type.

In a RESTful environment such as oneM2M, and given the <AE> resource definition above, the Interactor-Usage-Indication message may be assumed to be implemented using UPDATE operations targeting these new attributes of the <AE> resource type. If new templates are to be provided using the ixTemplateDefintionList of the Interactor-Usage-Indication message, an additional UPDATE operation for the <ixTemplateLibrary> may be used.

The following are example embodiments for the service layer framework for integrating generic and functional user interfaces as services managed by the SL on behalf of requesting entities:

1. An apparatus comprising a processor, a memory, and communication circuitry, the apparatus being connected to a network via its communication circuitry, the apparatus further comprising computer-executable instructions stored in the memory of the apparatus which, when executed by the processor of the apparatus, cause the apparatus to perform operations comprising:

receiving first information indicating a plurality of context-switching rules;

receiving second information indicating a plurality of operations that are each configured to be triggered based on at least one physical interaction; and determining, based on the context-switching rules, a mapping between each triggered operation and signals produced, based on the at least one physical interaction, by at least one of a first type of service layer entity.

2. The apparatus of embodiment 1, wherein the mapping changes in response to updated context-switching rules.

3. The apparatus of embodiment 1, further comprising computer-executable instructions stored in the memory of the apparatus which, when executed by the processor of the apparatus, cause the apparatus to perform further operations comprising:

receiving at least one application registration message.

4. The apparatus of embodiment 3, wherein the second information is provided with the at least one application registration message.

5. The apparatus of embodiment 3, wherein the at least one application registration message is received from at least one application.

6. The apparatus of embodiment 1, further comprising computer-executable instructions stored in the memory of the apparatus which, when executed by the processor of the apparatus, cause the apparatus to perform further operations comprising:

receiving a message comprising a plurality of templates, wherein each template comprises functional information associated with each signal produced by a service layer entity of the first type, wherein the second information indicates at least one template corresponding to each operation.

7. The apparatus of embodiment 6, further comprising computer-executable instructions stored in the memory of the apparatus which, when executed by the processor of the apparatus, cause the apparatus to perform further operations comprising:

instantiating each service layer entity that produces, based on the mapping, signals conforming to at least one template.

8. The apparatus of embodiment 1, further comprising computer-executable instructions stored in the memory of the apparatus which, when executed by the processor of the apparatus, cause the apparatus to perform further operations comprising:

receiving a service layer registration message from at least one service layer entity of the first type.

9. The apparatus of embodiment 8, wherein the service layer registration message is received from a plurality of service layer entities.

10. The apparatus of embodiment 1, further comprising computer-executable instructions stored in the memory of the apparatus which, when executed by the processor of the apparatus, cause the apparatus to perform further operations comprising:

receiving at least one application registration message;

receiving a message comprising a plurality of templates, wherein each template comprises functional information associated with each signal produced by a service layer entity of the first type, wherein the second information indicates at least one template corresponding to each operation; and identifying each service layer entity based on the received at least one application registration message and at least one template.

11. The apparatus of embodiment 1, wherein an updated mapping results, based on context, in the at least one physical interaction triggering a different operation.

12. The apparatus of embodiment 1, wherein an updated mapping results, based on context, in at least one operation being triggered by a different at least one physical interaction.

13. The apparatus of embodiment 1, further comprising computer-executable instructions stored in the memory of the apparatus which, when executed by the processor of the apparatus, cause the apparatus to perform further operations comprising:

detecting a service layer signal indicating that a first at least one physical interaction was performed; and transmitting, based on the mapping, a signal via at least one service layer entity to an operation of a plurality of operations.

14. The apparatus of embodiment 1, wherein the at least one physical interaction comprises a communication exchanged between software and a user via a user interface.

15. The apparatus of embodiment 14, wherein the communication is a mouse input, voice input, audio input, or click input.

16. The apparatus of embodiment 1, wherein the first information, second information, registration message, and the mapping are stored in a database.

17. The apparatus of embodiment 1, wherein the first information is received via the network.

18. The apparatus of embodiment 1, wherein the second information is received via the network.

19. The apparatus of embodiment 1, wherein the apparatus is a wireless communications device.

20. The apparatus of embodiment 1, wherein the apparatus is a computing device.

21. The apparatus of embodiment 1, wherein the apparatus is a smartphone.

22. The apparatus of embodiment 1, wherein the apparatus is a gateway.

23. A method performed by the apparatus as recited in any one of embodiments 1 to 22.

Figure 24A:
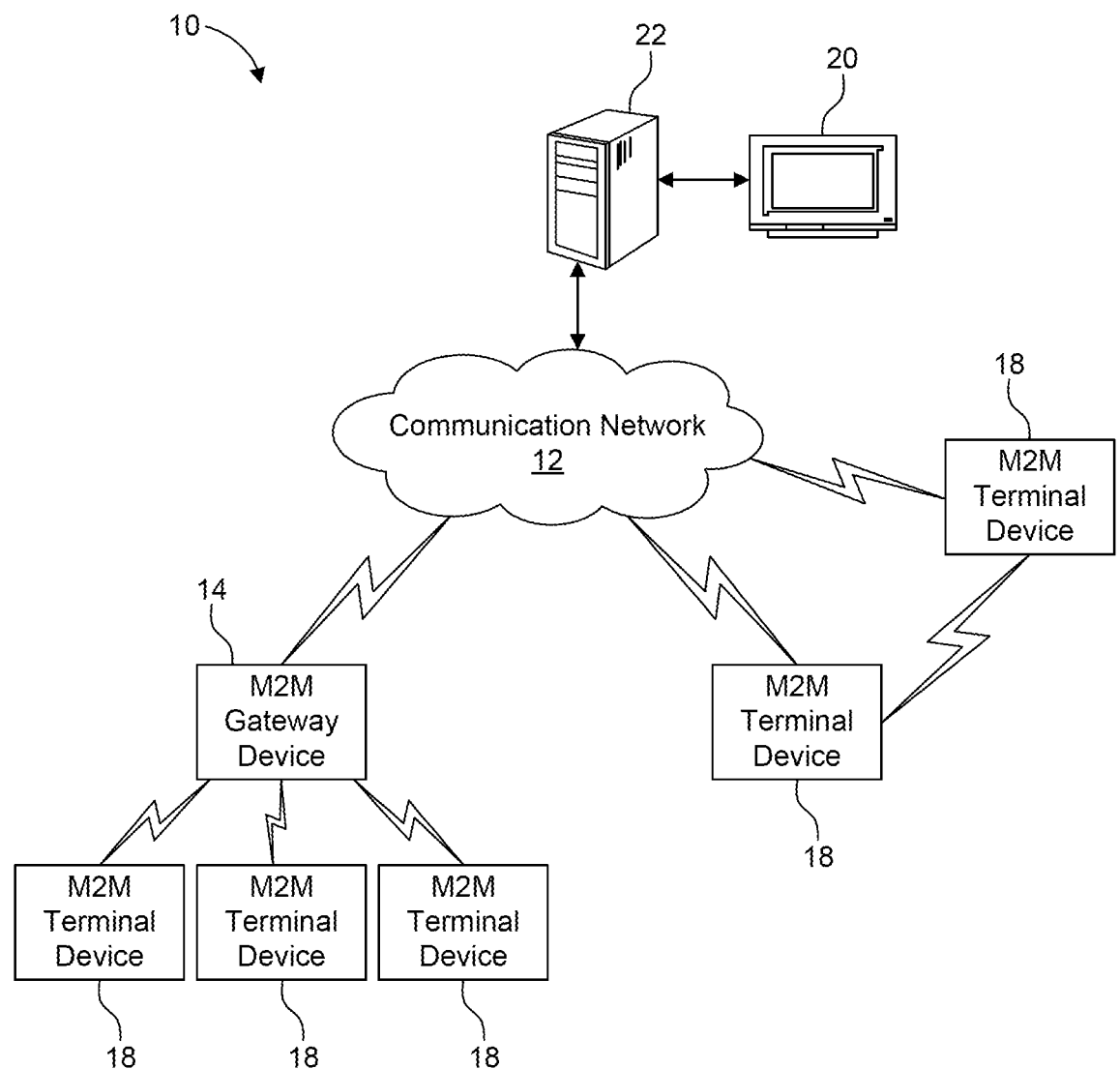
FIG. 24A is a system diagram of an example machine-to-machine (M2M) or Internet of Things (IoT) communication system in which one or more disclosed embodiments may be implemented.

FIG. 24A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT Service Layer, etc. Any of the client, proxy, or server devices illustrated in any of FIGS. 2, 5, 6, 8-12, and 19A-19C comprise a node of a communication system, such as the ones illustrated in FIGS. 24A-D.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer may provide applications and/or various devices with access to a collection of or a set of the above mentioned capabilities or functionalities, supported by the service layer, which may be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

As shown in FIG. 24A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 24A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different nodes (e.g., servers, gateways, device, and the like) of the network. For example, the Field Domain may include M2M gateways 14 and devices 18. It will be appreciated that any number of M2M gateway devices 14 and M2M devices 18 may be included in the M2M/IoT/WoT communication system 10 as desired. Each of the M2M gateway devices 14 and M2M devices 18 are configured to transmit and receive signals, using communications circuitry, via the communication network 12 or direct radio link. A M2M gateway 14 allows wireless M2M devices (e.g., cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or other M2M devices 18. The M2M devices 18 may also receive data from the M2M application 20 or an M2M device 18. Further, data and signals may be sent to and received from the M2M application 20 via an M2M Service Layer 22, as described below. M2M devices 18 and gateways 14 may communicate via various networks including, cellular, WLAN, WPAN (e.g., ZigBee, 6LoWPAN, Bluetooth), direct radio link, and wireline for example. Exemplary M2M devices include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Figure 24B:
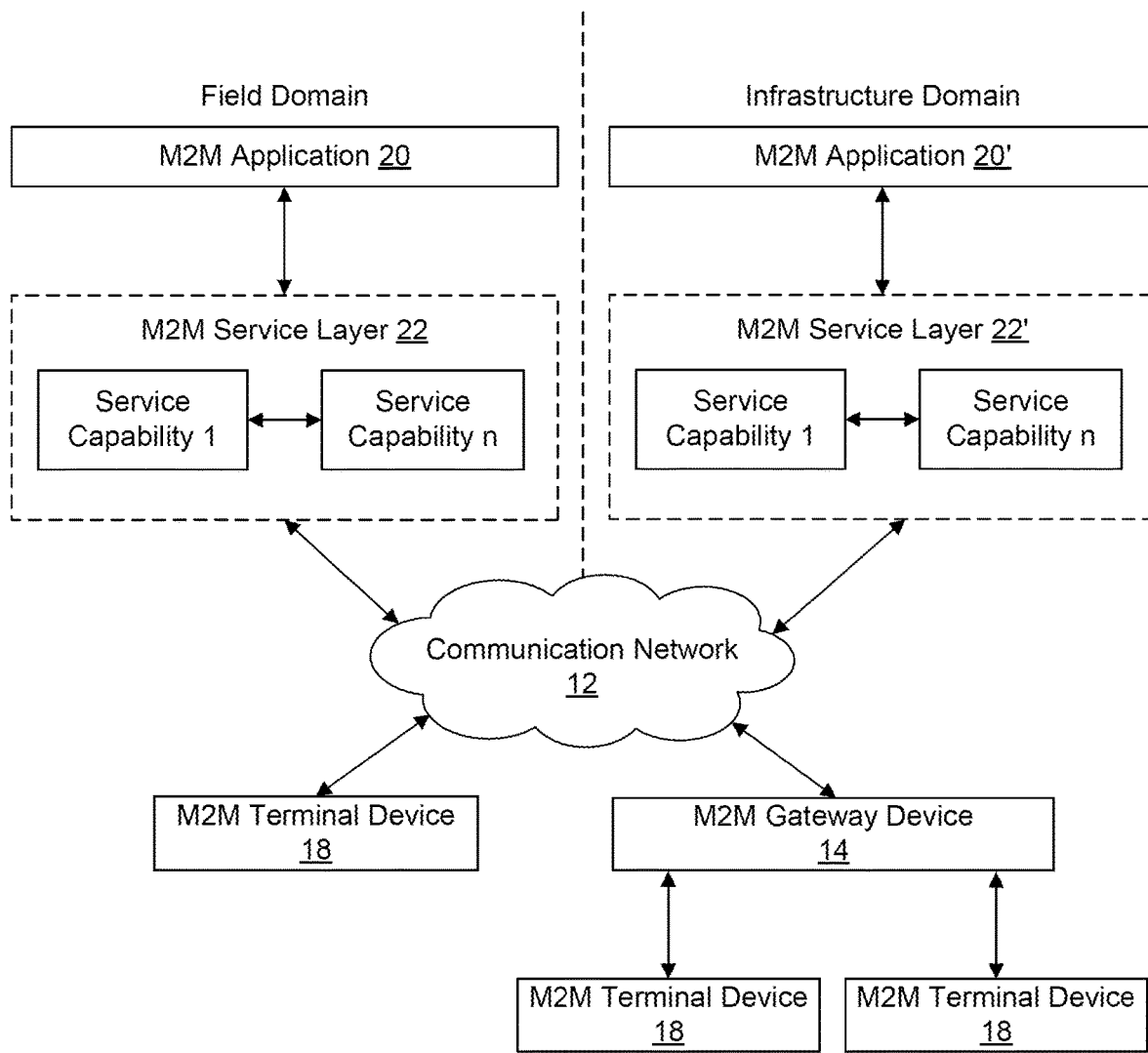
FIG. 24B is a system diagram of an example architecture that may be used within the M2M I IoT communications system illustrated in FIG. 24A.

Referring to FIG. 24B, the illustrated M2M Service Layer 22 in the field domain provides services for the M2M application 20, M2M gateways 14, and M2M devices 18 and the communication network 12. It will be understood that the M2M Service Layer 22 may communicate with any number of M2M applications, M2M gateways 14, M2M devices 18, and communication networks 12 as desired. The M2M Service Layer 22 may be implemented by one or more nodes of the network, which may comprise servers, computers, devices, or the like. The M2M Service Layer 22 provides service capabilities that apply to M2M devices 18, M2M gateways 14, and M2M applications 20. The functions of the M2M Service Layer 22 may be implemented in a variety of ways, for example as a web server, in the cellular core network, in the cloud, etc.

Similar to the illustrated M2M Service Layer 22, there is the M2M Service Layer 22' in the Infrastructure Domain. M2M Service Layer 22' provides services for the M2M application 20' and the underlying communication network 12 in the infrastructure domain. M2M Service Layer 22' also provides services for the M2M gateways 14 and M2M devices 18 in the field domain. It will be understood that the M2M Service Layer 22' may communicate with any number of M2M applications, M2M gateways and M2M devices. The M2M Service Layer 22' may interact with a Service Layer by a different service provider. The M2M Service Layer 22' may be implemented by one or more nodes of the network, which may comprise servers, computers, devices, virtual machines (e.g., cloud computing/storage farms, etc.) or the like.

Referring also to FIG. 24B, the M2M Service Layers 22 and 22' provide a core set of service delivery capabilities that diverse applications and verticals may leverage. These service capabilities enable M2M applications 20 and 20' to interact with devices and perform functions such as data collection, data analysis, device management, security, billing, service/device discovery, etc. Essentially, these service capabilities free the applications of the burden of implementing these functionalities, thus simplifying application development and reducing cost and time to market. The Service Layers 22 and 22' also enable M2M applications 20 and 20' to communicate through various networks such as network 12 in connection with the services that the Service Layers 22 and 22' provide.

The M2M applications 20 and 20' may include applications in various industries such as, without limitation, transportation, health and wellness, connected home, energy management, asset tracking, and security and surveillance. As mentioned above, the M2M Service Layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, a Service Layer, such as the Service Layers 22 and 22' illustrated in FIG. 24B, defines a software middleware layer that supports value-added service capabilities through a set of Application Programming Interfaces (APIs) and underlying networking interfaces. Both the ETSI M2M and oneM2M architectures define a Service Layer. ETSI M2M's Service Layer is referred to as the Service Capability Layer (SCL). The SCL may be implemented in a variety of different nodes of the ETSI M2M architecture. For example, an instance of the Service Layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M Service Layer supports a set of Common Service Functions (CSFs) (i.e., service capabilities). An instantiation of a set of one or more particular types of CSFs is referred to as a Common Services Entity (CSE) which may be hosted on different types of network nodes (e.g., infrastructure node, middle node, application-specific node). The Third Generation Partnership Project (3GPP) has also defined an architecture for machine-type communications (MTC). In that architecture, the Service Layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the Service Layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a Service Layer or component thereof may be implemented in the form of software running on a network node (e.g., server, computer, gateway, device or the like) having the general architecture illustrated in FIG. 24C or FIG. 24D described below.

Further, the methods and functionalities described herein may be implemented as part of an M2M network that uses a Service Oriented Architecture (SOA) and/or a Resource-Oriented Architecture (ROA) to access services.

Figure 24C:
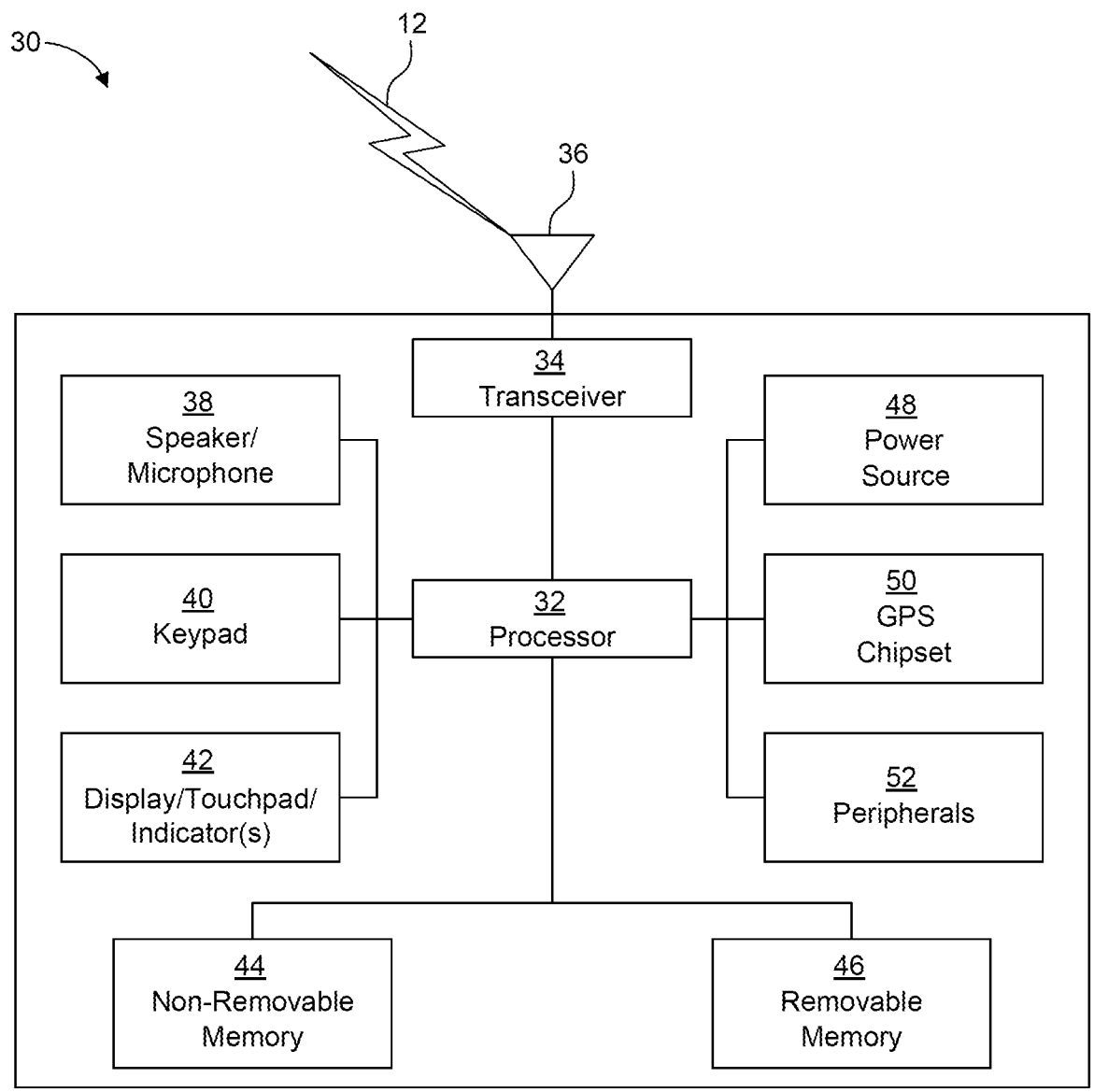
FIG. 24C is a system diagram of an example M2M/IoT terminal or gateway device that may be used within the communications system illustrated in FIG. 24A.

FIG. 24C is a block diagram of an example hardware/software architecture of a node of a network, such as one of the clients, servers, or proxies illustrated in FIGS. 2, 5, 6, 8-12, and 19A-19C, which may operate as an M2M server, gateway, device, or other node in an M2M network such as that illustrated in FIGS. 24A and 24B. As shown in FIG. 24C, the node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the node 30 may include any sub-combination of the foregoing elements while remaining consistent with an embodiment. This node may be a node that implements the functionality described herein, e.g., in relation to the methods described in reference to FIGS. 6-23.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 24C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein (e.g., in FIGS. 6-23) and in the claims. While FIG. 24C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 24C as a single element, the node 30 may include any number of transmit/receive elements 36. More specifically, the node 30 may employ MIMO technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer. The processor 32 may be configured to control lighting patterns, images, or colors on the display or indicators 42. In one embodiment, the display/indicators 42 may present the graphical user interface illustrated and described herein.

The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. It will be appreciated that the node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., finger print) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52.

Figure 24D:
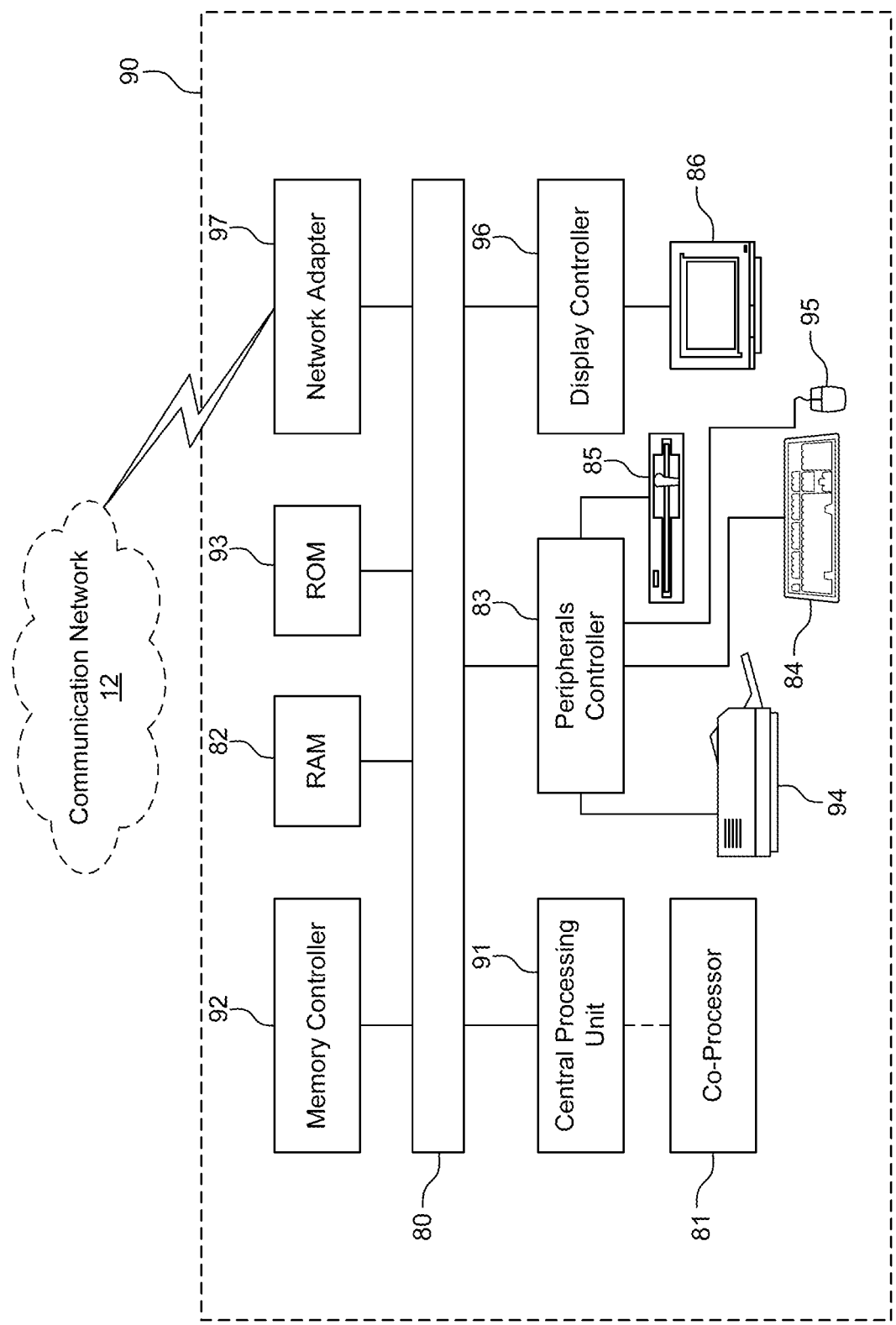
FIG. 24D is a block diagram of an example computing system in which aspects of the communication system of FIG. 24A may be embodied.

FIG. 24D is a block diagram of an exemplary computing system 90 which may also be used to implement one or more nodes of a network, such as the clients, servers, or proxies illustrated in FIGS. 2, 5, 6, 8-12, and 19A-19C, which may operate as an M2M server, gateway, device, or other node in an M2M network such as that illustrated in FIGS. 24A and 24B.

Computing system 90 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M Service Layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86. Display 86, in combination with the computer-executable instructions executed by CPU 91, may generate and operate the graphical user interface illustrated and described herein.

Further, computing system 90 may contain communication circuitry, such as for example a network adaptor 97, that may be used to connect computing system 90 to an external communications network, such as network 12 of FIG. 24A-D, to enable the computing system 90 to communicate with other nodes of the network. The communication circuitry, alone or in combination with the CPU 91, may be used to perform the transmitting and receiving steps described herein (e.g., in FIGS. 6-23) and in the claims.

It is understood that any or all of the systems, methods and processes described herein may be embodied in the form of computer executable instructions (i.e., program code) stored on a computer-readable storage medium which instructions, when executed by a machine, such as an apparatus of an M2M network, including for example an M2M server, gateway, device or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computer.

It is understood that the entities performing the steps illustrated in FIGS. 6-23, such as the IoT Devices, IoT Server, IoT Gateway, IoT Service Layer, RAS, IoT Applications, oneM2M Devices, Non-oneM2M Devices, oneM2M IPE, AE, CSE, RAS CSF, IoT User Device, UE, and the like, may be logical entities that may be implemented in the form of software (i.e., computer-executable instructions) stored in a memory of, and executing on a processor of, an apparatus configured for wireless and/or network communications or a computer system such as those illustrated in FIG. 24C or FIG. 24D. That is, the method(s) illustrated in FIGS. 6-23 may be implemented in the form of software (i.e., computer-executable instructions) stored in a memory of an apparatus, such as the apparatus or computer system illustrated in FIG. 24C or FIG. 24D, which computer executable instructions, when executed by a processor of the apparatus, perform the steps illustrated in FIGS. 6-23. It is also understood that the functionality illustrated in FIGS. 6-23 may implemented as a set of virtualized network functions. The network functions may not necessarily communicate directly, rather, they may communicate via forwarding or routing function. It is also understood that any transmitting and receiving steps illustrated in FIGS. 6-23 may be performed by communication circuitry of the apparatus under control of the processor of the apparatus and the computer-executable instructions (e.g., software) that it executes.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. An apparatus comprising a processor, a memory, and communication circuitry, the apparatus being connected to a network via its communication circuitry, the apparatus further comprising computer-executable instructions stored in the memory of the apparatus which, when executed by the processor of the apparatus, cause the apparatus to:

receive, from a requesting entity, an abstract request comprising a command predicate, one or more command objects, and one or more command contexts;

infer, based on a decomposition of the abstract request, a sequence of one or more operations, associated with a service supporting service capabilities through a set of commands, to execute;

execute the sequence of one or more operations at the service; and send, to the requesting entity, one or more statuses of the executed one or more operations.

2. The apparatus of claim 1, wherein the abstract request comprises a request message associated with the service.

3. The apparatus of claim 1, wherein the inferring comprises:

analyzing the abstract request to determine the command predicate, the one or more command objects, and the one or more command contexts before determining the sequence of one or more operations.

4. The apparatus of claim 1, wherein the computer-executable instructions stored in the memory of the apparatus which, when executed by the processor of the apparatus, further cause the apparatus to:

determine a keyword is present in the abstract request;

determine an operation is associated with the keyword; and add the operation to the sequence of one or more operations to execute.

5. The apparatus of claim 1, wherein the computer-executable instructions stored in the memory of the apparatus which, when executed by the processor of the apparatus, further cause the apparatus to:

classify a word of the abstract request as a noun; and based on the noun classification, determine an entity associated with the word.

6. The apparatus of claim 1, wherein the inferring comprises:

classifying a word of the abstract request as a verb; and based on the verb classification, determining an operation associated with the word.

7. The apparatus of claim 1, wherein the instructions further cause an entity associated with the service to:

create a resource representing the abstract request, wherein the resource comprises a command predicate, one or more command objects, and context information.

8. The apparatus of claim 7, wherein the instructions further cause an entity associated with the service to:

receive a second abstract request targeting the resource, wherein the second abstract request comprises second context information to replace the context information; and process the abstract request using the second context information.

9. The apparatus of claim 1, wherein the abstract request comprises a text string.

10. The apparatus of claim 1, wherein the one or more command contexts comprise context information for use in future abstract requests.

11. The apparatus of claim 10, wherein the context information comprises a term and a definition associated with the term.

12. The apparatus of claim 10, wherein the context information comprises a term and an operation associated with the term.

13. A method comprising:

receiving, from a requesting entity, an abstract request comprising a command predicate, one or more command objects, and one or more command contexts;

inferring, based on a decomposition of the abstract request, a sequence of one or more operations, associated with a service supporting service capabilities through a set of commands, to execute;

generating a set of command based on the command predicate, the one or more command objects, and the one or more command contexts, wherein the set of commands make calls to the sequence of the one or more operations;

executing the generated set of commands; and returning, to the requesting entity, a status indicating completion of the abstract request.

14. The method of claim 13, further comprising:

determining a first command context of the one or more command contexts is not recognized; and prompting the requesting entity for a definition of the command context.

15. The method of claim 13, further comprising:

creating a resource of the abstract request to store the command predicate, the one or more command objects, and the one or more command contexts.

16. The method of claim 15, further comprising:

receiving a request targeting the resource; and executing the generated set of commands.

17. The method of claim 15, further comprising:

receiving a second abstract request, wherein the second abstract request targets the resource and comprises one or more changes to be made to the abstract request; and based on the one or more changes, modifying the resource of the abstract request.

18. The method of claim 13, further comprising:

before executing the generated set of commands, sequencing the generated set of commands.

19. The method of claim 13, wherein the generated set of commands are sequenced such that retrieve and discovery operations are performed before create or update operations.

20. A non-transitory computer-readable storage medium storing computer-readable instructions that, when executed by a processor of a computing device, cause the computing device to:

receive, from a requesting entity, an abstract request comprising a command predicate, one or more command objects, and one or more command contexts;

infer a set of operations based on a decomposition of the command predicate, the one or more command objects, and the one or more command contexts;

execute the set of operations at a service supporting service capabilities through a set of commands; and return, to the requesting entity, a statuses of the executed operations.

* * * * *